United States Patent
Addala et al.

(10) Patent No.: US 9,658,901 B2
(45) Date of Patent: May 23, 2017

(54) EVENT-BASED ORCHESTRATION IN DISTRIBUTED ORDER ORCHESTRATION SYSTEM

(75) Inventors: Raju Addala, Fremont, CA (US); Alok Singh, Fremont, CA (US); Sumeet Rijhsinghani, Fremont, CA (US); Zeeshan Butt, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 605 days.

(21) Appl. No.: 12/945,084

(22) Filed: Nov. 12, 2010

(65) Prior Publication Data

US 2012/0124584 A1 May 17, 2012

(51) Int. Cl.
*G06F 9/54* (2006.01)
*G06Q 10/08* (2012.01)
*G06Q 10/00* (2012.01)
*G06Q 10/10* (2012.01)
*G06F 17/30* (2006.01)
*G06F 9/44* (2006.01)

(52) U.S. Cl.
CPC .......... *G06F 9/542* (2013.01); *G06Q 10/087* (2013.01); *G06F 2209/544* (2013.01)

(58) Field of Classification Search
USPC ................ 705/1.1, 7.11, 301, 26.81, 348
See application file for complete search history.

(56) References Cited

U.S. PATENT DOCUMENTS

| | | | |
|---|---|---|---|
| 4,044,337 A | 8/1977 | Hicks et al. | |
| 4,855,190 A | 8/1989 | Bezner | |
| 5,201,010 A | 4/1993 | Deaton et al. | |
| 5,440,726 A | 8/1995 | Fuchs et al. | |
| 5,630,047 A | 5/1997 | Wang | |
| 5,761,499 A | 6/1998 | Sonderegger | |
| 5,768,586 A | 6/1998 | Zweben et al. | |
| 5,987,423 A | 11/1999 | Arnold et al. | |
| 5,996,088 A | 11/1999 | Frank et al. | |
| 6,052,679 A | 4/2000 | Aparicio | |
| 6,053,948 A | 4/2000 | Vaidyanathan et al. | |
| 6,055,573 A | 4/2000 | Gardenswartz et al. | |
| 6,341,287 B1 | 1/2002 | Sziklai et al. | |
| 6,374,264 B1 | 4/2002 | Bohannon et al. | |
| 6,539,386 B1 | 3/2003 | Athavale et al. | |
| 6,560,592 B1 | 5/2003 | Reid | |
| 6,567,783 B1 | 5/2003 | Notani et al. | |
| 6,601,233 B1 | 7/2003 | Underwood | |
| 6,678,882 B1 | 1/2004 | Hurley et al. | |
| 6,698,018 B1 | 2/2004 | Zimniewicz et al. | |
| 6,876,977 B1 | 4/2005 | Marks | |

(Continued)

OTHER PUBLICATIONS

"Oracle Communications Order and Service Management™ Version 6.3", Administration Guide, First Edition, Sep. 2007.

(Continued)

*Primary Examiner* — Mark A Fleischer
(74) *Attorney, Agent, or Firm* — Miles & Stockbridge P.C.

(57) ABSTRACT

A distributed order orchestration system is provided that includes an event manager configured to generate and publish a set of events based on a process state and metadata stored in a database. A set of subscribers can consume the set of events, and each subscriber can execute a task based on the consumed event.

20 Claims, 28 Drawing Sheets

(56) References Cited

U.S. PATENT DOCUMENTS

| | | | |
|---|---|---|---|
| 6,915,294 | B1 | 7/2005 | Singh et al. |
| 6,934,687 | B1 | 8/2005 | Papierniak et al. |
| 7,003,476 | B1 | 2/2006 | Samra et al. |
| 7,031,787 | B2 | 4/2006 | Kalthoff et al. |
| 7,096,189 | B1 | 8/2006 | Srinivasan |
| 7,107,340 | B2 | 9/2006 | Chkodrov et al. |
| 7,139,841 | B1 | 11/2006 | Somasundaram et al. |
| 7,356,482 | B2 | 4/2008 | Frankland et al. |
| 7,379,903 | B2 | 5/2008 | Caballero et al. |
| 7,403,904 | B2 | 7/2008 | Abe et al. |
| 7,412,399 | B1 | 8/2008 | Racca |
| 7,441,187 | B2 | 10/2008 | Meadows |
| 7,467,375 | B2 | 12/2008 | Tondreau et al. |
| 7,469,219 | B2 | 12/2008 | Goldberg |
| 7,472,374 | B1 | 12/2008 | Dillman et al. |
| 7,546,257 | B2 | 6/2009 | Hoffman et al. |
| 7,567,975 | B2 | 7/2009 | Yalamanchi |
| 7,574,483 | B1 | 8/2009 | Alger et al. |
| 7,590,680 | B2 | 9/2009 | Fernando et al. |
| 7,627,867 | B2 | 12/2009 | Banks |
| 7,657,534 | B2 | 2/2010 | Kirkegaard |
| 7,664,750 | B2 | 2/2010 | Frees et al. |
| 7,680,752 | B1 | 3/2010 | Clune, III et al. |
| 7,680,782 | B2 | 3/2010 | Chen et al. |
| 7,707,200 | B2 | 4/2010 | Jain et al. |
| 7,797,598 | B1 | 9/2010 | Secatch |
| 7,873,611 | B2 | 1/2011 | Ebersole |
| 7,987,163 | B2 | 7/2011 | Keshavarz-Nia et al. |
| 8,028,276 | B1 | 9/2011 | Bessonov |
| 8,112,317 | B1 | 2/2012 | Ballaro et al. |
| 8,141,125 | B2 | 3/2012 | Maes |
| 8,271,609 | B2 | 9/2012 | Addala et al. |
| 8,402,064 | B2 | 3/2013 | Addala et al. |
| 8,458,312 | B2 * | 6/2013 | Raghunathan et al. ...... 709/223 |
| 8,627,271 | B2 | 1/2014 | Reed et al. |
| 2002/0026339 | A1 | 2/2002 | Frankland et al. |
| 2002/0042751 | A1 | 4/2002 | Sarno |
| 2002/0042755 | A1 | 4/2002 | Kumar et al. |
| 2002/0178014 | A1 | 11/2002 | Alexander |
| 2002/0178074 | A1 | 11/2002 | Bloom |
| 2003/0078933 | A1 | 4/2003 | Gara et al. |
| 2003/0078944 | A1 | 4/2003 | Yamauchi et al. |
| 2003/0144852 | A1 | 7/2003 | Eckert et al. |
| 2003/0172007 | A1 * | 9/2003 | Helmolt ............... G06Q 10/087 705/28 |
| 2003/0182145 | A1 | 9/2003 | Kalthoff et al. |
| 2004/0024784 | A1 | 2/2004 | Spall et al. |
| 2004/0064351 | A1 | 4/2004 | Mikurak |
| 2004/0068526 | A1 | 4/2004 | Singh |
| 2004/0088196 | A1 | 5/2004 | Childress et al. |
| 2004/0111336 | A1 | 6/2004 | Argust et al. |
| 2004/0139176 | A1 | 7/2004 | Farrell et al. |
| 2004/0181425 | A1 | 9/2004 | Schwerin-Wenzel et al. |
| 2004/0181771 | A1 | 9/2004 | Anonsen et al. |
| 2004/0181775 | A1 | 9/2004 | Anonsen et al. |
| 2004/0215526 | A1 | 10/2004 | Luo et al. |
| 2004/0236607 | A1 | 11/2004 | Kost et al. |
| 2004/0243476 | A1 | 12/2004 | Borenstein et al. |
| 2004/0243485 | A1 | 12/2004 | Borenstein et al. |
| 2004/0267689 | A1 | 12/2004 | Gavlak et al. |
| 2005/0027732 | A1 | 2/2005 | Kalima |
| 2005/0044197 | A1 * | 2/2005 | Lai ..................... G06Q 10/10 709/223 |
| 2005/0044530 | A1 | 2/2005 | Novik |
| 2005/0075941 | A1 | 4/2005 | Jetter et al. |
| 2005/0096959 | A1 | 5/2005 | Kumar et al. |
| 2005/0102192 | A1 | 5/2005 | Gerrits et al. |
| 2005/0113098 | A1 | 5/2005 | Cankaya et al. |
| 2005/0182768 | A1 | 8/2005 | Waldorf et al. |
| 2005/0216573 | A1 | 9/2005 | Gutjahr |
| 2005/0240756 | A1 | 10/2005 | Mayer |
| 2005/0289013 | A1 | 12/2005 | Goldberg |
| 2006/0026319 | A1 | 2/2006 | Rothman et al. |
| 2006/0178918 | A1 * | 8/2006 | Mikurak ............... 705/7 |
| 2006/0224613 | A1 | 10/2006 | Bermender et al. |
| 2006/0225075 | A1 | 10/2006 | Mankovski et al. |
| 2006/0235733 | A1 | 10/2006 | Marks |
| 2006/0265272 | A1 | 11/2006 | Bosa et al. |
| 2006/0277024 | A1 * | 12/2006 | Kloppmann ............ G06F 9/466 703/22 |
| 2007/0016429 | A1 | 1/2007 | Bournas et al. |
| 2007/0016608 | A1 | 1/2007 | Mullins |
| 2007/0088596 | A1 | 4/2007 | Berkelhamer et al. |
| 2007/0121850 | A1 | 5/2007 | Klos et al. |
| 2007/0192124 | A1 | 8/2007 | Anderson et al. |
| 2007/0203803 | A1 | 8/2007 | Stone et al. |
| 2007/0233287 | A1 | 10/2007 | Sheshagiri et al. |
| 2007/0256050 | A1 | 11/2007 | Behnia et al. |
| 2007/0260575 | A1 | 11/2007 | Robinson et al. |
| 2007/0288412 | A1 | 12/2007 | Linehan |
| 2008/0016471 | A1 | 1/2008 | Park |
| 2008/0033700 | A1 | 2/2008 | Kano et al. |
| 2008/0040245 | A1 | 2/2008 | Wadawadigi et al. |
| 2008/0043639 | A1 | 2/2008 | Song |
| 2008/0046868 | A1 | 2/2008 | Tsantilis |
| 2008/0071561 | A1 | 3/2008 | Holcombe |
| 2008/0098108 | A1 | 4/2008 | Yu |
| 2008/0098378 | A1 | 4/2008 | Kilbane et al. |
| 2008/0127044 | A1 * | 5/2008 | Barros ............... G06Q 10/06 717/104 |
| 2008/0147517 | A1 | 6/2008 | Martinez et al. |
| 2008/0163164 | A1 | 7/2008 | Chowdhary et al. |
| 2008/0229307 | A1 | 9/2008 | Maeda et al. |
| 2008/0235324 | A1 * | 9/2008 | Abernethy et al. ......... 709/201 |
| 2008/0256133 | A1 | 10/2008 | Frankland et al. |
| 2008/0281833 | A1 | 11/2008 | Cain et al. |
| 2008/0301419 | A1 | 12/2008 | Barros et al. |
| 2008/0307255 | A1 | 12/2008 | Chen et al. |
| 2008/0320486 | A1 | 12/2008 | Bose et al. |
| 2009/0070783 | A1 | 3/2009 | Schmidt et al. |
| 2009/0083632 | A1 | 3/2009 | Brosh et al. |
| 2009/0089078 | A1 | 4/2009 | Bursey |
| 2009/0089776 | A1 | 4/2009 | Sonkin et al. |
| 2009/0150887 | A1 | 6/2009 | Sanghvi et al. |
| 2009/0171819 | A1 | 7/2009 | Emde et al. |
| 2009/0172689 | A1 | 7/2009 | Bobak et al. |
| 2009/0192884 | A1 | 7/2009 | Lo |
| 2009/0210268 | A1 | 8/2009 | Fan et al. |
| 2009/0216874 | A1 | 8/2009 | Thain et al. |
| 2009/0222395 | A1 | 9/2009 | Light et al. |
| 2009/0228546 | A1 | 9/2009 | Yendluri |
| 2009/0319685 | A1 | 12/2009 | Martin |
| 2010/0070331 | A1 | 3/2010 | Koegler et al. |
| 2010/0110933 | A1 * | 5/2010 | Wilcock ............... G06Q 10/10 370/255 |
| 2010/0121740 | A1 | 5/2010 | Reed et al. |
| 2010/0138017 | A1 | 6/2010 | Vrba et al. |
| 2011/0055815 | A1 | 3/2011 | Squillace |
| 2011/0125553 | A1 | 5/2011 | Mazzoleni et al. |
| 2011/0167105 | A1 | 7/2011 | Ramakrishnan et al. |
| 2011/0184969 | A1 | 7/2011 | Idicula et al. |

OTHER PUBLICATIONS

Lienhard et al, Workflow and Business Rules: a Common Approach, BPTrends, Sep. 2005, ivyTeam—SORECOGroup, Switzerland.

Xiaoyu Zhang and Denis Gračanin, "Service-Oriented-Architecture based Framework for Multi-User Virtual Environments", Proceedings of the 2008 Winter Simulation Conference, pp. 1-9.

ORACLE®, "Oracle Fusion Middleware Developer's Guide for Oracle SOA Suite", 11g Release 1 (11.1.1) Part No. E10224-01, Chapter 31, pp. 1-25, http://download.oracle.com/docs/cd/E12839_01/integration.1111/e10224/bam_data_objects.htm.

ORACLE®, "Oracle Fusion Middleware Fusion Developer's Guide for Oracle Application Development Framework", 11 g Release 1 (11.1.1) Part No. B31974-03, Chapter 41, pp. 1-6, http://download.oracle.com/docs/cd/E12839_01/web.1111/b31974/adv_ads.htm.

Sterling Commerce, "Sterling Distributed Order Mangement", pp. 1-2.

ORACLE®, "Oracle it Service Management Suite Overview", pp. 1-3, http://www.oracle.com/technetwork/oem/grid-control/overview/twp-oracle-it-serv-mgmt-feature-ove-133400.pdf.

(56) References Cited

OTHER PUBLICATIONS

Oracle Data Sheet, "Oracle Order Management", Copyright 2009 Oracle; pp. 1-5.
Raju Addala, et al., U.S. Appl. No. 12/718,468, filed Mar. 5, 2010.
Raju Addala, et al., U.S. Appl. No. 12/718,647, filed Mar. 5, 2010.
Raju Addala, et al., U.S. Appl. No. 12/697,756, filed Feb. 1, 2010.
Raju Addala, et al., U.S. Appl. No. 12/718,501, filed Mar. 5, 2010.
Raju Addala, et al., U.S. Appl. No. 12/718,536, filed Mar. 5, 2010.
Raju Addala, et al., U.S. Appl. No. 12/718,625, filed Mar. 5, 2010.
Raju Addala, et al., U.S. Appl. No. 12/718,520, filed Mar. 5, 2010.
Raju Addala, et al., U.S. Appl. No. 12/718,475, filed Mar. 5, 2010.
Raju Addala, et al., U.S. Appl. No. 12/718,585, filed Mar. 5, 2010.
Raju Addala, et al., U.S. Appl. No. 12/718,383, filed Mar. 5, 2010.
Raju Addala, et al., U.S. Appl. No. 12/718,569, filed Mar. 5, 2010.
Gregor Hohpe and Bobby Woolf, "Enterprise Integration Patterns; Publish-Subscribe Channel", http://www.eaipatterns.com/PublishSubscribeChannel.html.
Gregor Hohpe and Bobby Woolf, "Enterprise Integration Patterns; Point-to-Point Channel", http://www.eaipatterns.com/Point-ToPointChannel.html.
Gregor Hohpe and Bobby Woolf, Enterprise Integration Patterns; Chapter 3, pp. 57-97, http://www.eaipatterns.com/docs/EnterpriseIntegrationPatterns_HohpeWoolf_ch03.pdf.
Gregor Hohpe, "Programming Without a Call Stack—Event-driven Architectures", pp. 1-10, http://www.eaipatterns.com/docs/EDA.pdf.
Fred Mahakian, et al., U.S. Appl. No. 12/900,816, filed Oct. 8, 2010.
ConceptWave Software Inc., "Order Management", Jul. 26, 2004.
Joan Lawson et al., "Orchestrating into End-to-End Processes", Oracle International Corporation, Mastering SOA, Part 3, Feb. 2007.
Bimal Mehta et al., "BizTalk Server 2000 Business Process Orchestration", Microsoft Corporation, 2001, Bulletin of the EEE Computer Society Technical Committee on Data Engineering, 2001.
BizTalk Orchestration: A Technology for Orchestrating Business Interactions White Paper, Microsoft Corporation, Jun. 5, 2000.
"Orchestrating Web Services: The Case for a BPEL Server", by Dave Shaffer and Brian Dayton, An Oracle White Paper, Jun. 2004, Oracle Corporation.
Stephen McIlvenna et al., "Synthesis of Orchestrators from Service Choreographies", Faculty of Science and Technology, Institute of Computer Science, University of Tartu, Estonia, 2009.
Gael Blondelle et al., "How to Choose Your Process Orchestration Technology", EBM Websourcing, Petals link, Version 1.0, Dec. 2009.
Nuno F. Rodrigues et al., "On the Discovery of Business Processes Orchestration Patterns", University of do Minho, Portugal, 2004.
J. Wolfgang et al.; "Value-Based Differentiation in Business Relationships: Gaining and Sustaining Key Supplier Status"; Journal of Marketing; vol. 70; Jan. 2006; pp. 119-136.
Order Orchestration and Management with Tapestry, CGI Group Inc., 2009.
Validating Orchestration of Web Services with BPEL and Aggregate Signatures, by Carlo Blundo et al., Sixth European conference on Web Services, 2008 IEEE Computer Society.
Office Action from U.S. Appl. No. 12/718,569 (mailed Jul. 28, 2015).
Non Final Office Action mailed on Dec. 22, 2016 for U.S. Appl. No. 13/535,836.
List of references on Nov. 1, 2016 for U.S. Appl. No. 12/718,536.
Bidwell, Percy W., "Imports in the American Economy," Foreign Affairs (pre-1986); Oct. 1945; 24, 000001; ProQuest Central, pp. 85-98.
Classified ad 4—no title (May 29, 1852); New York Daily Times (1851-1857).
Martin, Thomas; Ancient Greece: from Prehistoric to Hellenistic Times; Yale University; 1996, pp. 11-12.

* cited by examiner

1300

EVENT-BASED ORCHESTRATION IN DISTRIBUTED ORDER ORCHESTRATION SYSTEM

FIELD

One embodiment is directed to a computer system generally, and more particularly to a computer system for the orchestration of business processes.

BACKGROUND

Order management systems are computer software and/or hardware systems implemented by a number of industries to facilitate order entry and processing. Companies, such as catalog companies and those utilizing electronic commerce, use order management systems to receive, process and fulfill customer orders. An order management system makes possible the entering of an order via a website shopping care or data entry system. The system typically captures customer proprietary information and/or account level information for each order. Credit verification or payment processing may then be performed to check for available funds and validate the transaction. Valid orders are processed for warehouse fulfillment, including, picking, packing and shipping of the ordered goods or services.

Business processes are typically modeled by business architects/analysts. A business process may model message exchanges with different systems in a web services environment. The business architects/analysts then provide an information technology ("IT") designer with the model. The IT designer uses an orchestration language, such as business process execution language ("BPEL"), to code the business process. BPEL processes are typically created in a BPEL editor and a deployed BPEL process is invoked. Because the IT designer and business architects/analysts generally have different skill sets (i.e., the business architects/analysts are familiar with the business process being modeled and the IT designer is familiar with the orchestration language but not the business process), the resulting BPEL process developed by the IT designer may not work as the business architects/analysts imagined. Accordingly, there may be a wide divide between the originally conceived business process model and the implemented model.

A business process also stores all associated data until the business process is closed. When a business process is long running, the storage of all associated data can become a bottle neck while trying to increase throughput. In addition, the use of a business process with different systems in a web service environment can result in a tight coupling of the different systems.

SUMMARY

One embodiment is directed to a computer-readable medium having instructions stored thereon that, when executed by a processor, cause the processor to initiate an event manager to process an order using a process. The instructions include determining a step of the process to execute based on a process state and metadata stored in a database. The instructions also include generating an event based on the determined step of the process, where the event includes instructions to execute a task that corresponds to the step of the process. The instructions also include publishing the event across an event messaging system.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Distributed Order Orchestration Framework

One embodiment is directed to a distributed order orchestration system ("DOO"). Distributed order orchestration provides a flexible, configurable infrastructure that can be easily customized to be consistent with an enterprise's business practices and existing order fulfillment system architecture. Decomposition is the conversion of data received from one or more order capture modules into an internal canonical format in order to process the data. In one example embodiment, the distributed order orchestration system includes a capture layer for capturing customer orders across multiple channels, a decomposition layer to help determine the orchestration process, an orchestration layer for executing and orchestrating order line processing, a task layer services for performing task related logic, an external interface layer for interfacing with external systems, a fulfillment layer, and a global order promising layer to provide a user interface for scheduling and sourcing. The distributed order orchestration system may further include a fulfillment workbench layer that interfaces with the other layers of the system and manages sources, tasks and assignments. The various layers of the distributed order orchestration system described above combine to provide a complete order management solution at reduced implementation and maintenance costs. However, in an alternative embodiment, the capture layer is not part of the distributed order orchestration system. In this alternative embodiment, an order capture layer is part of a separate system, and a connector service is utilized as a bridge between the distributed order orchestration system and the capture layer.

Figure 1:
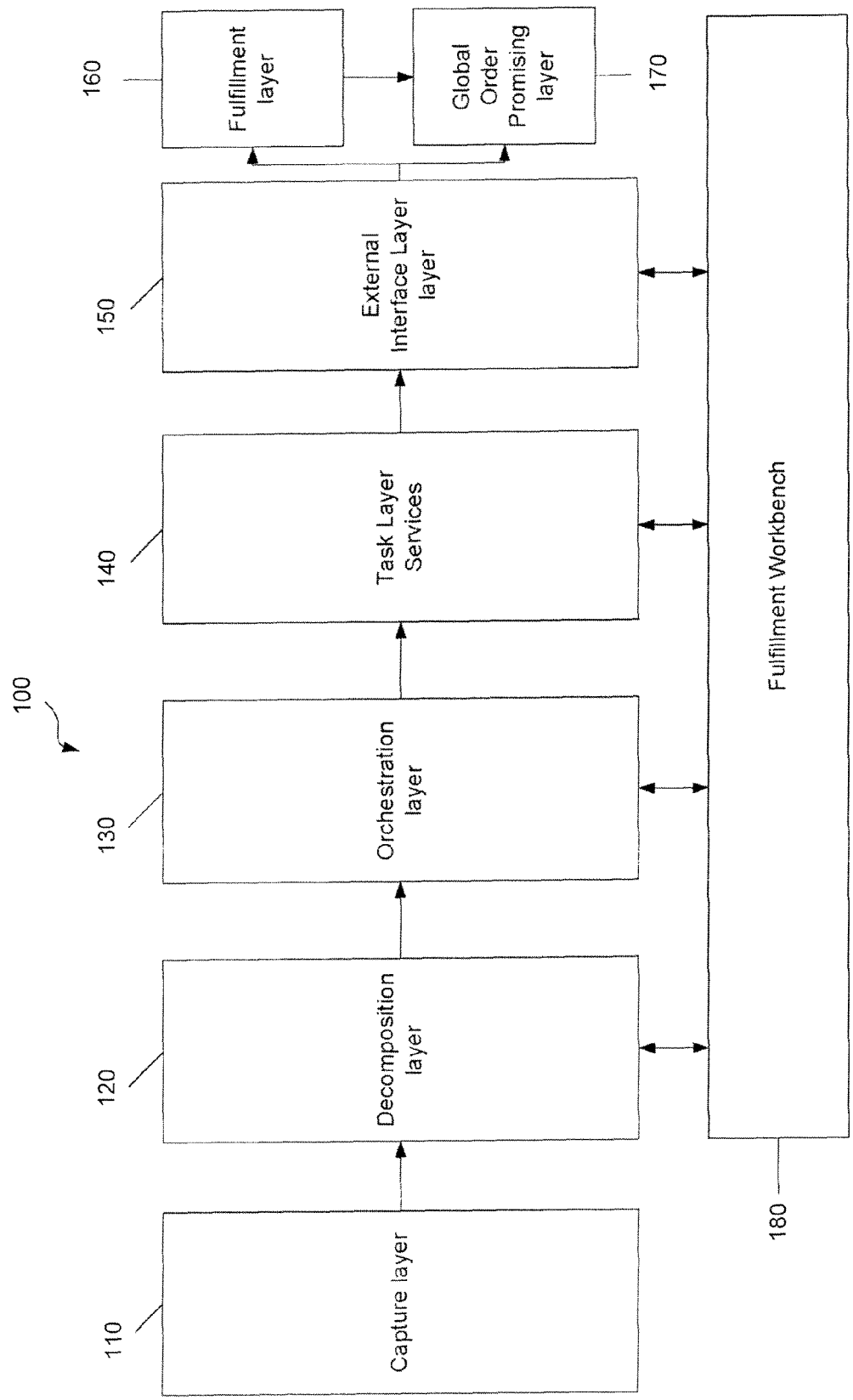
FIG. 1 illustrates an example of a distributed order orchestration system according to one embodiment.

FIG. 1 illustrates an example of a distributed order orchestration system 100 according to one embodiment. In the embodiment, distributed order orchestration system 100 includes a capture layer 110 that can receive and capture information related to customer orders for goods and/or services across multiple channels. The order may be received via a graphical user interface, such as that of a website shopping cart, or can be received via any data entry system. The capture layer 110 captures and forwards the order information to a decomposition layer 120. However, in an alternative embodiment, the capture layer 110 is separate from distributed order orchestration system 100. In this alternative embodiment, a connector service is utilized as a bridge between distributed order orchestration system 100 and capture layer 110.

Order Capture systems capture the order with any necessary functional attributes that are needed to process the order, such as pricing, validation, eligibility, etc. The sales order is fed to decomposition layer 120 in a Source Order object. The source order object is generated from a sales order object submitted by different capture systems. The source order object is in a generic format that is fed into the decomposition layer 120.

Decomposition layer 120 receives the order information and breaks the received order into individual purchase orders to be sent to fulfillment systems and supply-side partners for execution. Decomposition layer 120 may include a decomposition rules workbench for setting up rules, rule sets, and transformation processes for the order capture layer 110 may capture the order from a sales perspective. For example, a laptop computer may be sold worldwide. The laptop includes a power cord, but the customer just buys a laptop (one line on the order). That is, a sales website may want to just sell the laptop and not have the customer individually order the power cord separately. However, from a fulfillment perspective, the laptop and the power cord need to be retrieved for the order. In decomposition layer 120, there may be a business rule that says that a laptop must have a power cord and the plug on the power cord must match the country to which the laptop is shipped. So when decomposition module 120 is complete, the order has two lines, one with the laptop and one for the appropriate power cord. Thus, the order has been decomposed into multiple items that need to be fulfilled.

Also, decomposition layer 120 may take the received order and translate it to the order format and order content required by the other layers of the distributed order orchestration system 100, such as the fulfillment layer 160. Because capture layer 110 is capable of receiving orders in any format for compatibility purposes across different types of systems, decomposition layer 120 may need to translate the order into a format that is compatible with and can be recognized by all the other layers and/or processes of the distributed order orchestration system 100. Additionally, decomposition layer 120 may provide a process launch capability to assign and launch orchestration processes for an order based on appropriate decomposition rules. For example, different orchestration processes are assigned based on parameters in the order. For example, a company may give special treatment to certain customers in terms of speed of fulfillment or shipping. For example, Gold customers may be offered expedited shipping. Also, there may be an additional step for communication with the customer. When the orders for these customers are received, they are assigned to the orchestration process that has these parameters and steps while orders for other customers may be assigned to standard processes.

Decomposition may use a canonical object model to accomplish the decoupling of data format from order capture systems. Decomposition integration processes work on a set of generic data structures called Enterprise Business Objects (EBO's). They are based on the canonical data model. This approach allows the DOO to be agnostic of participating applications and be independent of source or target applications. The model eliminates the need to map data from different applications directly to each other.

Distributed order orchestration system 100, as illustrated in FIG. 1, further includes an orchestration layer 130. Orchestration layer 130 provides individual orchestration processes to manage order and/or service line items. For example, orchestration layer 130 may provide business process management functionality to support planning of steps within a process, including step duration and calculation or recalculation of completion dates. Orchestration layer 130 may also provide external task execution functionality to support creation, update, release, and monitoring of external tasks. External tasks are those that are carried out by the fulfillment systems. Task layer services do specific processing and then send the data to these integrated fulfillment systems. Orchestration is a sequence of task layer service invocations.

Orchestration layer 130 may also provide for jeopardy management in order to check a promised delivery date of an order against current estimated date for completion, map to user defined thresholds, and handle or escalate conditions. Orchestration layer 130 may further provide a process for change orders, including a support process rollback to accommodate for change order automation and modify in-flight orchestration processes for orders changed in order capture stage. Further, a projected order completion date may be provided by instantiating the orchestration process. Orchestration layer 130 also provides a mechanism for updating an order status automatically or upon user request.

One embodiment provides a tool that provides a high degree of abstraction for business process modeling in an order fulfillment business process. Business processes may be modeled by users, such as business analysts, and do not need any coding from an IT designer to have the business process executed. Users are provided the flexibility to define business processes in a central place configured to enter and capture all information required for orchestration and fulfilling an order. An example of such a central place can be a web-based administration user interface. Likewise, an example of all information required for orchestration and order fulfillment may be information required for process planning, core orchestration, and change management. The business process may identify one or more services that define steps to be performed in the order fulfillment process. A run-time engine then uses the definition to dynamically invoke the services based on the definition of the business process.

In the business environment, business users are often process modelers, not IT personnel. By providing a web-based administration environment, the business users may be able to design the business process. The process definitions may be defined in business terms and not in IT terms. Particular embodiments allow an administrative environment outside of a code editor, such as a BPEL editor, for defining processes using associated services. Users can configure processes that can be executed at runtime as executable processes without IT involvement. This alleviates the need for deploying the processes every time a modification of the business process is needed. The user sets up the sequence of services on a data table. The modeled business process is then used to perform an executable process (also identified as an orchestration process), which is assembled and executed at run-time. In one embodiment, "runtime" can be defined as the time when an order is received for processing. Metadata is assembled in a data runtime table and used to define the executable process for the business process. The metadata is used to invoke services in the executable process.

In one embodiment, the services invoked are encapsulated and reusable. The metadata is used to determine how and when to invoke services. Also, depending on the metadata, input arguments are generated and sent to the services to invoke the encapsulated service. A common signature is used to send data to invoke the services. Different input arguments can be formulated for different services used in different executable processes. The input arguments are formatted in the same way such that a service can read the different sets of data and invoke the service. Thus, services can be re-used in different business processes without the need to be recoded and redeployed. Deployment of services indicates the process is ready to be released for testing or production.

Distributed order orchestration system 100 may further include a task layer services 140 to provide encapsulated services used to control processing logic for each orchestration process stage. In particular, task layer services 140 may provide task-specific business logic to wrap logic around a certain request such that the system 100 knows what logical tasks are associated with a particular request. The steps that need to be performed in the executable process from orchestration may require tasks to be performed. For example, task layer services 140 can provide and control processing logic for scheduling a shipment, requesting a shipment, updating an install base, creating an activity, etc. The output of task layer services 140 is a standard goods and/or service request(s) which may be provided to other layers of the system 100, such as external interface layer 150 or fulfillment layer 160. In addition, task layer services 140 may receive input that can be used to update the processing logic or status.

Task layer services 140 initiates the task, generates a message for an external system, and sends the message. The data structure that is needed to have the task performed is generated. Certain tasks may be predefined in task layer services. Also, a customer may add other tasks using a template that defines how to create a task. The message generated indicates which task should be performed by the external system. The task to be performed is an aspect of order processing that has been modeled. For example, the task may be invoicing for an order. Parameters for performing the task are also included. The message is sent to an external interface of external interface layer 150. Task layer services 140 transforms and sends the message to the external system layer.

Distributed order orchestration system 100 also includes an external interface layer 150 to translate standard request(s) and route the request(s) to external systems for processing. More specifically, external interface layer 150 may receive the standard goods and/or services request(s) output by the task layer services 140 and provide a single layer transform of the request(s) if needed to match the format of fulfillment systems. The transformation performed by external interface layer 150 maps the data to the content and format required by the integrated fulfillment systems. Transformation by decomposition layer 120 converts the data to the internal format used by system 100. External interface layer 150 may map the data structure from task layer services 140 to the external format. External interface layer 150 provides flexible routing so that request(s) are routed to specific fulfillment systems based on business rules. For example, if more than one shipping system is available for fulfillment, business rules will determine to which shipping system an individual shipping request will be sent. External interface layer 150 may also include a transformation rules workbench that can be utilized to setup rules, rule sets, and transformation data for external routing of request(s).

The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to external interface layer 150.

Distributed order orchestration system 100 may further include a global order promising layer 170 that provides an interface, such as a graphical user interface, for scheduling and sourcing orders. In particular, in one embodiment, global order promising layer 170 includes a sourcing broker that determines the best source for products and services associated with the order based upon a customer profile, order and supplier definitions, etc. Also, global order promising layer 170 provides for real-time reserve and un-reserve of inventory and inventory check across distributed internal systems. The interface of global order promising layer 170 allows for the viewing of availability and sourcing information so that a user can view the availability of and manually change the source from which an order for a good or service is being fulfilled. However, in an alternative embodiment, the global order promising layer 170 is separate from distributed order orchestration system 100. In this alternative embodiment, a connector service is utilized as a bridge between distributed order orchestration system 100 and global order promising layer 170.

A fulfillment workbench 180 may also be provided as a user interface for order fulfillment administrators, users and supervisors to monitor and manage the flow of orders through the system 100. In an embodiment, fulfillment workbench 180 provides users, such as supervisors, with a mechanism to monitor order fulfillment tasks, including allowing supervisors to monitor activity load and to produce reports. Fulfillment workbench 180 further provides a fulfillment process analysis that allows business process designers to analyze process metrics such as the number of manual interventions, the number and type of errors that occurred, the number of late orders, and the expected process duration versus the actual duration. In certain embodiments, a fulfillment system performance analysis capability is also included within the fulfillment workbench 180 to provide reports and dashboards to enable order managers to view orders for each system and analyze performance. The fulfillment workbench may make use of graphical representations (e.g., graphs and charts) to clearly convey system status/order information to users. Because DOO system 100 has the data reference data, it is possible to draw aggregated graphs/charts for trending analysis. Users may take actions from the fulfillment workbench as described below, such as by substituting the item ordered, splitting the quantity into multiple order lines, putting a hold on the order lines to prevent further progression, etc.

According to one embodiment, fulfillment workbench 180 allows users to make mass order information changes related to fulfillment including making single line or mass line changes to fulfillment information (e.g., dates, etc.). Fulfillment workbench 180 may further allow for the monitoring of orchestration processes, such as reviewing the status of orchestration processes including overall process progress, as well as status of individual tasks and corresponding fulfillment lines and people lines. Fulfillment workbench 180, in one embodiment, includes mechanisms for maintaining order fulfillment processing and allows an order processing user to control a process associated with an order including pause, edit, cancel, etc.

In some embodiments, fulfillment workbench 180 also provides functionality for order and task assignment. For example, fulfillment workbench 180 may use an assignment engine to assign orders and activities to the appropriate fulfillment resource. Fulfillment workbench 180 may include a mechanism for batch re-assignment of orders thereby allowing a supervisor to re-source a set of orders from one fulfillment system to another. Fulfillment workbench 180 also provides for the assignment of fill rate and backorder rules that can automatically determine how to handle shortage situations. A universal in-box may be included within fulfillment workbench 180 in order to allow users to view activities assigned to them and respond to the task.

Fulfillment workbench 180 allows a user to view orders being processed in different layers of system 100. A view of the status of an order may be generated from whichever layers have processed the order. This is because an end to end integrated system has been provided. Conventional order systems may have been customized solutions that did not allow for a view of different layers. By integrating layers in a format that allows generic communication, a user interface that can generate views from all the layers can be provided.

Examples of distributed order orchestration system 100 may also include a fulfillment layer 160. In one embodiment, fulfillment layer 160 may be an interface to external fulfillment systems, and can be used to communicate order information and fulfillment requirements to a supplier or source of the goods and/or services associated with an order.

Certain embodiments of distributed order orchestration system 100 include an administration user interface. The administration user interface provides administration services that hide the complexity of the fulfillment execution environment from the end user. For instance, the administration user interface provide product mapping via an administration environment that defines transformations to map product structure between a sales view and a supplier system definition. In this embodiment, sales view refers to a simplified view provided to consumers when making a purchase order. Supplier system definition refers to the more specific and detailed information used by suppliers of goods and/or services. The administration user interface may also provide an orchestration process workbench to set up processes, rule sets, and parameters for order orchestration. The administration user interface has an integrated setup that includes process sequence, planning, jeopardy, change management, and workbench display. The administration user interface also allows for user-defined status transitions for tasks, processes, and fulfillment lines, and business rules configuration for configuring constraints, transformation rules, and routing rules.

Figure 2:
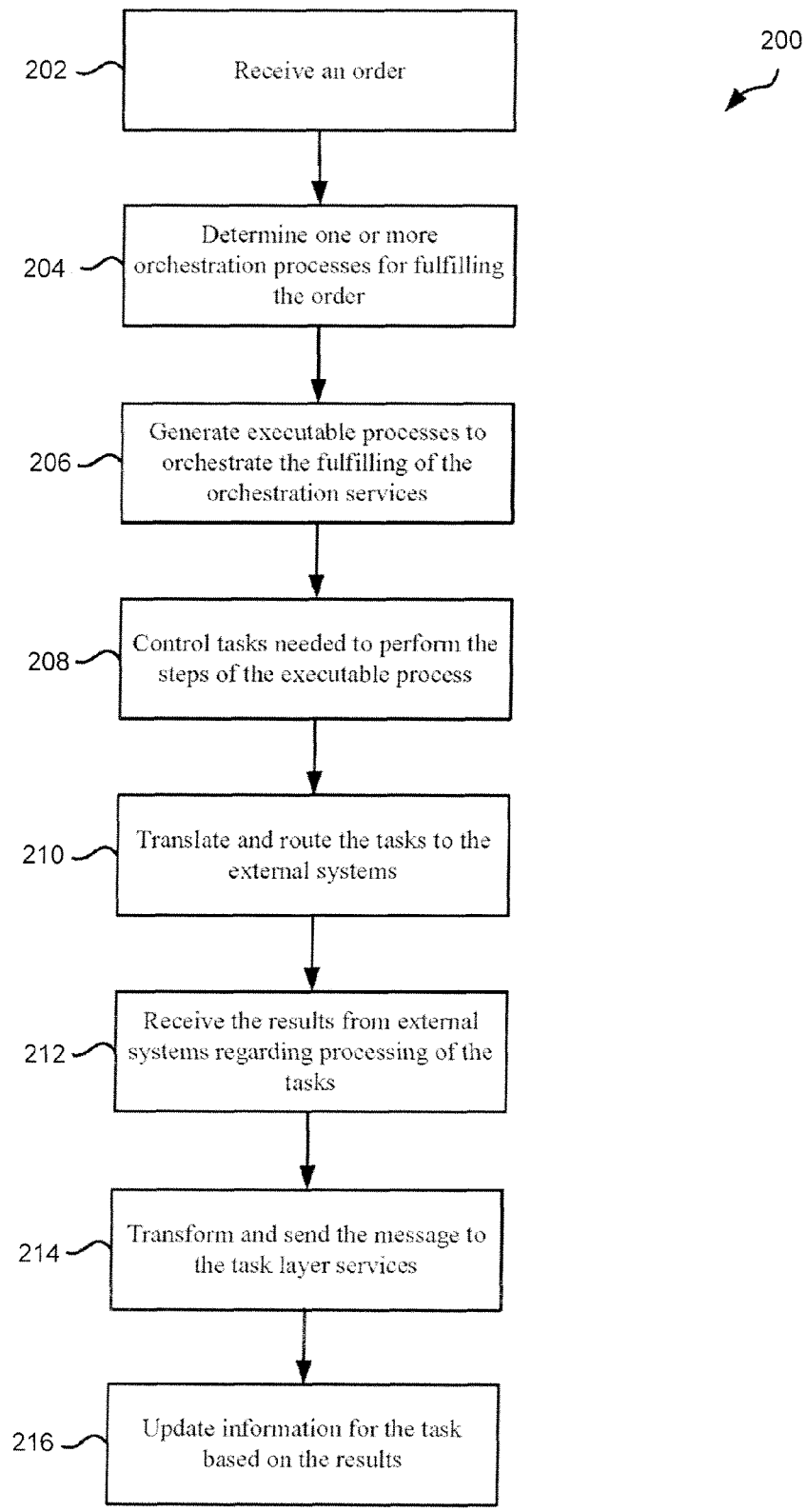
FIG. 2 illustrates a flowchart for processing an order according to one embodiment.

FIG. 2 depicts a simplified flowchart 200 for processing an order according to one embodiment. In step 202, decomposition layer 120 receives an order. In step 204, decomposition layer 120 determines one or more orchestration processes for fulfilling the order. For example, the order may be decomposed into items that need to be procured or services that need to be performed. Each item or service may have its own orchestration service.

In step 206, orchestration layer 130 generates executable processes to orchestrate the fulfilling of the orchestration services. The executable processes may have multiple steps that need to be performed for each orchestration service.

In step 208, task layer services 140 controls business functions needed to perform the steps of the executable process. Tasks to be performed for the executable process may include setting up a data structure with information and parameters that are needed to have external systems perform the tasks. The data structure may be in an internal format for system 100. For example, the task may be invoicing for an order. Parameters for performing the task are also included.

In step 210, external interface layer translates and routes the tasks to the external systems. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

In step 212, external interface layer 150 receives the results from external systems regarding processing of the tasks. When the task is performed, the result of the task is determined. The result may be a date when a shipment is scheduled, a date when a good is shipped, etc.

In step 214, external interface layer 150 transforms and sends the message to the task layer services 140. In step 216, orchestration layer updates information for the task based on the results. For example, the results may be stored in a table or database. The process then continues to the next service that can be invoked.

Further implementation details of orchestration are now described in relation to FIGS. 3-8, and in accordance with an embodiment of orchestration that utilizes a flow sequencer. However, one of ordinary skill in the art will readily appreciate that further details are merely an example of orchestration, and that orchestration may be implemented in many different embodiments, including alternative embodiments that do not utilize a flow sequencer. For example, orchestration may be implemented according to the details described in U.S. patent application Ser. No. 12/697,756, entitled "ORCHESTRATION OF BUSINESS PROCESSES USING TEMPLATES."

Figure 3:
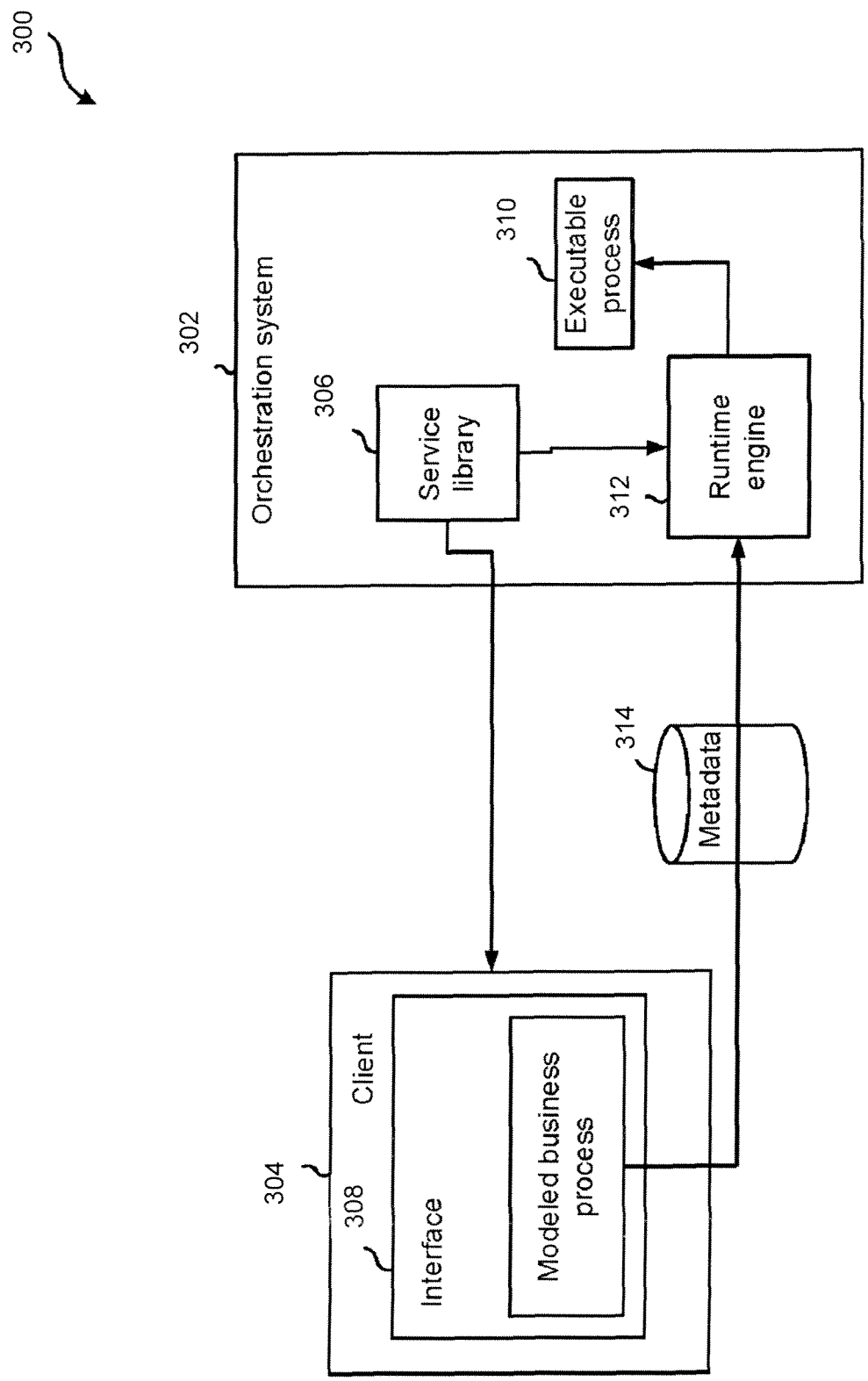
FIG. 3 illustrates an example of a system for providing an orchestration process design and authoring environment in a context of order fulfillment according to one embodiment.

FIG. 3 illustrates a system 300 for providing an orchestration process design and authoring environment in a context of order fulfillment according to one embodiment. In the embodiment, system 300 includes an orchestration system 302 and a client 304. Although single instances of orchestration system 302 and client 304 are provided, it will be understood that multiple instances may be used. Also, orchestration system 302 and client 304 may be part of a distributed computing system. That is, functions described may be distributed among various computing devices.

Client 304 may be a computing device or set of computing devices that are configured to allow a business process to be modeled. Orchestration system 302 orchestrates the invocation and running of services for an executable process 310 for the business process. Orchestration, as described, is the coordination and invoking of services that need to be performed in the business process.

As used, a business process may be modeled by a user. The business process is a definition of steps to be performed. The steps are defined in interface 308. An executable process is the process that is executed by run-time engine 312. The executable process includes code that is executed to coordinate performing of services.

A service library 306 that includes multiple services that can be included in a business process. In one embodiment, a service library 306 includes services that can be performed in an order fulfillment business process. Order fulfillment involves processes that are performed to fulfill an order. For example, an order may be received from an order capture module. The order may be for a good, service, etc. Different services may be performed to fulfill the order, such as shipment, installation, invoicing, etc. The order fulfillment process may be characterized in these different services. It is expected for any given order, some or all of these processes may need to be performed to fulfill the order. Accordingly, particular embodiments create services for the services that are expected to be performed in an order fulfillment process.

Services may be non-configurable units and configurable units. Nonconfigurable units are services that are built and provided to customers. The nonconfigurable units are units that likely may be used in an order fulfillment process. For example, it is expected that different services may have to be performed in the order fulfillment process, such as account receivable. Accordingly, these services may be modeled using a language, such as BPEL. Although BPEL is described, one of ordinary skill in the art would readily understand that other languages may be used.

Configurable units are services that are built and defined by a customer. For example, a wrapper is provided around a service that is configured by a user. For example, a customer may want a shipping service that is specific to the customer's company. Accordingly, the service performed by the configurable unit may be defined and built by a customer, but the wrapper allows runtime engine 312 to invoke the service automatically. This allows customers to define services that are needed for their individual organizations.

The services may be re-used in different business processes. The services are encapsulated and configured to receive a common signature for the service to be performed. For example, for each business process, different parameters may be provided (i.e., different products may be ordered for different prices, etc.). This causes different input arguments to be inputted into the service. The common signature defines a data structure that allows the service to be re-used for different executable processes 310. Thus, the same deployed service is used to process different input arguments for the different orders, but different results may be obtained. In this way, the order fulfillment process can be abstracted. Different users can define which services need to be performed without regard to how the processes are coded in an orchestration language.

Interface 308 may be an administration user interface. For example, a graphical user interface allows a user to model a business process at an abstract level. For example, service library 306 may be provided to client 304. The user may then use interface 308 to define steps of the business process using services in service library 306. A user may define a plurality of steps in the business process. Each step may be associated with a service in service library 306. The steps may be stored in a data table, which may include metadata that may be used by runtime engine 312 to orchestrate executable process 310. The data table is shown as being stored in storage 314. It will be understood that the data table may be stored in any area, such as in client 304, orchestration system 302, or any other device. The metadata may be defined by the user, determined from data tables, and/or orchestration rules. The user defines the sequence in which the services are to be invoked as well as conditional or parallel branching that may be required to affect the business processing rules. When the user selects a service for a process step, the user also provides additional metadata that is used to determine how the processing data is to be executed during the processing of an order at runtime. For example, conditional or parallel branching is defined.

At runtime, runtime engine 312 receives the metadata and uses it to determine parameters for the orchestration of executable process 310. Runtime engine 312 uses the parameters to determine which steps to perform and when to perform them in executable process 310. For example, runtime engine 312 orchestrates executable process 310 by invoking services in the series of steps that have been defined by the user. As will be described in more detail below, parallel and conditional processing of steps can also be performed. Also, the metadata can be used to determine the input arguments used to invoke the services.

The metadata for the table is read at runtime and services are invoked, which allows changes to executable process 310 to be performed and realized at runtime automatically. Runtime engine 312 reads through each step that is defined and performs the steps. If a change in service is desired, the user may use interface 308 to add/delete/replace a service. At run-time, when the table is read, the change may be automatically performed.

Figure 4:
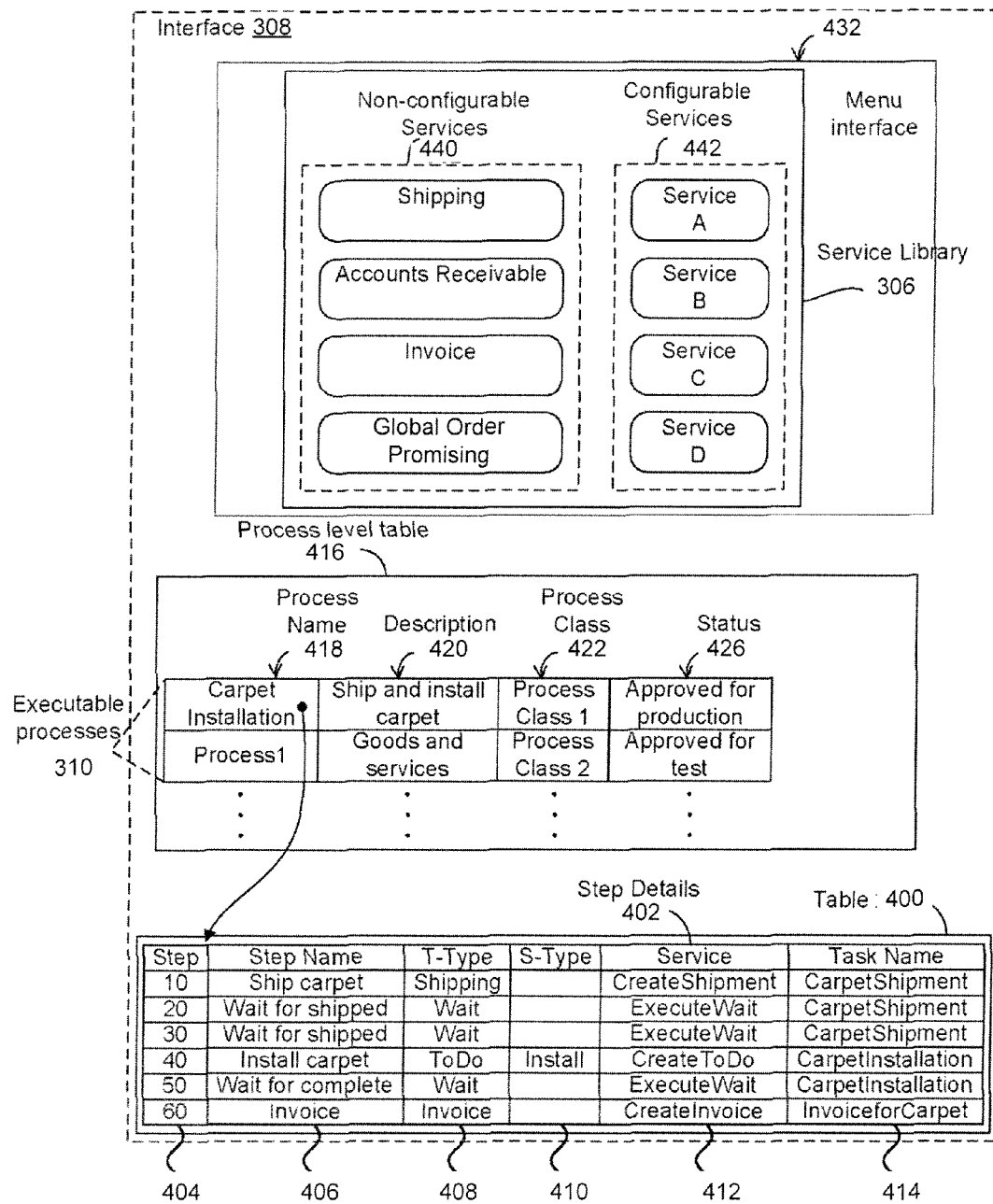
FIG. 4 illustrates an example of an interface according to one embodiment.

FIG. 4 illustrates an example of an interface 308 according to one embodiment. Process level table 416 summarizes different business processes that have been modeled. As shown, the business processes—Carpet Installation and Process 1—have been modeled by a user.

In process level table 416, a process name column 418 shows business processes carpet installation business process and process 1 have been modeled. A description column 420 describes the process. A process class column 422 describes the class of the process. A status column 426 is the status of the executable process. There may be different statuses of executable processes 310. For example, some business processes may be approved for production, approved for test, or may be new. Approved for production means that the service is approved for regular business use, approved for test is approved for testing, and new is a service in development.

A business process in table 416 can be selected and data table 400 may show the step details for individual business processes. One business process is entitled Carpet Installation and a data table 400 of step details shows each service that has been defined for the Carpet Installation.

In data table 400, a step column 404 identifies the steps in the business process. For example, steps 10-60 are provided. Services for these steps may be performed at runtime. The steps may be run in sequence from top to bottom (or in any other order). In this case, a step 10 is performed and when finished, a step 20 is performed, and so on. Additionally, although not shown, conditional and parallel steps may also be defined using interface 308. Conditional steps are steps that depend on a result occurring (e.g., another step finishing) and parallel steps are performed in parallel. A user defines whether steps should be conditional or parallel.

Step name column 406 provides a descriptive name for the steps. For example, ship carpet, wait for shipped, install carpet, wait for complete, and invoice steps are provided.

A task type column 408 describes what type of task is being performed. For example, for the ship carpet task, an external system may perform a shipping task and for the invoice step, an invoice system may invoice for a bill.

A service column 412 identifies the service associated with the step. A task name column 414 is the name of the task. For example, those tasks have to do with carpet and are named carpet shipment, carpet installation, and invoice for carpet. If something other than a carpet is being installed, the task name will be different. For example, a sink shipment, sink installation, and invoice for sink may be the names of these tasks.

Users may use interface 308 to generate data table 400. A user may select services from a menu for service library 306. For example, a user uses a menu interface 432 to select services from service library 306. Drop-down menus, drag-and-drop options, and other visual processes may be used to define executable process 310. Users are provided with an orchestration-specific interface that presents the business process data with suitable validations, rather than being required to learn the complexities of a multipurpose IT development environment. This allows a user to model a business process in an abstract manner, but have executable process 310 be generated and executed from the model.

The services in service library 306 may be made up of non-configurable units and configurable units. For example, non-configurable units are provided in a column 440 and configurable units are provided in a column 442. As shown, services that are non-configurable include shipping, accounts receivable ("AR"), invoice, and global order promising ("GOP"). Also, configurable units are designated as A, B, C, and D. Table 400 is generated as shown in interface 308 using menu 412. Table 400 is associated with metadata that describes the services to be performed and any arguments that are needed to invoke the services.

Figure 5:
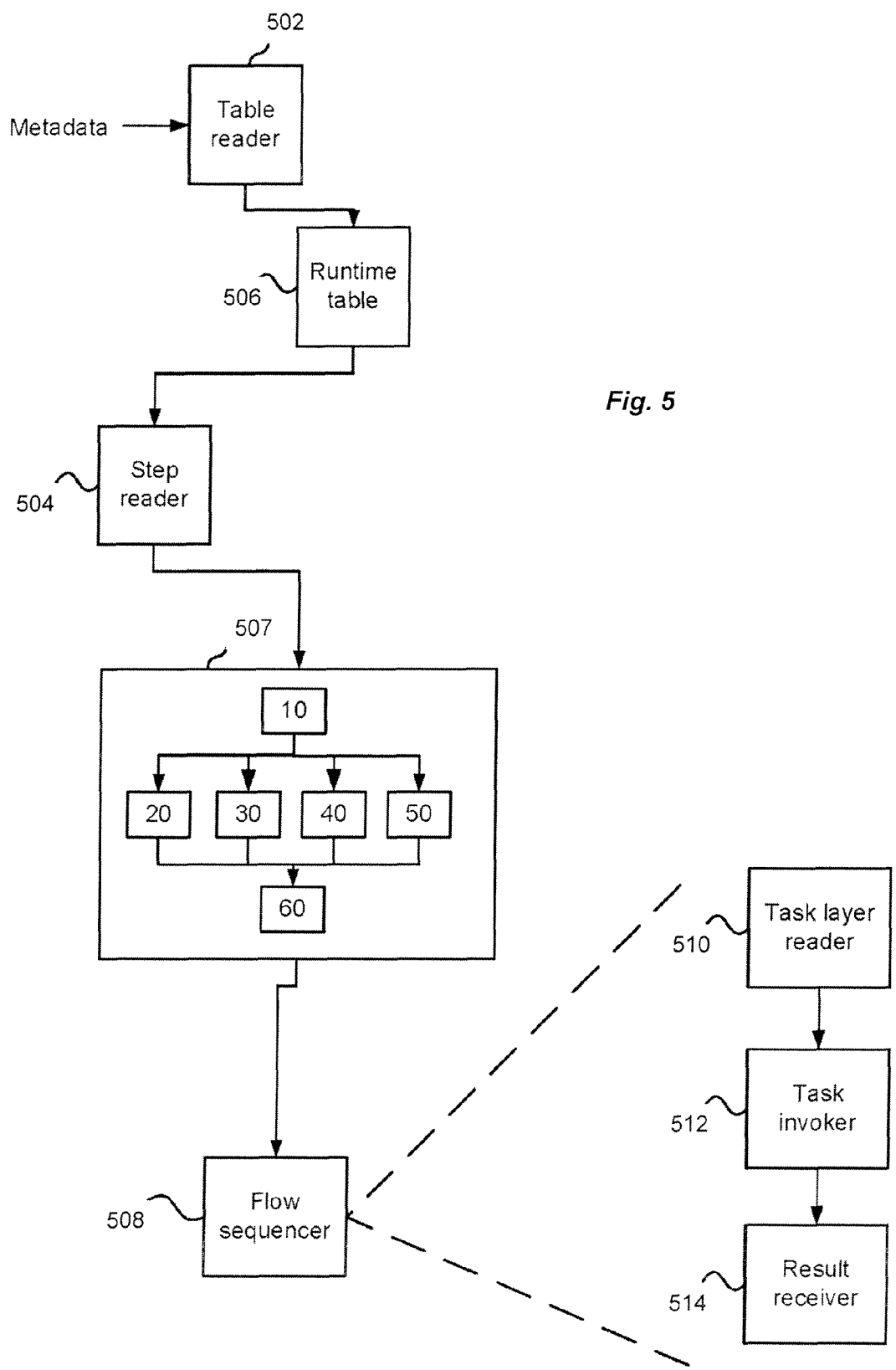
FIG. 5 illustrates the runtime operation according to one embodiment.

Once the business process is modeled in interface 308 and released by setting the process status, runtime engine 312 is used to orchestrate the invocation of the services. FIG. 5 illustrates the runtime operation according to one embodiment. In the embodiment, a table reader 502 receives metadata from interface 308 defining the business process. Table reader 502 may copy the data to a runtime table 506 but this is not necessary.

During run-time, a step reader 504 is configured to read the steps in runtime table 506, according to the embodiment. Step reader 504 may analyze the metadata and determine which steps should be executed and when. For example, step reader 504 checks to see if parallel or conditional branching is associated with a step. The metadata is also used to determine input arguments for the services. The input arguments may be determined from the metadata, from data in lookup tables, or determined using rules.

Step reader 504 may assemble executable process 310 using encapsulated services from service 306 and the metadata, according to the embodiment. For example, code for each service that was modeled in the steps is determined for executable process 310. The input arguments for each service are also determined. For example, the metadata is used to determine the input arguments such that the services can process an order for the business process. Also, any partner links are determined using the metadata to allow the services to interact with external systems. Executable process 310 is assembled based on the definition of steps in the business process. Because services are reusable, the same code for a service can be used for different business processes. However, the input arguments or partner links may be different. Because the same code is re-used, automatic assembly of executable process 310 is provided.

In the embodiment, a flow sequencer 508 is used to dynamically invoke the steps at the appropriate time based on executable process 310. As shown in box 507, a step 10 may determine a service to invoke. One of steps 20, 30, 40, and 50 are then performed. Step 60 then determines if other steps need to be performed. In this case, one of the other steps in 20, 30, 40, and 50 could be performed. Flow sequencer 508 may determine relevant input arguments depending on the content of the metadata received. These input arguments are then used to invoke a service. For example, flow sequencer 508 may include a task layer reader 510 that determines a service to invoke. A task invoker 512 then dynamically invokes the service. Any input arguments are used to invoke the service. In invoking the service, code for the encapsulated service is executed to coordinate performing of the service. For example, the executed code may prepare and send a message to an external system to perform the service.

The service may then be performed and the result is received at result receiver 514. In one example, if the task is shipping, then a shipping service generates a message for a shipping system regarding the shipping of a good. Once the shipping system ships the good, a message is returned to the shipping service, which stores the result.

After receiving a result, it is then checked whether further sequences need to be performed. For example, a while activity module checks to see whether further services need to be processed. For example, the process may be returned to flow sequencer 508 to allow for dynamic invocation of other steps in the process. Also, the while activity module may wait until parallel branches are completed.

Accordingly, the information required to invoke the services is determined automatically based on the runtime table. In one example, in BPEL, necessary partner links for all invocations have been created and are used to invoke the services. The services represented in the BPEL partner links are deployed BPEL processes that require no further configuration in order to be used in multiple business process definitions. When a service is invoked by the runtime engine, the corresponding partner link is accessed in the underlying BPEL process. Assembly of a service and modification of any service take place through the use of the metadata found in the runtime table and may be managed through interface 308.

Accordingly, a user can set up the steps in a business process. Executable process 310 can be automatically assembled at run-time. The code used in executable process 310 is not generated by the user who set up the business process. Rather, metadata can be defined and is used to assemble encapsulated services for executable process 310.

Figure 6:
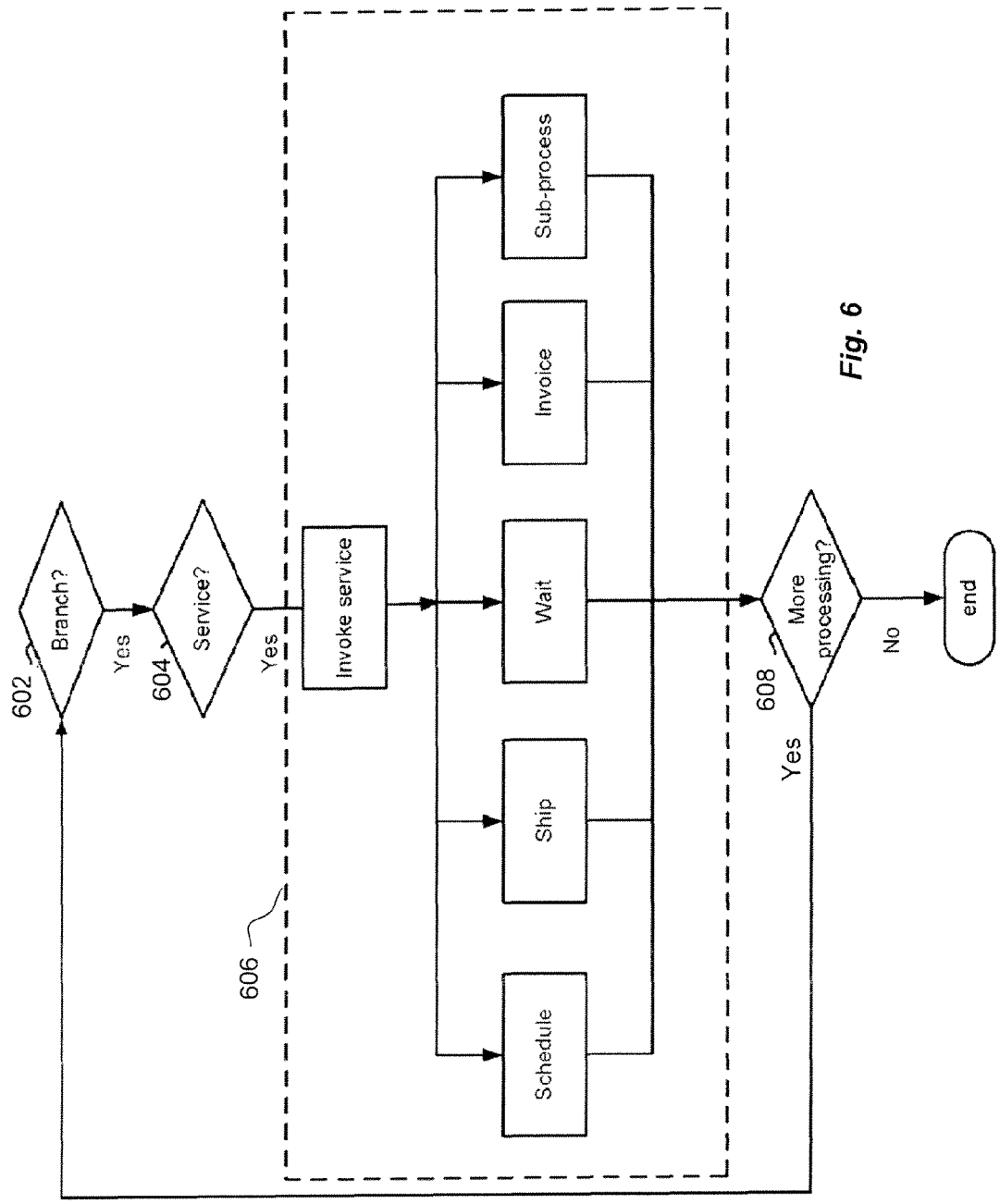
FIG. 6 illustrates an example of invocation of services using a flow sequencer according to one embodiment.

FIG. 6 illustrates an example of invocation of services using flow sequencer 508 according to one embodiment. At step 602, according to the embodiment, it is determined if branching is needed. If a conditional statement is encountered, the process proceeds down the appropriate branch based on which condition is satisfied. If parallel branching is encountered, parallel flow sequence instances are spawned to carry out the additional branches. The branching is determined and used later in invoking services. The process then proceeds to step 604 in which a service is determined.

Various services may then be performed. The steps include an invoke service step, schedule step, ship step, wait step, invoice step, and sub-process step. Identical processing sequences can flow in parallel until a unifying step is reached. Each flow sequence contains the same underlying coded process (such as a BPEL process), but different processing sequences can be used in different executable processes 310. That is, one sequence may contain Schedule, Ship, Invoice while another may contain Schedule, Activity, Ship, Activity, Invoice, although the runtime engine including the underlying coded processes do not change. That is, the code for each service that is invoked stays the same even though different executable processes are being run.

An external service invocation is contained in each branch of the flow sequencer, one branch for each service that can be invoked. The branch contains all the steps necessary to set up the data that should be included in the message to the specific external service and to format the response received from the service. Once a service is complete, the while activity module checks to see if there are further services to process and either returns to flow sequencer 508, continues to the next step in the process or waits until any parallel branches are complete.

Box 606 shows a conceptual execution of executable process 310. Not all steps may be run at once. For example, the invoke service is invoked for step 10 and determines a service to invoke. Once that is completed, step 608 determines if other steps need to be performed. In this case, step 604 determines the Schedule, Ship, Wait, Invoice, and subprocesses services should be performed. Once all the flows have been completed, a uniform set of results can be constructed. Based on the definition of the executable process, it is determined if additional processing should be performed. Different branches are performed where each branch invokes the associated service. Input arguments for the service are generated from the metadata in the runtime table. When the selected service has been performed, step 608 determines if additional services should be performed. If so, the process reiterates to step 602. If not, the process ends.

Figure 7:
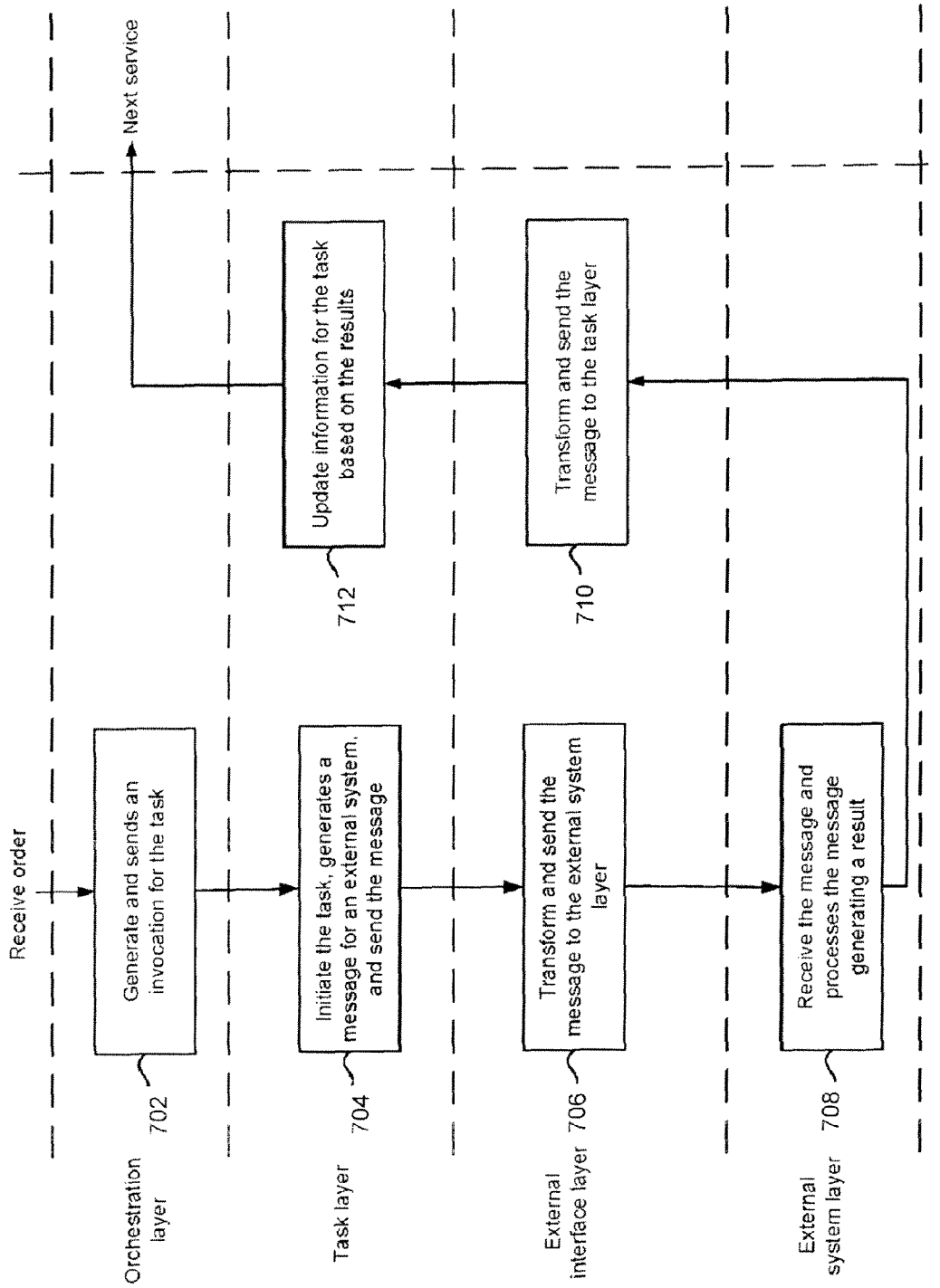
FIG. 7 illustrates a process for orchestration data flow among different layers according to one embodiment.

The orchestration of services is provided using information from table 400. However, in addition to orchestration, services need to communicate with external systems. FIG. 7 illustrates a process for orchestration data flow among different layers according to one embodiment. An orchestration layer, task layer, external interface layer, and external system layer is provided. In one embodiment, a decomposition layer (not shown) is provided before an orchestration layer.

Step 702 generates and sends an invocation for the task, according to the embodiment. An order may be received from an order capture module. This may cause a task to be invoked. The invocation request is generated using data found in the runtime table. The request is sent to the task layer.

Step 704 initiates the task, generates a message for an external system, and sends the message, according to the embodiment. The message generated indicates which task should be performed by the external system. The task to be performed is an aspect of order processing that has been modeled. For example, the task may be invoicing for an order. Parameters for performing the task are also included. The message is sent to an external interface.

Step 706 transforms and sends the message to the external system layer, according to the embodiment. The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

Step 708 receives the message returned by the external system and processes the message generating a result, according to the embodiment. The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to the external interface layer.

In the embodiment, step 710 transforms and sends the message to the task layer. Step 712 updates information for the task based on the results. For example, the results may be stored in a table or database. The process then continues to the next service that can be invoked.

By using encapsulated services that are defined using interface 308, changes can be made to an executable process 310 and implemented at runtime. For example, alterations to the metadata during the running of the process can influence the sequence of steps taken as well as the input arguments of the individual steps.

Figure 8:
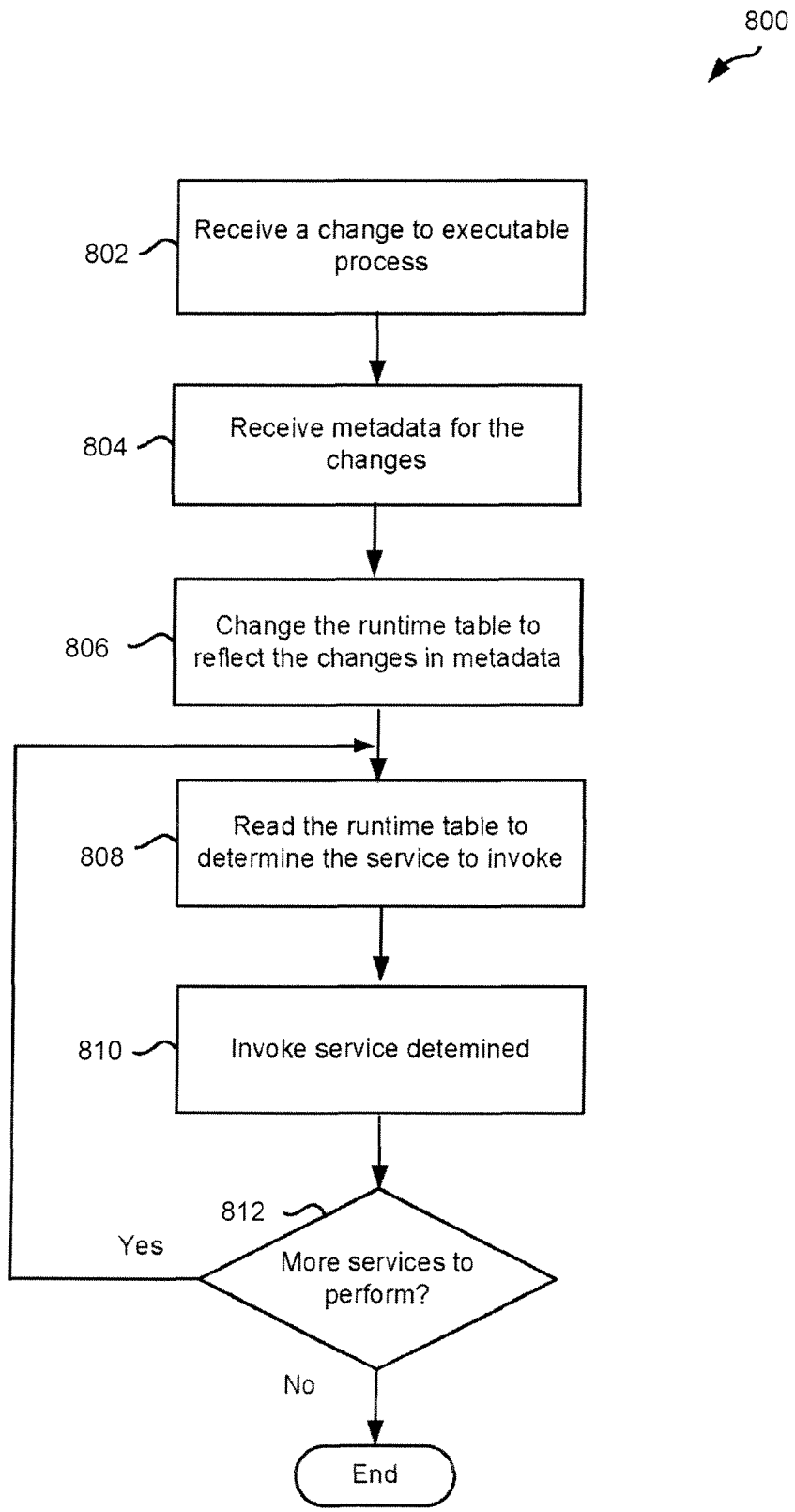
FIG. 8 illustrates a flowchart of a method for changing an executable process according to one embodiment.

FIG. 8 illustrates a flowchart 800 of a method for changing a business process according to one embodiment. In one embodiment, the functionality of flowchart 800 of FIG. 8, as well as the functionality of other flowcharts illustrated in the Figures, is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

Step 802 receives a change to the business process. For example, interface 308 is used to change the business process to include different steps. In one example, steps may be replaced, steps may be deleted, or steps may be added.

Step 804 receives metadata for the changes. For example, runtime engine 312 may receive the changed metadata. Step 806 then changes the runtime table to reflect the changes in metadata. For example, executable process 310 may be changed to include different services to invoke.

When a service is to be invoked, step 808 reads the runtime table to determine the service to invoke. For example, step reader 504 may be reading the table during the processing of executable process 310. If the runtime table has been changed, step reader 504 determines the next step that needs to be performed based on the changes.

Step 810 then invokes the service determined. Because services can be called based on different input arguments, additional programming to re-deploy the new service is not needed when services in the business process are changed. Rather, the table may just be changed and different service can be automatically invoked.

Step 812 then determines if more services need to be performed. If so, the process reiterates to step 806 where the table is read again to determine the next step to perform. If not, the process ends.

Accordingly, data-driven orchestration provides abstraction and flexibility. The abstraction refers to the web-based administration of process metadata that defines the process steps in an executable process. Process code is re-used across different business processes. Flexibility refers to the ability to modify the processes without re-deployment of code. The use of changes to runtime metadata facilitates changes to executable process 310. Abstraction brings the process model closer to the business user and reduces administrative costs. Flexibility allows a business user to respond to change, such as the modification of process specifications when business processes or rules change.

Figure 9:
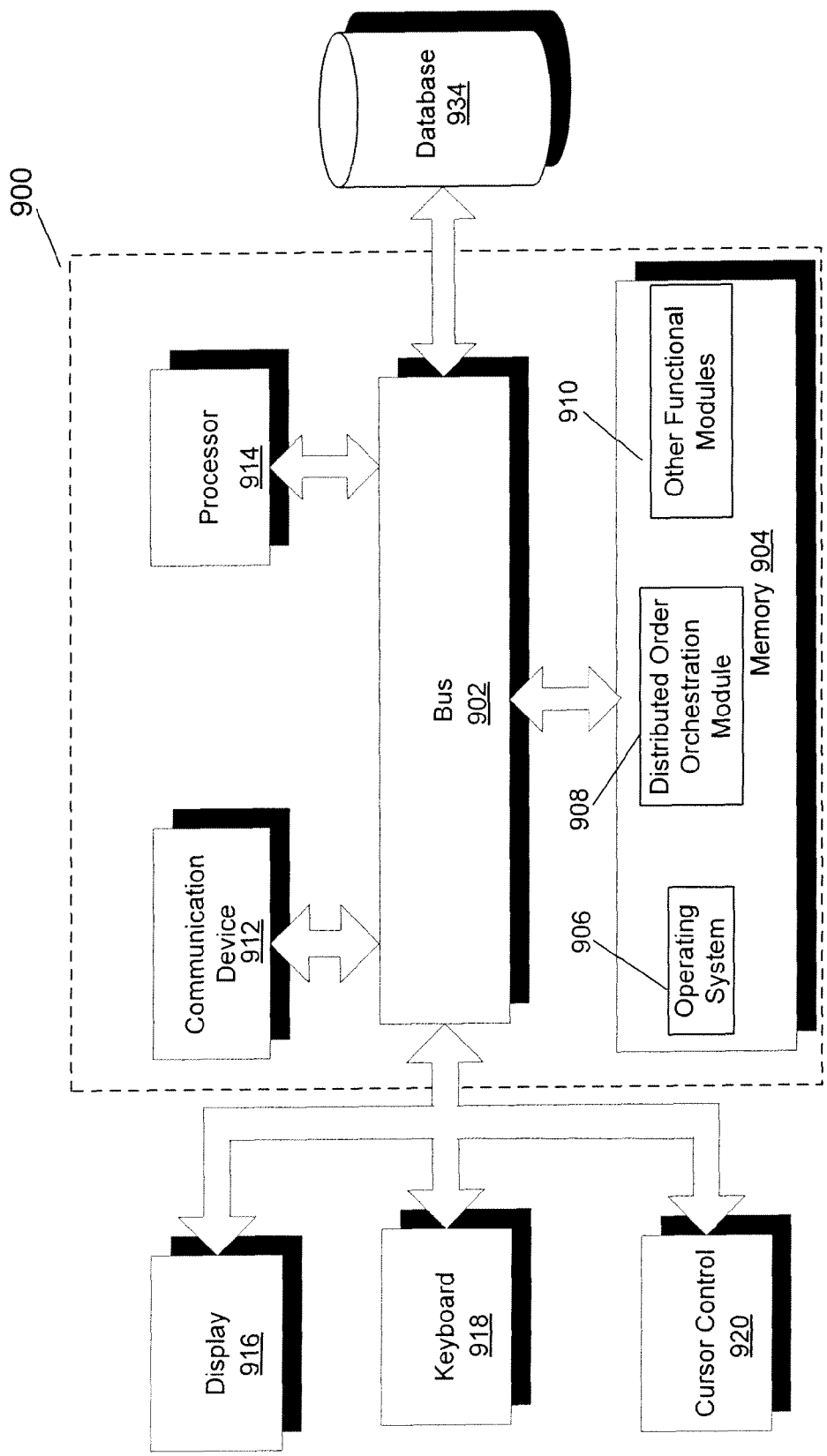
FIG. 9 illustrates a block diagram of a system that may implement an embodiment of the present invention.

FIG. 9 illustrates a block diagram of a system 900 that may implement one embodiment of the invention. In an embodiment of the invention, system 900 of FIG. 9 corresponds to orchestration system 302 of FIG. 3. System 900 includes a bus 902 or other communications mechanism for communicating information between components of system 900. System 900 also includes a processor 914, operatively coupled to bus 902, for processing information and executing instructions or operations. Processor 914 may be any type of general or specific purpose processor. System 900 further includes a memory 904 for storing information and instructions to be executed by processor 914. Memory 904 can be comprised of any combination of random access memory ("RAM"), read only memory ("ROM"), static storage such as a magnetic or optical disk, or any other type of machine or computer-readable medium. System 900 further includes a communication device 912, such as a network interface card or other communications interface, to provide access to a network. As a result, a user may interface with system 900 directly or remotely through a network or any other method. In an embodiment of the invention, a user may interface with system 900 through a client, such as client 304 illustrated in FIG. 3.

A computer-readable medium may be any available medium that can be accessed by processor 914. Computer-readable medium may include both volatile and nonvolatile media, removable and non-removable media, communication media, and storage media. Communication media may include computer readable instructions, data structures, program modules or other data in a modulated data signal such as a carrier wave or other transport mechanism, and may include any information delivery media. Storage media may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 914 can also be operatively coupled via bus 902 to a display 916, such as a Liquid Crystal Display ("LCD"). Display 916 can display information to the user. A keyboard 918 and a cursor control device 920, such as a computer mouse, can also be operatively coupled to bus 902 to enable the user to interface with system 900.

According to one embodiment, memory 904 can store software modules that may provide functionality when executed by processor 914. The modules can include an operating system 906, a distributed order orchestration module 908, as well as other functional modules 910. Operating system 906 can provide an operating system functionality for system 900. Distributed order orchestration module 908 performs orchestration of a business process, as described above and further described below. System 900 can also be part of a larger system. Thus, system 900 can include one or more additional functional modules 910 to include the additional functionality. For example, functional modules 910 may include middleware modules that are part of the "Fusion" product from Oracle Corporation.

Processor 914 can also be operatively coupled via bus 902 to a database 934. Database 934 can store data in an integrated collection of logically-related records or files. Database 934 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 10:
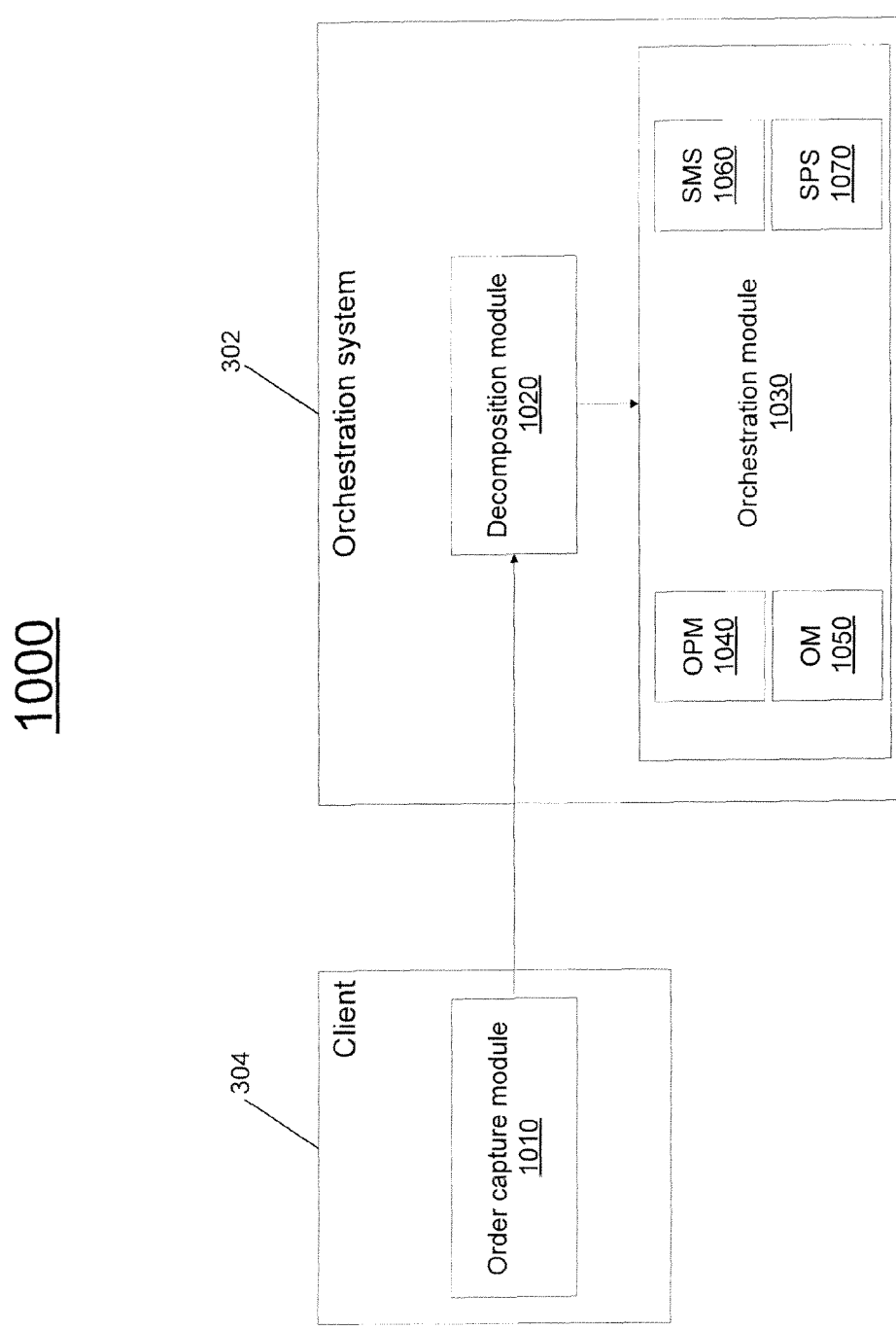
FIG. 10 illustrates a distributed order orchestration system according to one embodiment.

FIG. 10 illustrates a distributed order orchestration system 1000 which is capable of processing change requests according to one embodiment. In an embodiment of the invention, system 1000 corresponds to system 300 of FIG. 3 and only the portions of system 300 relevant to the discussion have been included in system 1000. All other portions of system 300 have been omitted for clarity purposes.

In the embodiment illustrated in FIG. 10, distributed order orchestration module 908 of FIG. 9 is represented as two modules: a decomposition module 1020 and an orchestration module 1030. However, one of ordinary skill in the art would readily recognize that a single module may provide the functionality of decomposition module 1020 and orchestration module 1030, and still be within the scope of the invention. Furthermore, distributed order orchestration module 908 of FIG. 9 may be represented as any number of modules and still be within the scope of the invention.

An exemplary embodiment of orchestration will now be described in relation to decomposition module 1020 and orchestration module 1030 illustrated in FIG. 10. However, one of ordinary skill in the art will readily appreciate that the described embodiment is merely an exemplary embodiment, and that orchestration may be implemented according to alternative embodiments and still be within the scope of the invention.

Decomposition is the conversion of data received from one or more order capture modules into an internal canonical format in order to process the data. As described above, orchestration is the coordination and invoking of services that need to be performed in the business process.

In an embodiment, decomposition module 1020 receives orders from one or more order capture modules, and acts as a mediator between the one or more order capture modules and orchestration module 1030. An order capture module is capable of capturing orders across multiple channels. In the illustrated embodiment, an order capture module is represented by order capture module 1010. In an embodiment of the invention, order capture module 1010 may capture information entered by a user via interface 308 of FIG. 3. However, one of ordinary skill in the art would readily understand that order capture module 1010 make take other forms and still be within the scope of the invention.

According to the embodiment, decomposition module 1020 is also responsible for translating and decomposing an object sent from order capture module 1010, where the object represents a order. Using the output from the translation and the decomposition, decomposition module 1020 creates a distributed order orchestration order ("DOO order") to be sent to orchestration module 1030. A DOO order is an object that represents an order received from an order capture module, and that has been transferred into an object format utilized by an orchestration system. Thus, a reference to an "order" is a reference to the business order that is entered by a user in an order capture system, whereas a reference to a "DOO order" is a reference to an entity created and implemented by an orchestration system in order to represent a business order entered by a user.

The DOO order is capable of including a distributed order orchestration header ("header"). A header is an object that contains the entire hierarchy of the order. The DOO order is capable of including one or more groups, where a group is an entity used to collect distributed order orchestration order lines ("lines") for processing in a single instance of an orchestration process. Each group is capable of including one or more lines. A line is an object that contains the information of the corresponding line of the order. Each line is capable of including one or more distributed order orchestration fulfillment lines ("fulfillment lines"). A fulfillment line is an object that corresponds to a supply action of a corresponding fulfillment system which is capable of processing the order line. Thus, a fulfillment line is a supply line that fulfills the corresponding fulfillment task.

In an embodiment of the invention, the creation of an order by decomposition module 1020 involves the following steps. First, a header is created. Next, one or more lines are created and associated with the header. Subsequently, for each line, one or more fulfillment lines are created, where a fulfillment line may be only associated with one line. Next, a service is invoked that assigns a separate executable process for each line. However, in certain embodiments of the invention, the step of assigning a separate executable process for each line is omitted, and a single executable process is used to process the entire DOO order. In either scenario, decomposition module 1020 selects an executable process based on the name and creation date of the executable process.

Finally, according to the embodiment, decomposition module 1020 saves the state of the DOO order.

Orchestration module 1030 controls the sequences of events that occur while processing and fulfilling DOO orders created by decomposition module 1020 through the creation of executable processes. In the embodiment illustrated in FIG. 10, orchestration module 1030 comprises a sub-module Order Process Manager ("OPM") 1040, and three core processes Orchestration Manager ("OM") 1050, Step Manager Service ("SMS") 1060, and Split Process Manager ("SPM") 1070. However, one of ordinary skill in the art would readily appreciate that this is an example, and that orchestration module 1030 may contain any number of sub-modules and processes, and still be within the scope of the invention.

According to the embodiment, decomposition module 1020 invokes OPM 1040 of orchestration module 1030 by passing in the header identity of the DOO order. OPM 1040 is capable of launching one or more executable processes, and is also capable of interacting with, and controlling, the one or more executable processes. OM 1050, SMS 1060, and SPM 1070 are the core modules that make up an executable process which controls a sequence of events that can occur while processing and fulfilling DOO orders created by decomposition module 1020. OM 1050 is invoked by OPM 1040, and is capable of executing process steps for a given group. SMS 1060 is invoked by OM 1050 and is capable of encapsulating business logic for pre-processing, error handling, and change management. SPM 1070 is invoked by OM 1050 and is capable of handling split units. A split unit defines a sequential set of steps in an executable process that can be split together. For example, an executable process can include the steps of Schedule, Ship, and Invoice. In the example, a split unit may be defined which includes the Schedule and Ship steps, but does not include the Invoice step. Based on this split unit definition, in a scenario where the executable process splits, the resulting Split steps can proceed in parallel, and only when both steps are completed can the Invoice step be invoked.

In the embodiment, OPM 1040 determines an appropriate executable process to orchestrate the DOO order. For each group in the DOO order, OPM 1040 determines the executable process by looking up a group table and subsequently launching the executable process for that group. Prior to launching the executable process, OPM 1040 invokes a service to assemble the executable process, if the executable process does not already exist. In an embodiment of the invention, OPM 1040 is also capable of querying a list of task services to be performed at header level and perform them in a sequence defined by the user.

OM 1050 is an example of the previously-identified executable process whose life cycle begins when OPM 1040 invokes it asynchronously. OM 1050 terminates when it has executed all its process steps. According to the embodiment, OM 1050 is responsible for initiating the invocation of a task layer service as defined by the business process. Furthermore, OM 1050 has logic to differentiate between split units and non-split units. For split units, OM 1050 can initiate the invocation of SPM 1070, which handles the split units.

SMS 1060 is also invoked by OM 1050. While OM 1050 acts as a process orchestration engine, SM 1060 functions as a step orchestration engine. Specifically, in the embodiment, SMS 1060 accepts requests from OM 1050, retrieves runtime information for each step, marks the step status as "started," sends the request to the task layer, process the response from the task layer, and finally sends back the control to OM 1050.

Change Management Framework

As previously described, the elemental core of distributed order orchestration functionality is that it uses an orchestration process for orchestrating an order. The orchestration process controls the sequence of events that can occur while processing and fulfilling orders.

As also previously described, business processes can be long-running processes that consist of several business steps. A business step, in one embodiment, is always defined by a user and represents a step in the business flow. A business step in a distributed order orchestration business process involves either a task layer service, or a sub-process. A business step cannot participate in a process transaction because it cannot be undone automatically if the process transaction rolls back.

One of the key requirements of the core functionality is to manage change requests while processing and fulfilling orders. A change request comprises a new order that references the original order. The new order also comprises modifications to the original order, and thus, comprises modifications to business steps that comprise a business process. Therefore, a change request may cause significant alteration to the business process (and thus, the corresponding executable process) that is currently underway. A process transaction is insufficient to process change requests because several of the business steps of a business process interact with external fulfillment systems, and thus, go beyond the transaction boundary. Therefore, these business steps require special logic to accommodate change requests.

According to an embodiment of the invention, the distributed order orchestration system is able to receive a change request and determine the modifications between an original order and a new order (also referred to as "a modified order"). The modifications between the original order and the new order can then be used to determine what business process changes are necessary to respond to the change request. Thus, the system is able to cope with cases where the steps of the new business process are in conflict with steps of the original business process that are underway or that have already been completed. In addition to automatically adjusting past business steps of the original business process, the distributed order orchestration system is able to incorporate changes to business steps that have yet to be executed.

It is important to note that orchestration language compensation (such as BPEL compensation) and distributed order orchestration change management are very different. BPEL compensation is used for rolling back the effect of the executed activities in the process because of error conditions in the executable processes. Distributed order orchestration change management not only involves undoing of previously-executed steps in the business process, but also includes the forward propagation of changes in the steps of a business process that have not yet been executed. In other words, the latter requires the capability to undo or redo previously-executed steps and to update steps that not yet been executed. Furthermore, the undoing of a previously-executed step may be more than just a rollback to a prior state. Instead, it may require an invocation of a service to take a suitable undo action.

In an embodiment of the invention, the change management framework is provided via a framework scope with nested functional scopes. The framework scope is responsible for performing the steps of the business process in regular mode or change mode. When an executable process of a distributed order orchestration system is run for the first time, the executable process is run in regular mode. In regular mode, the steps of the executable process are dynamically performed at the appropriate time, as previously discussed in a separate section. However, when a change request is received, the distributed order orchestration system stops the original executable process (and all of its child processes) and initiates a new executable process in change mode. In an embodiment, stopping the original executable process includes terminating the original executable process. However, in an alternative embodiment, stopping the original executable process includes pausing the original executable process, where the original executable process can be resumed at a later point in time. The new executable process correlates to the original executable process in order to allow change processing. In change mode, the appropriate change steps are performed to automatically adjust the steps of the original executable process that have already been executed. The change steps are performed using the previously-saved state of the original executable process. Once the change steps have been performed, the remaining steps of the new executable process are performed using the current state of the new executable process in regular mode. In an embodiment of the invention, an executable process can save the state of the process at every milestone. The saved state can be used in the change mode for undoing or redoing the steps of the executable process that were performed in regular mode.

Figure 11:
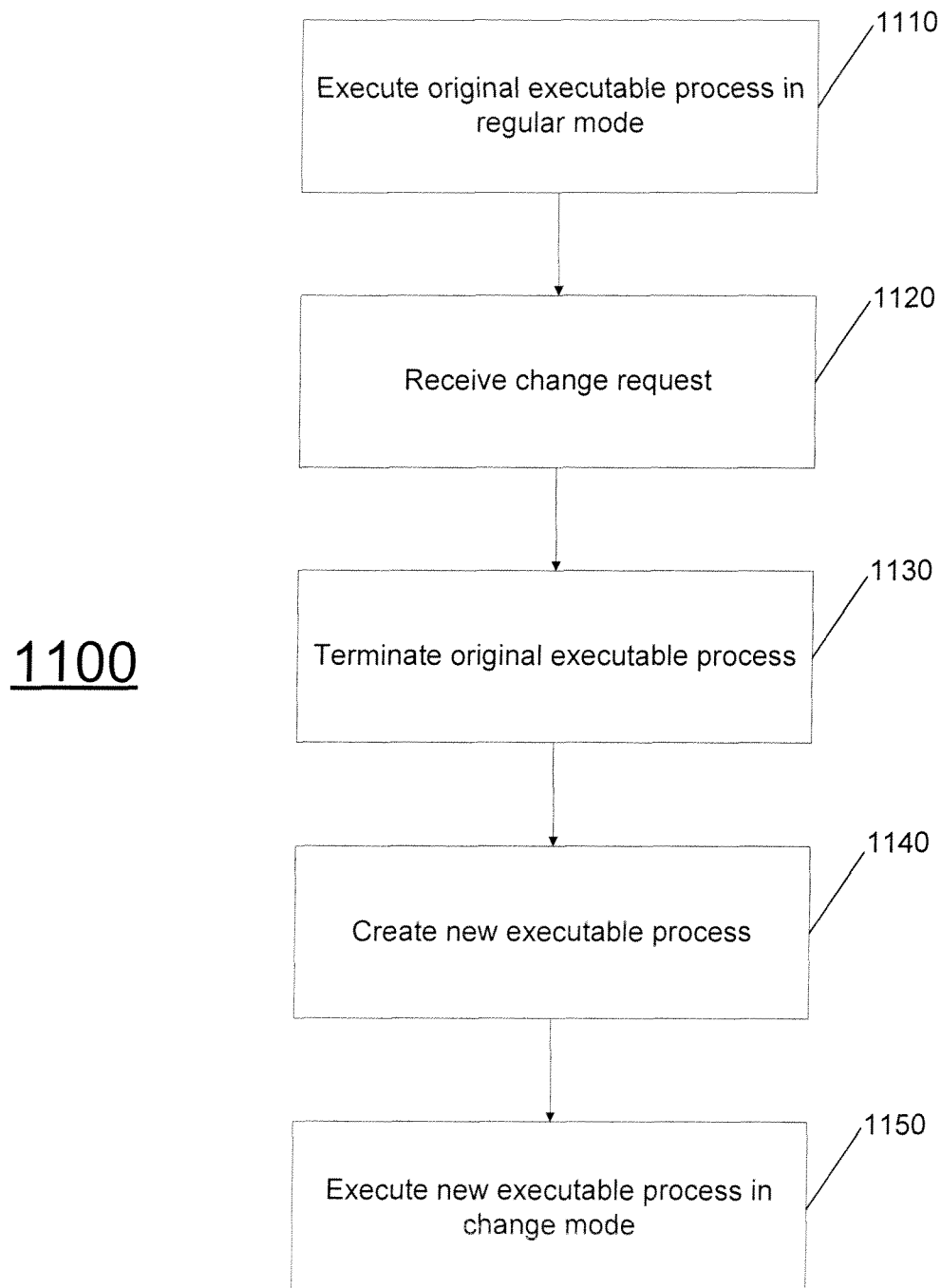
FIG. 11 illustrates a flowchart of a method for processing a change request according to one embodiment.

FIG. 11 illustrates a flowchart 1100 of a method of processing a change request, according to one embodiment of the invention. At 1110, an original executable process is executed in regular mode. As previously described, when an executable process is executed in regular mode, the executable process executes the steps which comprise the executable process and invokes the corresponding service for each step, as discussed in reference to FIG. 5.

At 1120, a change request is received. As discussed above, the change request comprises a new order captured by an order capture module that references an original order, where the new order comprises modifications to the original order. The change request is processed in the same way as an order is processed, as previously discussed above, and a new DOO order is created.

At 1130, the original executable process is stopped. The stopping of the original executable process may involve the stopping of any child processes that have been created by the original executable process. In an embodiment of the invention, the original executable process is terminated. In an alternative embodiment, the original executable process is merely paused. In this embodiment, the original executable process is capable of being resumed at a later point in time.

At 1140, a new executable process is created. More specifically, the executable process is created based on the new DOO order, which in turn, is based on the new order contained within the received change request.

At 1150, the new executable process is executed in change mode. When the new executable process is run in change mode, the executable process performs change steps to modify steps that were performed by the original executable process. The new executable process also performs the steps that were not performed by the original executable process using the differences between the original DOO order and the new DOO order.

Figure 12:
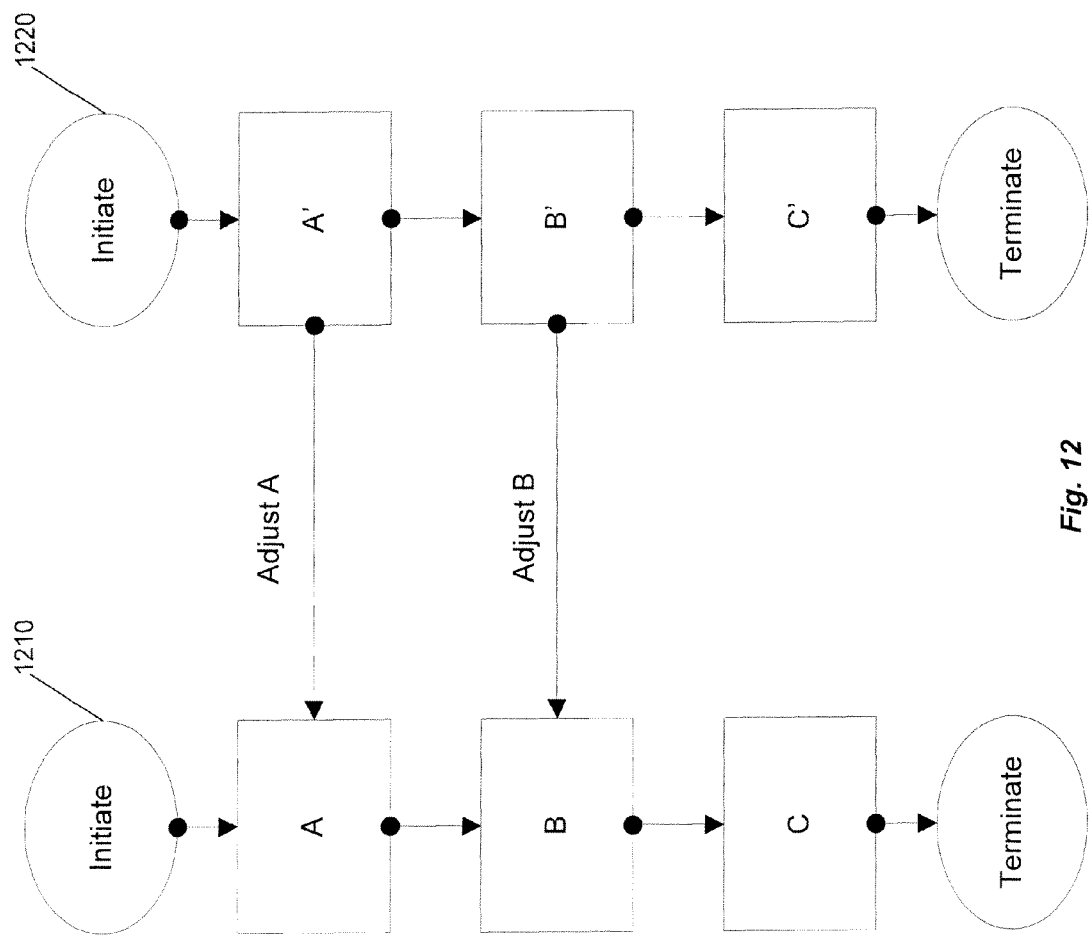
FIG. 12 illustrates an example of a change request flow according to one embodiment.

FIG. 12 illustrates a flowchart 1200 detailing an example of a change request flow according to one embodiment. In flowchart 1200, flow 1210 represents the flow of an original executable process. For example, the original executable process may correspond to a business process for ordering carpet. The original executable process performs steps A, B, and C. In the above example, step A comprises selecting the carpet from an inventory, step B comprises measuring the carpet according to requested dimensions, and step C comprises shipping the carpet.

In the embodiment, a change request (not shown) is received after step B has been completed, but before step C has been initiated, where the change request changes the carpet order to a tile order, where the process for ordering carpet and the process for ordering tiles use the same business process. Therefore, the original executable process is stopped, and a new executable process is initiated. In the above example, the new executable process corresponds to a business process for ordering tiles. In flowchart 1200, flow 1220 represents the flow of the new executable process. The new executable process performs steps A', B', and C'. Step A' comprises adjusting the already-completed step A. The adjustment of step A may take one of a number of forms depending on the underlying business process. In the illustrated example, the adjustment of step A may comprise adjusting the selection of a carpet from an inventory to the selection of tiles from an inventory. If the previously selected inventory does not included tiles, the adjustment may further comprise selecting a different inventory which does include tiles. Similarly, step B' comprises adjusting the already-completed step B, and may take one of a number of forms depending on the underlying business process. In the illustrated example, the adjustment of step B may comprise measuring the tile and replacing the measurement of the carpet with the measurement of the tile. Finally, step C' comprises the shipping of the tile. Because step C was never performed by the original executed process, an adjustment of step C is not required, and thus, is not performed. However, step C' is performed based on the new order, as opposed to the original order. Thus, in the illustrated example, step C' comprises shipping the tile, as opposed to shipping the carpet.

An exemplary embodiment of orchestration change management will now be described in relation to decomposition module 1020 and orchestration module 1030 illustrated in FIG. 10. However, one of ordinary skill in the art will readily appreciate that the described embodiment is merely an exemplary embodiment, and that orchestration change management may be implemented according to alternative embodiments and still be within the scope of the invention.

In an embodiment, decomposition module 1020 and orchestration module 1030 of FIG. 10 are capable of processing a request to change an order (i.e., a change request), as well as processing an order. In the event that an order capture module sends a change request, decomposition module 1020 can process the change request in the same way that decomposition module 1020 processes an original order, previously described with reference to FIG. 10, except for the following key differences.

First, according to the embodiment, decomposition module 1020 identifies that the new order received from an order capture module is not a genuine new order, but instead is part of a request to change an original order (i.e., a change request). Next, decomposition module 1020 checks to see if a change is allowed on the original order. The check comprises reviewing the status of the original order and the state of the corresponding executable process. If either the order status or the process state has a constraint that prevents change requests, then the change request is rejected. However, if a change is allowed, decomposition module 1020 notifies orchestration module 1030 to prepare for processing a change request. Next, decomposition module 1020 creates a new DOO order. The new DOO order references the original DOO order. Then, decomposition module 1020 correlates and maps the new DOO order with the original DOO order. Decomposition module 1020 also computes a delta between the new DOO order and the original DOO order. Finally, decomposition module 1020 sends the new DOO order to orchestration module 1030.

According to the embodiment, orchestration module 1030 is able to process change requests by having OPM 1040 listen for both change notifications and change requests. A change notification is merely a notification from the decomposition module to prepare for processing a change request, in contrast to the actual change request. In the event of a change request, OPM 1040 first receives a change notification, and subsequently receives the actual change request.

When OPM 1040 receives a change notification, according to the embodiment, OPM 1040 is capable of notifying each OM 1050 invoked by OPM 1040. Based on this notification, OM 1050 does not execute any new tasks. When OPM 1040 receives a change request, OPM 1040 is capable of determining if the current executable process can accept change requests. If the process cannot accept change requests, then OPM 1040 can reject the entire change request. If the process can accept change requests, OPM 1040 can process the change request as described below.

In processing the change request, according to the embodiment, OPM 1040 first invokes notification services that are registered as part of each step of the executable process to determine if each notification service can accept a change request. If any of the registered notification services indicate that they cannot accept a change request, OPM 1040 rejects the entire change request, and the change request processing ends.

However, if all of the registered notification services indicate that they can accept a change request, the change request processing continues. OPM 1040 then notifies the wait step associated with the executable process to stop. OPM 1040 then merges the new DOO order with the original DOO order, according to the embodiment.

In the embodiment, OPM 1040 then adjusts group information for the new DOO order. When decomposition module 1020 creates a new DOO order, decomposition module 1020 creates a new group for each line and fulfillment line of the new DOO order. Depending on whether or not each line and fulfillment line is new, OPM 1040 can adjust references keys, activate certain groups, and deactivate other groups.

In order to adjust group information according to one embodiment, for each line of the new DOO order, OPM 1040 determines whether the line existed in the original DOO order. If the line existed in the original DOO order, then OPM 1040 further determines if the line has changed in the new DOO order. If the line did not exist in the original DOO order, OPM 1040 activates the group that decomposition module 1020 created for the new line, and sets the attribute delta for the line. If the line did exist in the original order, and has not been changed in the new order, OPM 1040 continues to use the previous group from the original DOO order. If the line did exist in the original order, and has been changed in the new order, OPM 1040 activates the group that decomposition module 1020 created for the modified line, sets the attribute delta for the line, and deactivates the previous group created for the original order. OPM 1040 also performs these steps for each fulfillment line of the new DOO order.

However, in alternative embodiments, OPM 1040 can adjust group information based on different criteria and still be within the scope of the invention.

Subsequently, according to the embodiment, OPM 1040 processes a computed delta between an original DOO order, and a new DOO order. Once the delta is computed, OPM 1040 determines the delta type and performs one of the following set of actions.

If the delta type is an add line delta (i.e., a new line is being added), and the line is being added to new DOO order, in an embodiment of the invention, OPM 1040 can start a new executable process for that line and can monitor it along with the other executable processes for the new DOO order. In the embodiment, OPM 1040 can also change the references for the group from the new DOO order to the original DOO order. OPM 1040 can perform this operation regardless of whether the new line is merely being added to the new DOO order, or whether the new line is also being added to a new group of the new DOO order.

In an alternative embodiment, if the delta type is an add line delta, and the line is being added to an existing group of the new DOO order, OPM 1040 can start a new executable process, and change the references as discussed above. In addition, OPM 1040 can merge the newly created group with the existing group of the new DOO order. An example of this merging is merging the newly created group with the existing group based on an item relationship and a shared process definition.

If the delta type is a cancel line delta (i.e., a line is being cancelled), in an embodiment of the invention, OPM 1040 can notify the appropriate executable process to cancel the line.

If the delta type is a delta attribute change delta (i.e., one or more delta attributes of a header, line, or fulfillment line have changed), in an embodiment, OPM 1040 can notify the appropriate executable process to update the attributes. In an embodiment of the invention, if the changed attribute is a quantity attribute, this change is treated separately by OPM 1040 to minimize the need for adjustment, and for better optimization. Specifically, for a quantity increase, OPM 1040 starts a new executable process for the appropriate line, and monitors it along with the other executable processes for the DOO order. However, for a quantity decrease, OPM 1040 will adjust the original executable process by executing the new executable process in change mode as previously discussed.

If the delta type is a dynamic delta attribute delta (i.e., one or more dynamic delta attributes of a header, line, or fulfillment line have changed), in an embodiment, OPM 1040 adjusts the original executable process by executing the executable process in change mode as previously discussed. In an embodiment of the invention, a user can indicate at an interface of an order capture module when defining a business process, or defining a step of a business process, whether an orchestration system should ignore changes to dynamic delta attributes. Dynamic delta attributes are attributes that a user defines as delta attributes.

Finally, according to an embodiment, OPM 1040 closes the new order and invokes the new executable process. In FIG. 10, as previously discussed, the new executable process is identified as OM 1050.

With respect to OM 1050, OM 1050 listens for a change request, according to an embodiment. Once OM 1050 receives a change request, it processes the change request.

Orchestration Process Management

As previously described, change management of an orchestration process utilizes a combination of an automatic adjustment of past steps of an executable process and incorporation of changes to future steps of the executable process. The orchestration process and the change management of the orchestration process will be described below in an exemplary embodiment of the invention.

Figure 13:
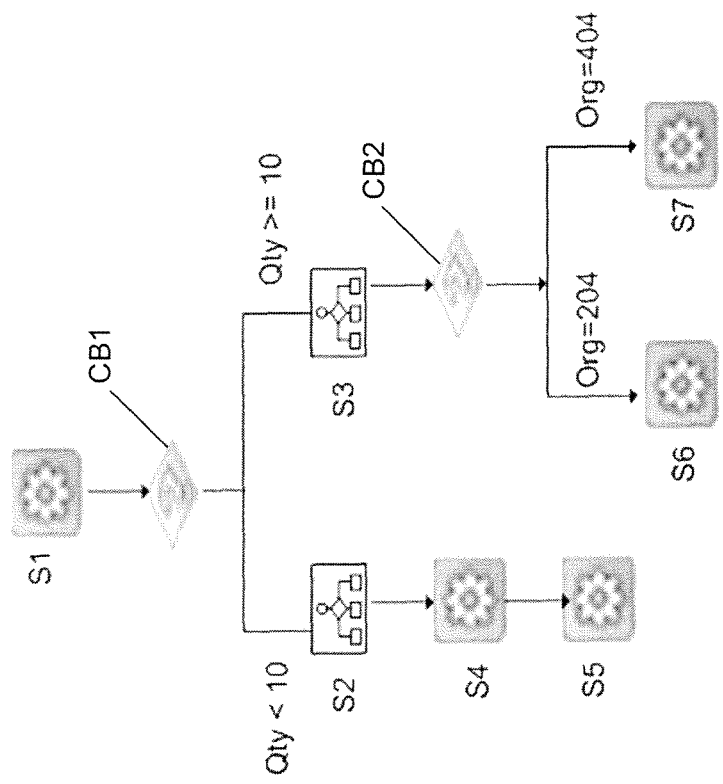
FIG. 13 illustrates an example of an executable process according to one embodiment.

FIG. 13 illustrates an example of an executable process definition according to one embodiment. In the embodiment, FIG. 13 illustrates an executable process definition of an original order. S1, S2, S3, S4, S5, S6, and S7 represent different steps of the executable process. CB1 and CB2 represent conditional branches of the executable process that are evaluated at runtime according to pre-defined business rules. For example, at CB1, the orchestration system evaluates whether or not a line quantity of the original order is less than 10. If the line quantity is less than 10, then the executable process executes step S2, then step S4, then step S5. However, if the line quantity is greater than or equal to 10, then the executable process executes step S3, and then evaluates conditional branch CB2. At CB2, the orchestration system evaluates if the organization of the original order is equal to 204 or 404. If the organization is equal to 204, then the executable process executes step S6. However, if the organization is equal to 404, then the executable process executes step S7.

In the original order, if the line quantity is greater than 10, the executable process executes step S3, and if the organization equals 204 then the executable process executes step S6. If the executable process executes those steps, and a change request is received where the line quantity is reduced to 5, then the new executable process cancels steps S3 and S6, and then executes steps S2, S4, and S5. Because the conditional branches CB1 and CB2 are each evaluated against a pre-defined rule at runtime, it is unknown which path the new executable process will take upon the receipt of a change request.

In the event of a change request, an orchestration system notifies an original executable process to stop. In an embodiment, the orchestration system notifies the original executable process to terminate gracefully (i.e., allow any running steps to complete without executing the next step). In an alternative embodiment, the orchestration system notifies the original executable process to pause itself. Thus, in this embodiment, the original executable process is paused, but is capable of being resumed at a later point in time. Upon resumption, the original executable process will execute the next step. The orchestration system creates a new executable process which refers to the original executable process. More specifically, the new executable process includes new steps which reference the original steps of the original executable process, and includes a new task. For steps that do not require adjustment, the orchestration system copies task completion details and task status from the original executable process. In an embodiment of the invention, the task completion details include start and end dates. For steps that require adjustment, the orchestration system simply copies the task completion details from the original executable process. The orchestration system deactivates all messages associated with the original executable process and starts the new executable process in change mode. Once the new executable process has adjusted all the original steps of the original executable process, the new executable process resumes executing the remaining steps in regular mode.

Figure 14:
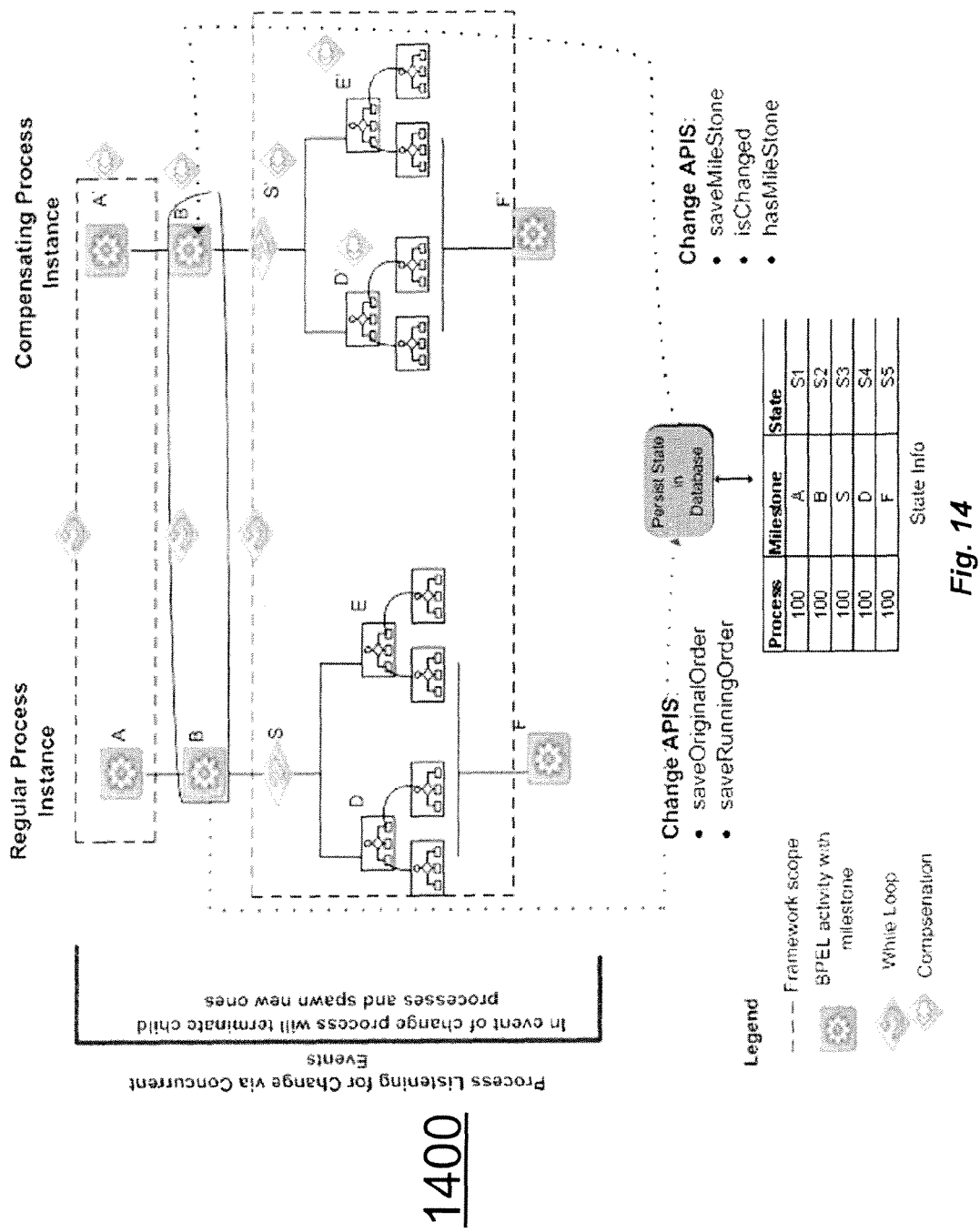
FIG. 14 illustrates an example of a new executable process adjusting the steps of an original executable process according to one embodiment.

FIG. 14 illustrates an example of a new executable process definition where the new executable process adjusts the steps of an original executable process according to one embodiment. In FIG. 14, under the heading "Regular Process Instance" is a flow of an original executable process, including steps A, B, D, E, and F, and conditional branch S. Under the heading "Compensating Process Instance" is a flow of a corresponding new executable process, including steps A', B', D', E', and F', and conditional branch S'. In the event of a change request, an orchestration system is capable of stopping the flow of the original executable process and initiating the flow of the new executable process. Each step and conditional branch of the new executable process (i.e., steps A', B', D', E', and F', and conditional branch S') is capable of automatically adjusting its corresponding step of the original process (i.e., steps A, B, D, E, F, and conditional branch S) if the corresponding step has already been executed.

As can also be seen in FIG. 14, both the original executable process and the new executable process are capable of saving the state of the respective process in a database at each milestone. For example, in FIG. 14, the original executable process saves state S1 at milestone A, state S2, at milestone B, state S3 at milestone S, state S4 at milestone D, and state S5 at milestone F.

Figure 15:
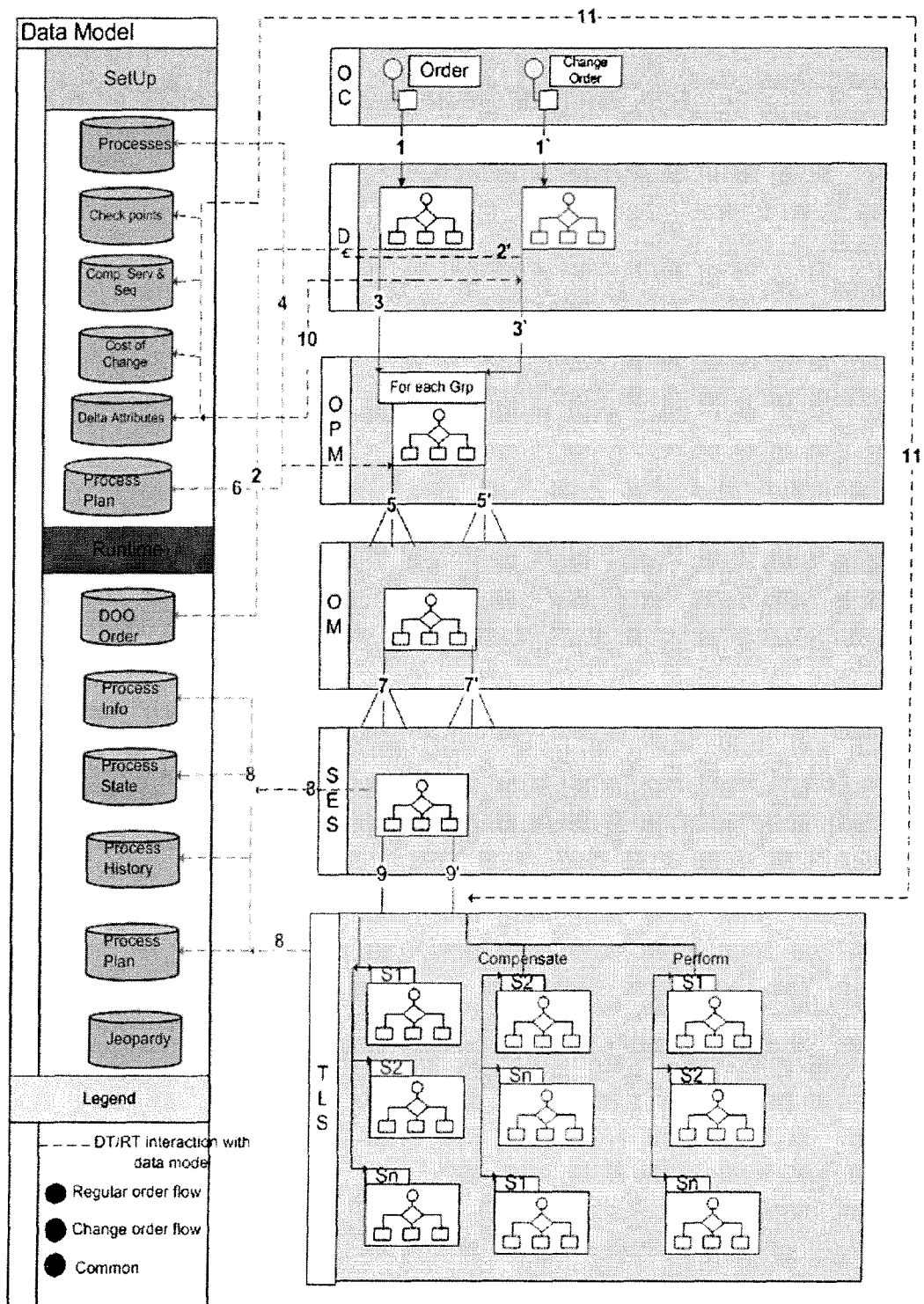
FIG. 15 illustrates a flow chart of both an original executable process, and a new executable process upon the receipt of a change request according to one embodiment.

FIG. 15 illustrates a flow chart of both an original executable process, and a new executable process upon the receipt of a change request, according to one embodiment. The flow of the original executable process (i.e., the identified in the legend of FIG. 15 as "regular order flow") includes steps 1-3, 5, 7, and 9. The flow of the new executable process (i.e., the flow identified in the legend of FIG. 15 as "change order flow") includes steps 1'-3', 5', 7', 9', and 10-11. Step 4, 6, and 8 are common to both flows (and are identified in the legend of FIG. 15 as "Common").

The steps of the regular order flow are now described. At step 1, an order capture module submits an order to an orchestration system, and a decomposition module of the orchestration system accepts the order. At step 2, the decomposition module transforms the order and creates an original DOO order. At step 3, the decomposition module assigns separate executable processes for the lines of the original DOO order as necessary. The decomposition module also saves the state of the original DOO order, and passes the original DOO order to an orchestration module by invoking an OPM of the orchestration module.

At step 4, the OPM queries process information based on the identity of a header of the original order. For each process of the original order, the OPM calls the corresponding OAS and planning service. At step 5, for each group of the original order, the OPM invokes an original executable process (i.e., OM). At step 6, the OAS calls the planning service as part of step 4.

At step 7, the original executable process is executed. The original executable process further invokes the SMS in order to execute the steps of the executable process. At step 8, the SMS retrieves the necessary runtime step instance data. At step 9, the SMS invokes task layer services which correspond to the steps of the executable process. In the example illustrated in FIG. 15, the SMS invokes task layer services which correspond to S1, S2, and Sn, respectively.

The steps of the change order flow are now described. At step 1', an order capture module submits a change request which includes a new order that corresponds to an original order, and the decomposition module of the orchestration system accepts the new order. At step 2' the decomposition module transforms the new order, creates a new DOO order, and identifies the new DOO order as corresponding to the original DOO order. The decomposition module also assigns separate executable processes for the lines of the new DOO order as necessary. The decomposition module then calls a group API in change mode. At step 10, the decomposition module invokes a function that maps the new DOO order with the original DOO order and computes the delta between the two DOO orders. At step 3', the decomposition module passes the new DOO order to an orchestration module by invoking an OPM of the orchestration module.

At step 4, the OPM queries process information based on the identity of a header of the new DOO order. For each process of the new DOO order, the OPM calls the corresponding OAS and planning service. At step 5', the OPM invokes an application module API that returns a set of information including the identity of the original executable process, the identity of the executable process which corresponds to the new executable process which will process the new DOO order and adjust the steps of the original executable process, all groups of the original DOO order, all groups of the new DOO order, and all delta types. For each changed group, the OPM notifies external systems of the changes, pauses the original executable process so that the original executable process exits gracefully and terminates all wait steps. The OPM also merges the new DOO order with the original DOO order, saves the current state of the original order, and invokes a new executable process (i.e., OM) in change mode for each changed group. At step 6, the OAS calls the planning service as part of step 4.

At step 7', the new executable process is executed. The new executable process further invokes the SMS in order to execute the steps of the executable process. At step 8, the SMS retrieves the necessary runtime step instance data, determines the appropriate compensation pattern, identifies the computed delta between the original DOO order and the new DOO order, and runs the appropriate compensation services. At steps 9' and 11', the SMS invokes task layer services which correspond to the steps of the executable process. In the example illustrated in FIG. 15, the SMS invokes task layer services which corresponds to S1, S2, and Sn, respectively. Specifically, the SMS performs compensation of S2 first, then compensation of Sn, then compensation of S1. Subsequently, the SMS re-performs S1, S2, and Sn.

Further implementation details of orchestration are described in U.S. patent Ser. No. 12/617,698, entitled "DISTRIBUTED ORDER ORCHESTRATION," U.S. patent application Ser. No. 12/718,585, entitled "CHANGE MANAGEMENT FRAMEWORK IN DISTRIBUTED ORDER ORCHESTRATION SYSTEM," and U.S. patent application Ser. No. 12/697,756, entitled "ORCHESTRATION OF BUSINESS PROCESSES USING TEMPLATES."

Event-Based Orchestration Framework

One embodiment is directed to a distributed order orchestration system where an order is orchestrated using a set of independent and discrete events. According to the embodiment, an event manager replaces a stateful executable process, such as executable process 310, of the distributed orchestration system. Instead of having a stateful executable process that orchestrates an order using a request/reply mode of interaction, the event manager uses a set of discrete and independent events to orchestrate the order. In one embodiment of the invention, the event manager publishes a set of events, according to a process, to a set of subscribers across an event messaging system. Each subscriber consumes one of the events published by the event manager and executes a task based on the event. According to the embodiment, the independent and discrete events decouple distinct components of the distributed order orchestration system as the event manager handles the communication between the distinct components of the distributed order orchestration system. Thus, a first component of the distributed order orchestration system can communicate with a second component without knowledge of implementation details of the second component. As one of ordinary skill in the art would appreciate, a set of events can include a single event or multiple events. According to the embodiment, two components of a distributed order orchestration system are "distinct" if they do not directly communicate with each other, but instead communicate using an intermediary, such as an event messaging system.

Figure 16:
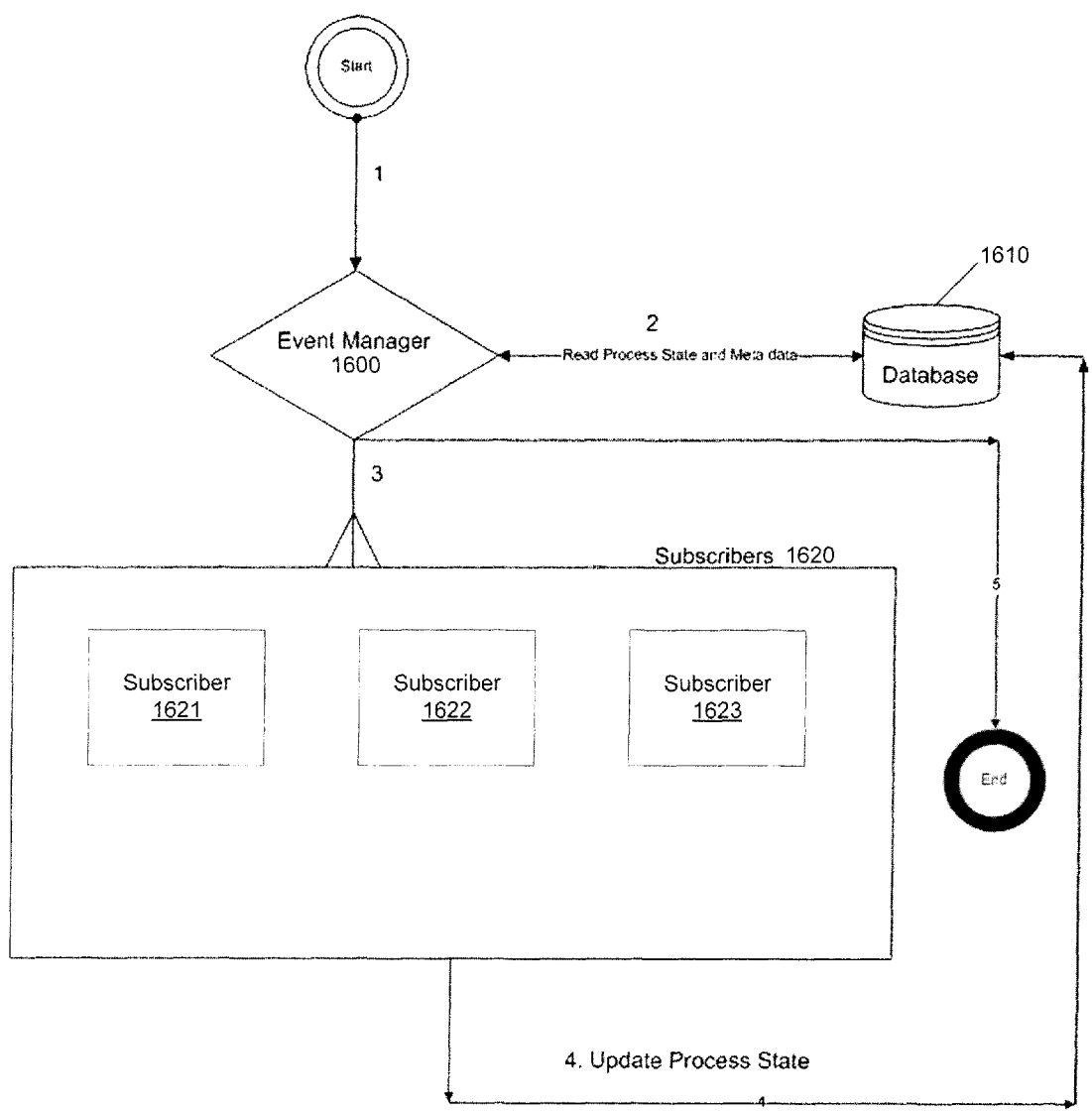
FIG. 16 illustrates a flow chart of a method of publishing a set of events according to a process using an event manager according to one embodiment.

FIG. 16 illustrates a flow chart of a method of publishing a set of events according to a process using an event manager according to one embodiment. According to the embodiment, the flow involves event manager 1600, database 1610, and subscribers 1620. In accordance with the embodiment, event manger 1600 is a stateless executable process. Event manager 1600 is a distinct component of a distributed orchestration system and is described in more detail in relation to FIGS. 19 and 20, in a context of orchestration.

Database 1610 is a database where a process state and metadata can be stored. A process state is a state of a process used to process an order. Thus, in an embodiment where the process is an orchestration process, the process state is a state of the orchestration process. According to an embodiment, where a DOO order is being orchestrated, the process state includes attribute values for each header, line, and fulfillment line of the DOO order. Metadata, as previously described, is used to define tasks within an order, and is used to invoke services related to those tasks, such as task layer services. More specifically, metadata is used to determine how and when to invoke the services. Also, based on the metadata, input arguments are generated and sent to the services to invoke the encapsulated service. Thus, according to an embodiment, a process state can be used to determine which steps of a process have been executed, and the metadata can be used to determine which steps of the process need to be executed and how to execute those steps. Database 1610 can be an operational database, an analytical database, a data warehouse, a distributed database, an end-user database, an external database, a navigational database, an in-memory database, a document-oriented database, a real-time database, a relational database, an object-oriented database, or any other database known in the art. According to one embodiment of the invention, database 1610 of FIG. 16 is identical to storage 314 of FIG. 3.

Subscribers 1620 are distinct components of a distributed order orchestration system that subscribe to a specific type of an event. When a subscriber of subscribers 1620 receives a published event, the subscriber determines the type of the published event. If the type of the published event is a type that the subscriber has subscriber to, the subscriber consumes the event and executes a task based on the consumed event. Subscribers 1620 are decoupled from event manager 1600. In general, because of this decoupling, subscribers 1620 are unaware of event manager 1600, and thus, are unaware of the source of the published events. However, in certain embodiments, a subscriber can be aware of the source of published events. According to one embodiment, as will be described in more detail in relation to FIG. 17, subscribers 1620 include task layer services, where a task layer service performs a task based on a consumed event. However, this is merely an example embodiment, and in alternative embodiments, subscribers 1620 can be any component of a distributed order orchestration system that is distinct from event manager 1600.

The flow illustrated in FIG. 16 will now be described according to an embodiment of the invention. The process begins, and, at step 1, event manager 1600 is initiated. According to an embodiment, when initiated, event manager 1600 determines what steps of a process are to be executed, and publishes a set of events to execute the determined steps.

At step 2, event manager 1600 reads a process state and metadata from database 1610. Based on the process state and metadata, event manager 1600 determines a step of a process that is to be executed, and generates a set of events to be published across an event messaging system. According to an embodiment, an event includes instructions to execute a task that corresponds to the step of the process. An event, and an event managing system, are each described in more detail in relation to FIG. 21.

At step 3, event manager 1600 publishes a set of events across the event messaging system, and the events are transmitted to subscribers 1620. After event manager 1600 publishes the set of events, event manager 1600 terminates.

As previously described, subscribers 1620 can be any component of a distributed order orchestration system. In the illustrated embodiment, subscribers 1620 include subscriber 1621, subscriber 1622, and subscriber 1623. However, one of ordinary skill in the art would readily appreciate that this is merely an example number of subscribers according to an embodiment, and that, in alternative embodiments, subscribers 1620 can include any number of subscribers. As previously described, each subscriber of subscribers 1620 subscribes to a specific type of event. When a subscriber of subscribers 1620 receives a published event, the subscriber determines the type of the published event. If the type of the published event is a type that the subscriber has subscribed to, the subscriber consumes the event and executes a task based on the consumed event.

At step 4, after each subscriber of subscribers 1620 executes its task, each subscriber updates the process state of database 1610. As previously described, a process state is a state of the process. Thus, according to the embodiment, updating the process state of database 1610 includes updating the process state to identify that the tasks executed by subscribers 1620 have been completed. According to one embodiment of the invention, updating the process state includes updating at least one attribute value of the DOO order. Such updating can include updating at least one attribute value of a header of the DOO order, updating at least one attribute value of a line of the DOO order, updating at least one attribute value of a fulfillment line of the DOO order, or a combination herein.

According to the embodiment, once the process state of database 1610 is updated, event manager 1600 is initiated again. Once initiated, event manager 1600 determines, based on the process state and metadata of database 1610, whether: (1) event manager 1600 should generate a new set of events; (2) event manager 1600 should wait for another process state transition before generating a new set of events; or (3) the process state has reached an exit status. If event manager 1600 determines that it should generate a new set of events, steps 3 and 4 are repeated until the process state reaches an exit status. If event manager 1600 determines that it should wait for another process state transition before generating a new set of events then event manager 1600 terminates. If event manager 1600 determines that the process state has reached an exit status, then, at step 5, event manager 1600 terminates the process. The determination process of event manager 1600 is described in more detail in relation to FIG. 24.

One example of processing an order in a distributed order orchestration system using an event manager is orchestrating an order. More specifically, in a distributed order orchestration system, an orchestration layer and a task services layer can communicate using an event manager. Thus, the flow illustrated in FIG. 16 will now be described in the context of orchestration, according to an embodiment of the invention.

Figure 17:
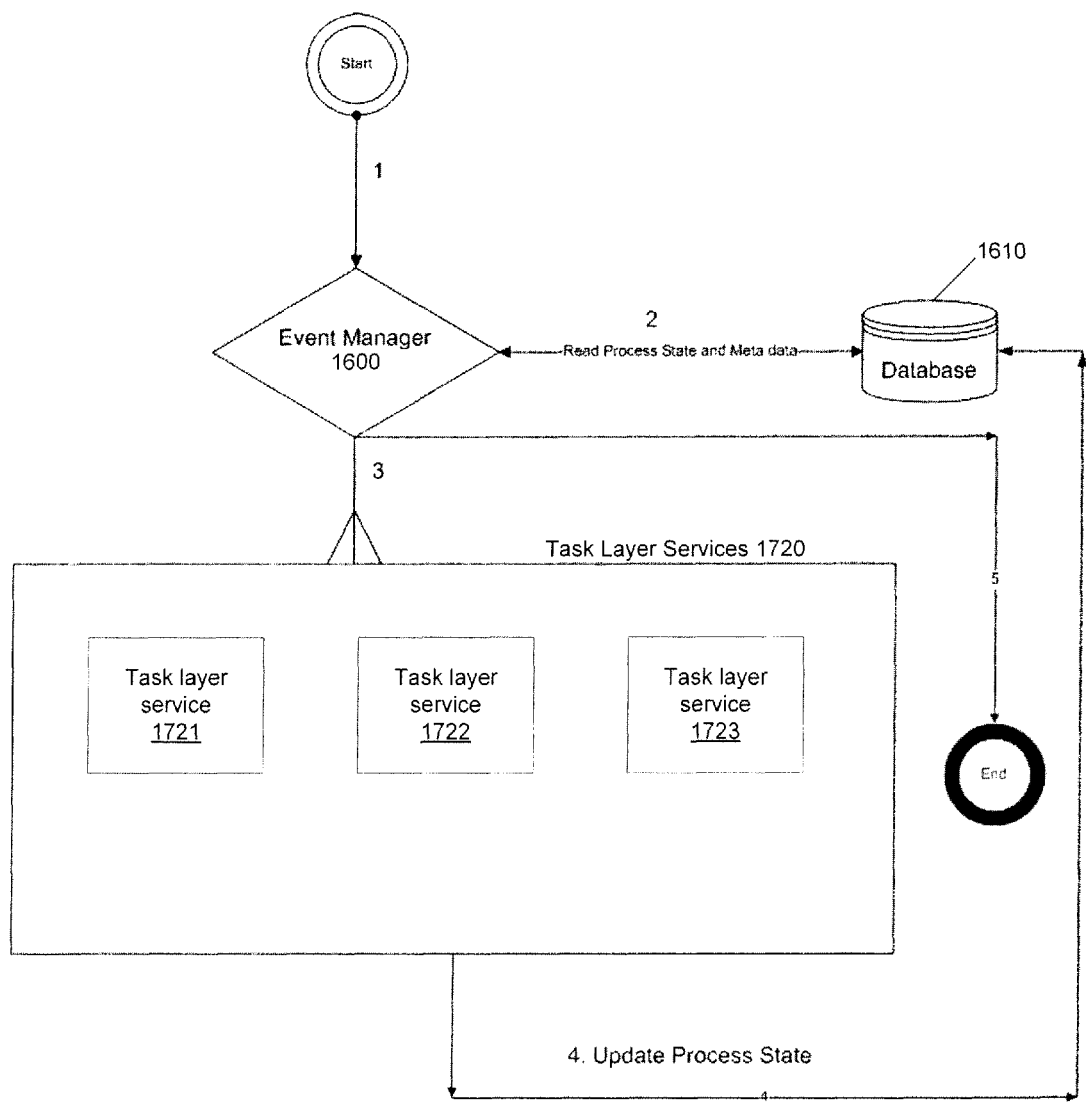
FIG. 17 illustrates a flow chart of a method of orchestrating an order using an event manger and task layer services according to one embodiment.

FIG. 17 illustrates a flow chart of a method of orchestrating an order using an event manger and task layer services according to one embodiment. According to the embodiment, the process is an orchestration process for orchestration an order. At step 1, a decomposition layer of a distributed order orchestration system creates a distributed order orchestration order ("DOO order") to be sent to an orchestration layer of the distributed order orchestration system, and orchestration of the DOO order is initiated. As previous described, a DOO order is an object that represents an order received from an order capture layer of the distributed order orchestration system, and that has been transferred into an object format utilized by the orchestration layer of the distributed order orchestration system. When orchestration of the DOO order is initiated, event manager 1600 is initiated.

At step 2, event manager 1600 reads a process state and metadata from database 1610. According to the embodiment, the process state is a state of the orchestration process that is orchestrating the order. In the embodiment, the process state includes attribute values for each header, line, and fulfillment line of the DOO order. Also, according to the embodiment, the metadata is data used to define tasks within an order that is orchestrated, and is used to invoke task layer services related to those tasks. Based on the process state and metadata, event manager 1600 determines a set of events to be published across an event messaging system. For example, if the metadata defines a task to create a shipment, event manager 1600 publishes an event that a createShipment task layer service subscribes to, identified as "createShipEvent."

At step 3, event manager 1600 publishes a set of events across the event messaging system, and the events are transmitted to task layer services 1720. According to the embodiment, each event corresponds to a specific task layer service that is required to further orchestrate the DOO order. After event manager 1600 publishes the set of events, event manager 1600 terminates.

In the illustrated embodiment, task layer services 1720 include task layer service 1721, task layer service 1722, and task layer service 1723. However, one of ordinary skill in the art would readily appreciate that this is merely an example number of task layer services according to an embodiment, and that, in alternative embodiments, task layer services 1720 can include any number of task layer services. As previously described, each task layer service of task layer services 1720 subscribes to a specific type of event. For example, task layer service 1721 is a createShipment task layer service and subscribes to an event of type createShipEvent. In the example, task layer services 1722 and 1723 are task layer services that each subscribe to a different type of event. When a task layer service of task layer services 1720 receives a published event the task layer service determines the type of the published event. If the type of the published event is a type that the task layer service has subscribed to, the task layer service consumes the event and executes a task based on the consumed event. If the type of the published event is not a type that the task layer service has subscribed to, the task layer service ignores the event. In the example, when task layer service 1721 receives an event of type createShipEvent, published by event manager 1600, task layer service 1721 consumes the event and executes a createShipment task. When task layer services 1722 and 1723 receive the event of type createShipEvent, task layer services 1722 and 1723 ignore the event, because the event is not a type of event that task layer services 1722 and 1723 subscribe to.

At step 4, after each task layer service of task layer services 1720 executes its task, each task layer service updates the process state of database 1610. In the example, task layer service 1721 executes a createShipment task and updates the process state of database 1610. According to the embodiment, a process state is a state of the orchestration process. Thus, according to the example, updating the process state of database 1610 includes updating the process state to identify that the createShipment task executed by task layer service 1721 has been completed. According to the embodiment, updating the process state includes updating at least one attribute value of the DOO order. Such updating can include updating at least one attribute value of a header of the DOO order, updating at least one attribute value of a line of the DOO order, updating at least one attribute value of a fulfillment line of the DOO order, or a combination herein. Thus, according to the example, updating the process state includes updating at least one attribute value of the DOO order based on the execution of the createShipment task.

According to the embodiment illustrated in FIG. 17, once the process state of database 1610 is updated, event manager 1600 is initiated again. Once initiated, event manager 1600 determines, based on the process state and metadata of database 1610, whether: (1) event manager 1600 should generate a new set of events; (2) event manager 1600 should wait for another process state transition before generating a new set of events; or (3) the process state has reached an exit status. If event manager 1600 determines that it should generate a new set of events, steps 3 and 4 are repeated until the process state reaches an exit status. If event manager 1600 determines that it should wait for another process state transition before generating a new set of events then event manager 1600 terminates. If event manager 1600 determines that the process state has reached an exit status, then, at step 5, event manager 1600 terminates the orchestration process.

However, while FIG. 17 illustrates an event manager context of orchestration, and illustrates that an event manager can be used in communication between an orchestration layer and a task service layer, one of ordinary skill in the art would readily appreciate that this is merely an example of an event manager. Furthermore, one of ordinary skill in the art would also appreciate that any layer of a distributed order orchestration system can use an event manger to communicate with another layer of the distributed order orchestration system. For example, a decomposition layer can communicate with an orchestration layer using an event manger. Thus, according to an embodiment of the invention, an event manager can be used to facilitate communications between any two layers, or two components, of a distributed order orchestration system.

Figure 18:
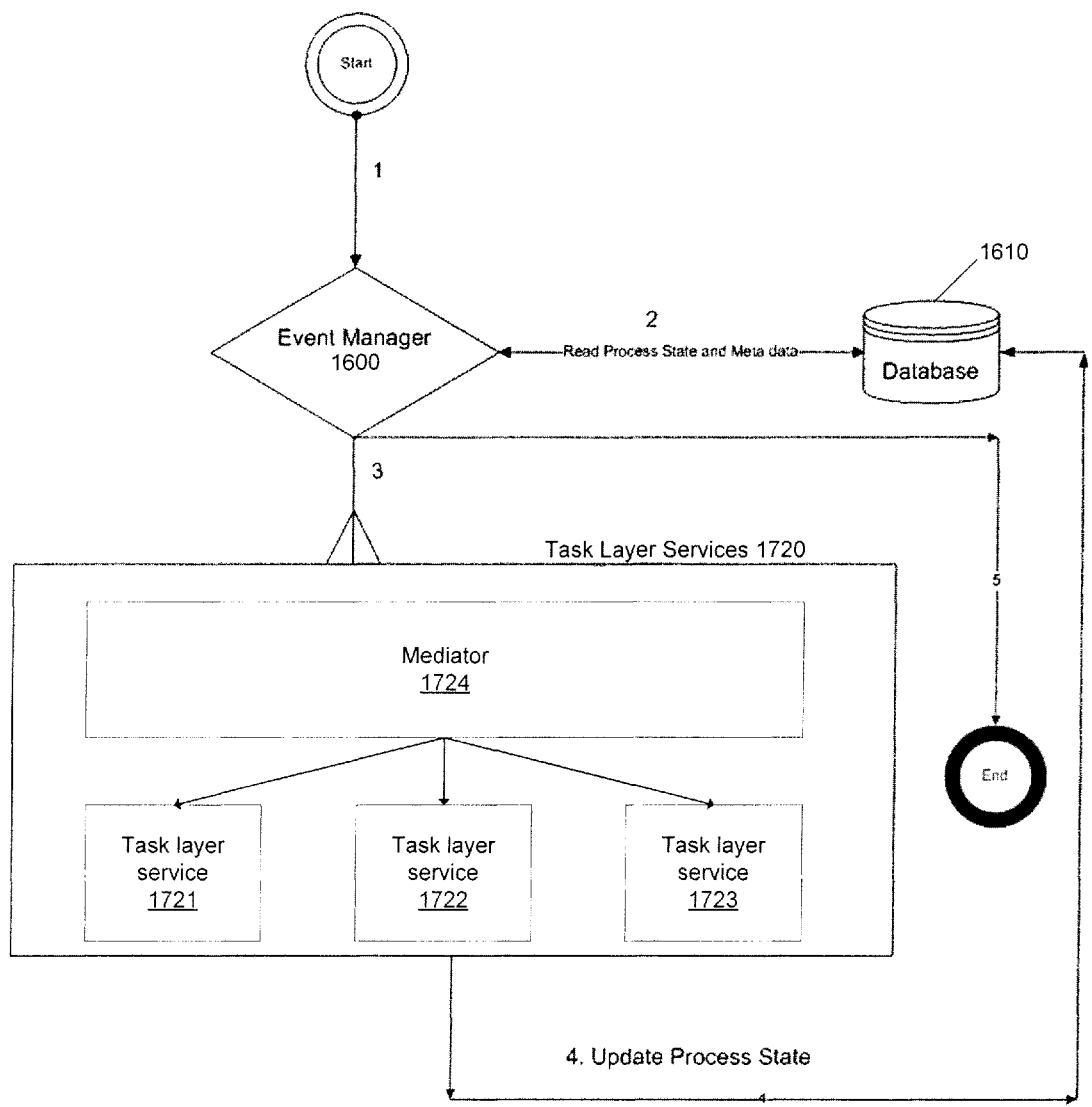
FIG. 18 illustrates a flow chart of a method of orchestrating an order using an event manger, task layer services, and a mediator according to one embodiment.

FIG. 18 illustrates a flow chart of a method of orchestrating an order using an event manger, task layer services, and a mediator according to one embodiment. The illustrated embodiment of FIG. 18 is identical to the illustrated embodiment of FIG. 17, except that, task layer services 1720 include mediator 1724. As one of ordinary skill in the art would readily understand, a mediator is a process that allows two or more processes to communicate with each other by receiving data from a first process and converting the received data from a format that the first process understands into a format that the second process understands. Thus, a mediator acts as an intermediary for two or more processes, and reduces the dependencies between the two or more processes, which, in turns lowers the coupling. In addition, according to the illustrated embodiment of FIG. 18, mediator 1724 subscribes to a global event type, rather than individual task layer services subscribing to specific event types. Thus, at step 3, after event manager 1600 publishes a set of events, and the events are transmitted to task layer services 1720, mediator 1724 consumes each event and based on a set of parameters contained within the event, mediator 1724 invokes task layer service 1721, task layer service 1722, or task layer service 1723. The task layer service that is invoked (i.e., task layer service 1721, task layer service 1722, or task layer service 1723) executes a task based on the event.

In an alternate embodiment, an event manager can not only control task processing of one or more subscribers, but can also control subtask processing of an individual subscriber, such as a task layer service. For example, a subscriber can execute a task based on a consumed event, where the task is comprised of ten subtasks. Furthermore, some of the subtasks can be done in parallel, some of the subtasks can be done sequentially, and some of the subtasks may require one or more subtasks to complete before the subtask can be executed. In this scenario, when a subscriber executes a first subtask, the subscriber can update a process state of a database. Based on the process state and metadata of the database, an event manager can determine which subtask (or subtasks) can be executed, and can generate and publish a set of events accordingly. The events can be consumed by the subscriber, and, based on the events, the subscriber can execute the corresponding subtask or subtasks. Subsequently, the subscriber can update the process state, and this process can be repeated until all the subtasks of the task are completed.

An event manager will now be described below in more detail, and in particular, in the context of orchestration.

Figure 19:
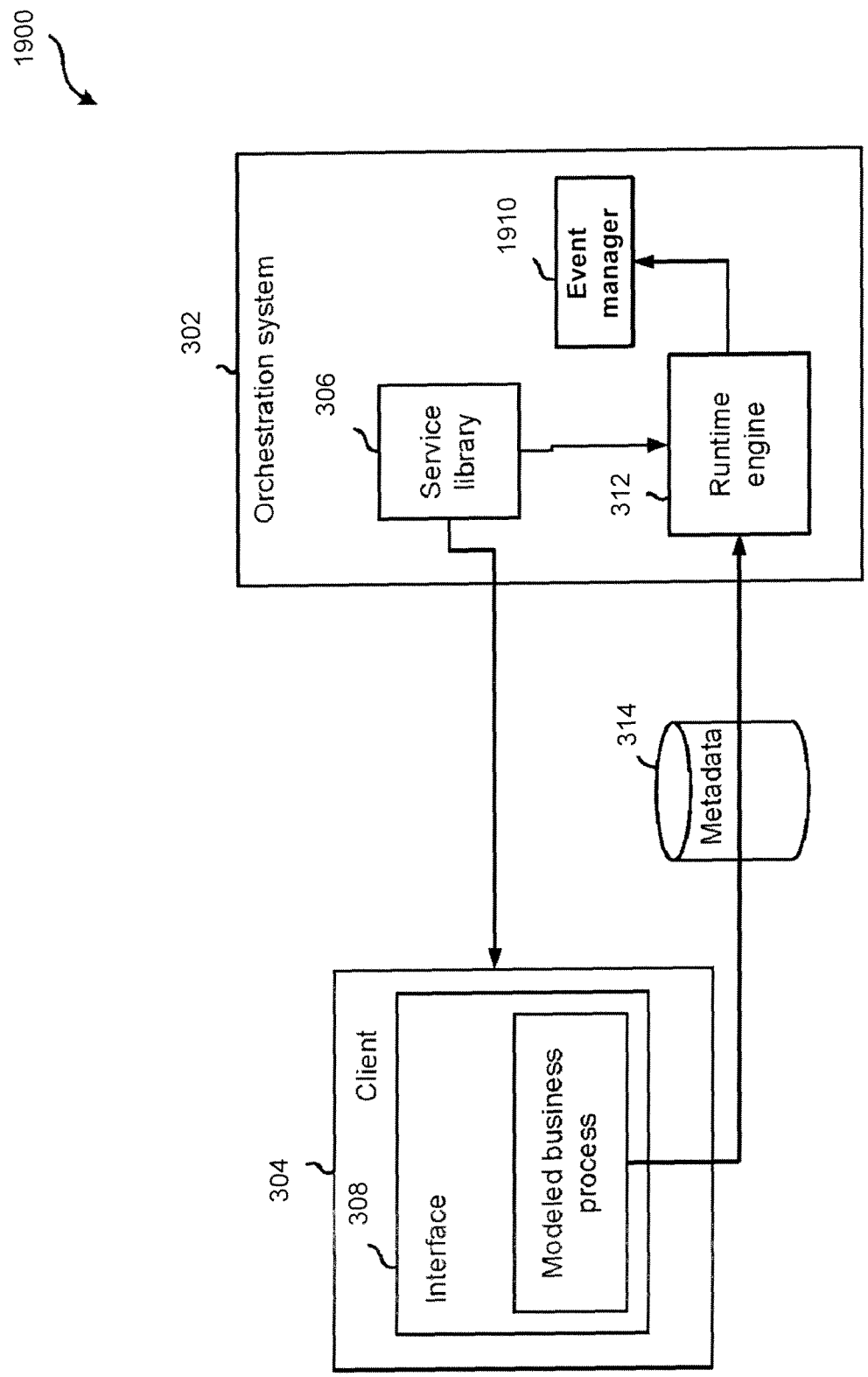
FIG. 19 illustrates an example of a system for providing orchestration using an event manager in a context of order fulfillment according to one embodiment.

FIG. 19 illustrates an example of a system 1900 for providing orchestration using an event manager in a context of order fulfillment according to one embodiment. In the embodiment, system 1900 includes an orchestration system 302 and a client 304. According to the embodiment, system 1900 of FIG. 19 is similar to system 300 of FIG. 3, except that system 1900 includes event manager 1910 rather than executable process 310. Event manager 1910 is a stateless process that can be invoked by runtime engine 312. Event manager 1910 contains embedded logic configured to determine a set of events to publish. This logic is derived from the metadata in storage 314 and a state of a business process modeled by a user using interface 308.

Instead of executing an executable process, runtime engine 312 invokes event manager 1910 to orchestrate the modeled business process of interface 308. Similar to the embodiment illustrated in FIG. 3, a user may use interface 308 to define steps of the business process using services in service library 306. A user may define a plurality of steps in the business process. Each step may be associated with a service in service library 306. The steps may be stored in a data table, which may include metadata that may be used by runtime engine 312 to invoke event manager 1910. Based on the services in service library 306 used to define the specific step of a business process, event manager 1910 generates and publishes a set of events, which are transmitted to subscribers, such as task layer services. Event manager 1910 can publish an event by calling an internal method. Once event manager 1910 has published the set of events, event manager 1910 terminates. After the subscribers consume the set of events and execute the tasks based on the consumed events, the subscribers update the state of the modeled business process, and runtime engine 312 again invokes event manager 1910. This process repeats until the modeled business process has been orchestrated, and then, event manager 1910 terminates the process.

Figure 20:
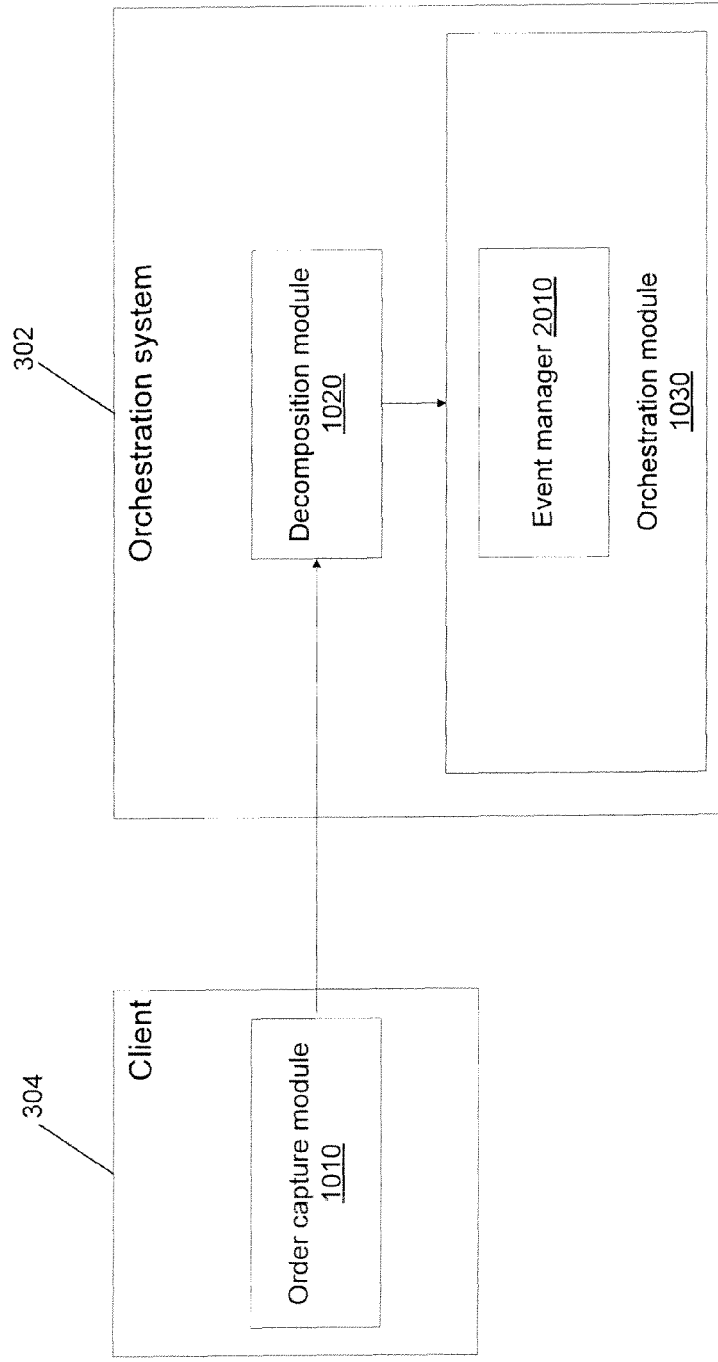
FIG. 20 illustrates a distributed order orchestration system utilizing an event manager according to one embodiment.

FIG. 20 illustrates a distributed order orchestration system 2000 utilizing an event manager according to one embodiment. In an embodiment of the invention, system 2000 corresponds to system 1900 of FIG. 19, and only the portions of system 1900 relevant to the discussion have been included in system 2000. All other portions of system 900 have been omitted for clarity purposes.

In the embodiment illustrated in FIG. 20, distributed order orchestration module 908 of FIG. 9 is represented as two modules: a decomposition module 1020 and an orchestration module 1030. However, one of ordinary skill in the art would readily recognize that a single module may provide the functionality of decomposition module 1020 and orchestration module 1030, and still be within the scope of the invention. Furthermore, distributed order orchestration module 908 of FIG. 9 may be represented as any number of modules and still be within the scope of the invention.

According to the embodiment, system 2000 of FIG. 20 is similar to system 1000 of FIG. 10, except that orchestration module 1030 includes event manager 2010 instead of a sub-module OPM 1040, and core processes OM 1050, SMS 1060, and SPM 1070. An exemplary embodiment of orchestration will now be described in relation to decomposition module 1020 and orchestration module 1030 illustrated in FIG. 20. However, one of ordinary skill in the art will readily appreciate that the described embodiment is merely an exemplary embodiment, and that orchestration may be implemented according to alternative embodiments and still be within the scope of the invention.

Decomposition module 1020 operates in a similar manner as previously discussed in relation to FIG. 10. Orchestration module 1030 controls the sequences of events that occur while processing and fulfilling DOO orders created by decomposition module 1020 through the invocation of event manager 2010 and the publishing of events.

According to the embodiment, decomposition module 1020 invokes event manager 2010 of orchestration module 1030. More specifically, decomposition module 1020 invokes event manager 2010 to orchestrate DOO orders created by decomposition module 1020. As previously described, event manager 1910 is a stateless process, and can be invoked by decomposition module 1020. Event manager 2010 contains embedded logic configured to determine a set of events to publish. This logic is derived from metadata and a process state stored in a database. Based on this logic, event manager 2010 generates and publishes a set of events, which are transmitted to subscribers, such as task layer services. Event manager 2010 can publish an event by calling an internal method. Once event manager 2010 has published the set of events, event manager 2010 terminates. After the subscribers consume the set of events and execute the tasks based on the consumed events, the subscribers update the process state stored in the database, and decomposition module 1020 again invokes event manager 2010. This process repeats until the DOO orders have been orchestrated, and then, event manager 2010 terminates.

An event messaging system will now be described below in more detail.

Applications can transmit data through a message channel, a virtual pipe that connects a sender to a receiver. A message is a packet of data that can be transmitted on a message channel. To transmit data, a sender can break the data into one or more packets, wrap each packet as a message, and then transmit the message on a message channel. Likewise, a receiver can receive a message, extract the data from the message, and process the data. The messaging system can try repeatedly to transmit the message from the sender to the receiver until it succeeds. Transmitting data can include marshalling the data into byte form at the sender, transmitting the marshaled data as a byte stream from the sender to the receiver, and unmarshalling the data back into its original form.

An event messaging system allows a sender to transmit messages even when the application does not know what particular receiver will end up retrieving it. This is because, when a sender transmits data, the sender adds the data to a message channel whose specific purpose is to communicate that type of information. Likewise, a receiver that wants to receive particular information selects what message channel to get data from based on what type of data it wants. Thus, the sender is assured that the receiver that retrieves the data is interested in the data.

A message can comprise two parts: a header and a body. The header can include information used by the messaging system that describes the data being transmitted. The body can include the data being transmitted.

An event is a type of message that indicates a change in a state of the sender. This change in state can be based on an action external to the sender. For example, a user may indicate in an order capture layer that he wants to create a shipment. The indication by the user is an external action that triggers a change in state of an orchestration layer. As a result of this change in state, the orchestration layer can transmit an event using a message channel to a task services layer, where the event indicates that a user wants to create a shipment. The task services layer can consume the event and execute a task to create a shipment based on the event.

The transmission of an event is a one-way asynchronous action. This means that the sender that transmits the event does not wait for a response from a receiver that subscribes to the event and consumes the event. According to certain embodiments, the sender terminates after it transmits the event.

Figure 21:
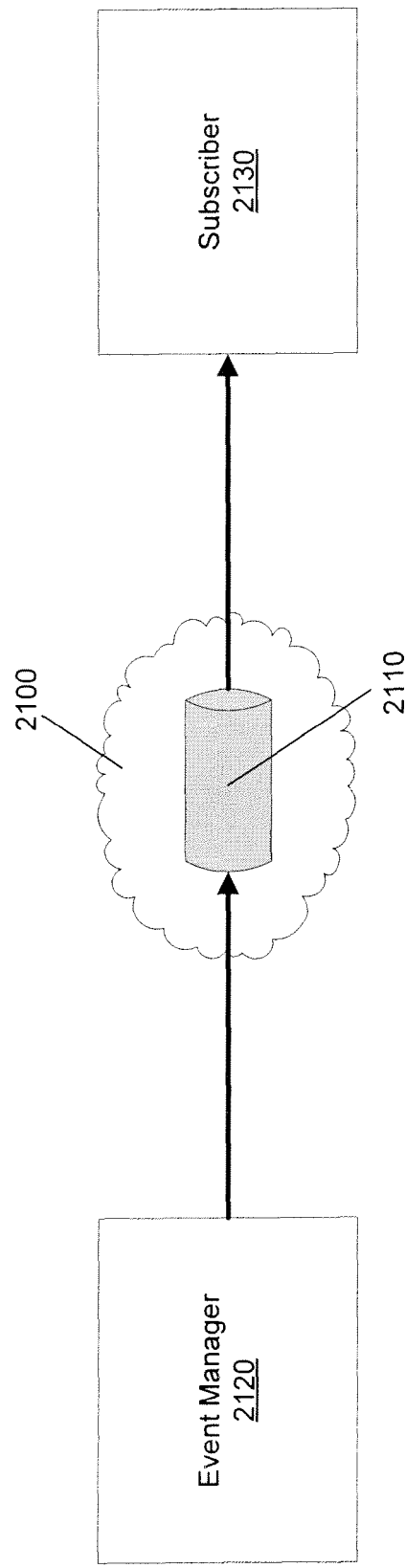
FIG. 21 illustrates an example of an event messaging system according to one embodiment.

FIG. 21 illustrates an example of an event messaging system 2100 according to one embodiment. Event messaging system 2100 includes message channel 2110. As previously described, message channel 2110 is configured to transmit a message, such as an event, from a sender to receiver. The illustrated embodiment includes an event manager 2120 and a subscriber 2130. According to the embodiment, an event manager 2120 can transmit an event using message channel 2110. In the embodiment, event manager 2120 transmits an event over message channel 2110 to a subscriber 2130. Subscriber 2130 subscribes to the event, and thus, receives the event, and subscriber 2130 executes a task based on the event.

While event messaging system 2100 is illustrated in FIG. 21 as having a single messaging channel, this is merely an example embodiment, and one of ordinary skill in the art would readily appreciate that event messaging system 2100 can include any number of messaging channels and still be within the scope of the invention.

There are many types of message channels. According to an embodiment of the invention, a distributed order orchestration system utilizes an event messaging system which includes one or more publish-subscribe message channels. A publish-subscribe message channel is now described in more detail.

Figure 22:
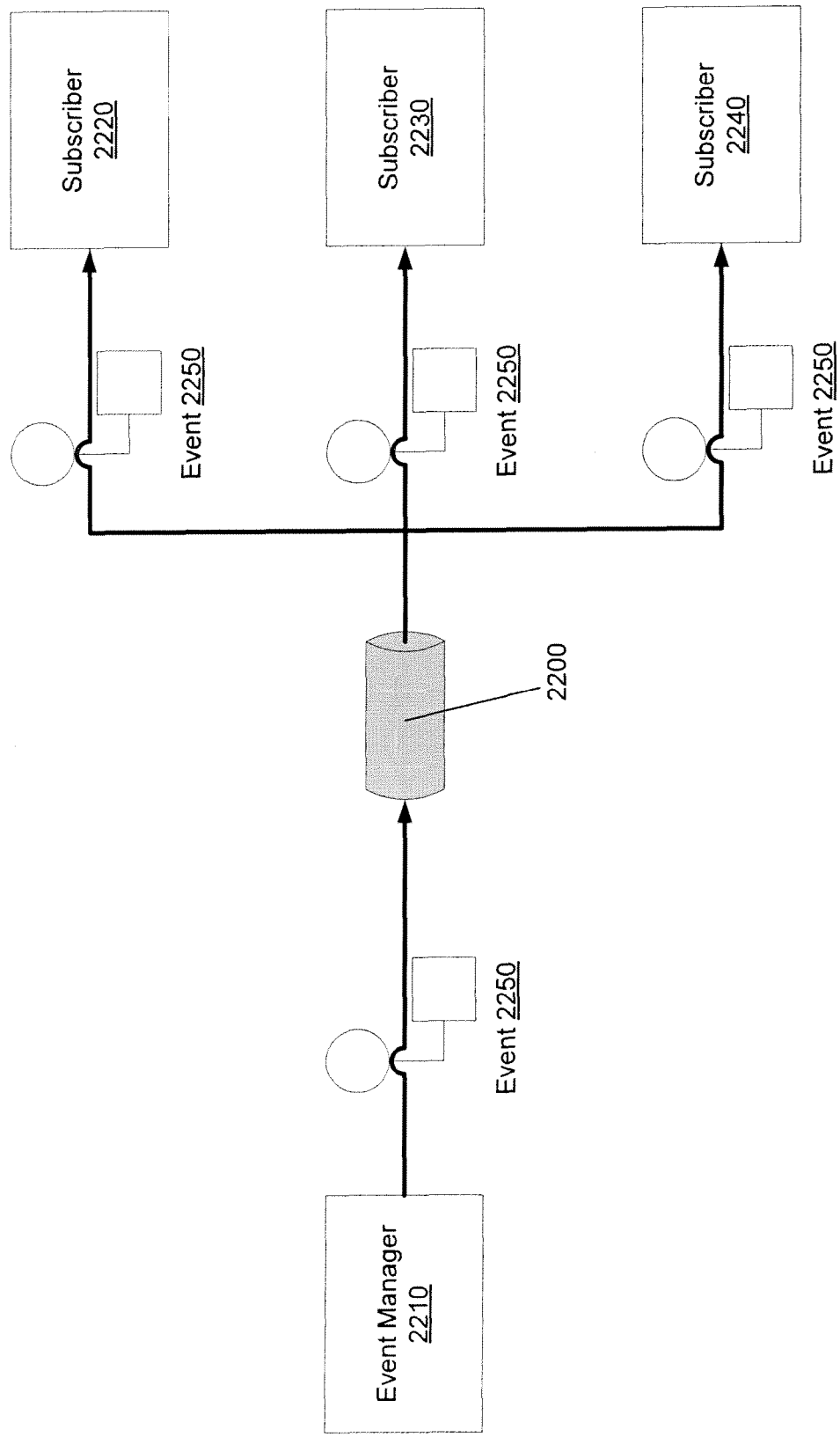
FIG. 22 illustrates an example of a publish-subscribe message channel of an event messaging system according to one embodiment.

FIG. 22 illustrates an example of a publish-subscribe message channel 2200 of an event messaging system according to one embodiment. Publish-subscribe message channel 2200 is a message channel that has one input channel that splits into multiple output channels, one for each subscriber. The illustrated embodiment includes an event manager 2210, and subscribers 2220, 2230, and 2240. According to the embodiment, event manager 2210 publishes event 2250 into an input channel of publish-subscribe message channel 2200. Publish-subscribe message channel 2200 then transmits a copy of event 2250 to each of the output channels. According to the embodiment, each output channel has one subscriber (i.e., the first output channel has subscriber 2220, the second output channel has subscriber 2230, and the third output channel has subscriber 2240). Each subscriber listens for event 2250 and consumes a respective copy of event 2250. Once each copy of event 2250 is consumed by the respective subscriber, each copy of event 2250 disappears from publish-subscribe message channel 2200.

While publish-subscribe message channel 2200 is illustrated in FIG. 22 as having three output channels and three subscribers, this is merely an example embodiment, and one of ordinary skill in the art would readily appreciate that publish-subscribe message channel 2200 can include any number of output channels and subscribers and still be within the scope of the invention. Furthermore, while event 2250 is published to all of subscribers 2220, 2230, and 2240 in the illustrated embodiment of FIG. 22, this is merely an example embodiment, and one of ordinary skill in the art would readily appreciate that an event may be published to a subset of available subscribers, or even a single subscriber.

Figure 23:
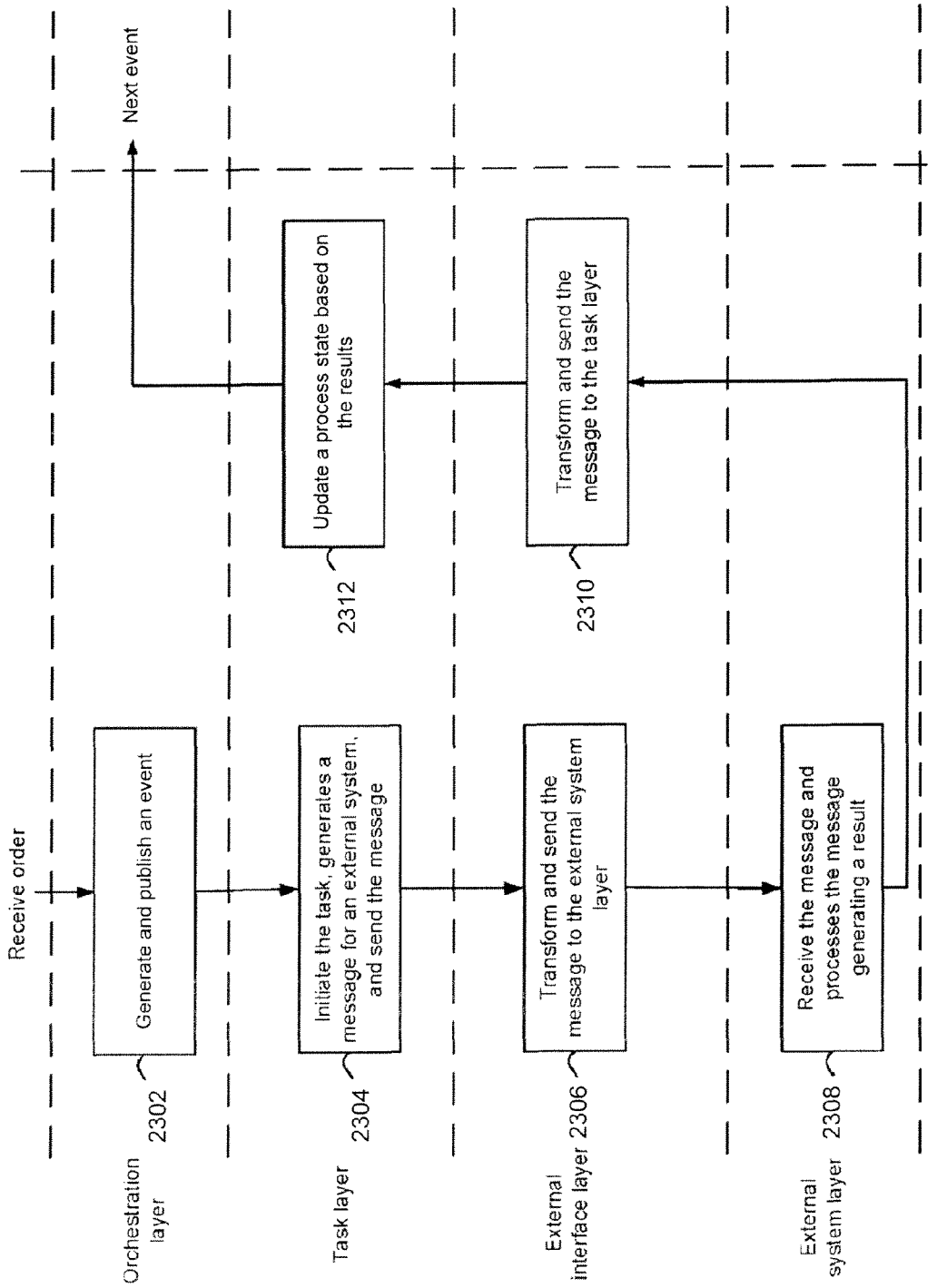
FIG. 23 illustrates a flow chart of a method of managing events in a distributed order orchestration system according to one embodiment.

FIG. 23 illustrates a flow chart of a method of managing events in a distributed order orchestration system according to one embodiment. An orchestration layer, task layer, external interface layer, and external system layer is provided. In one embodiment, a decomposition layer (not shown) is provided before an orchestration layer. In the embodiment that includes a decomposition layer, the decomposition layer can call a service that creates a process state and metadata and stores the process state and metadata in a database.

Step 2302 generates an event and publishes the event, according to the embodiment. An order may be received from an order capture module. This may cause an event to be published. The event is generated using the process state and the metadata in the database. The event is sent to the task layer.

Step 2304 initiates the task, generates a message for an external system, and sends the message, according to the embodiment. The generated message indicates which task should be performed by the external system. The task to be performed is an aspect of order processing that has been modeled. For example, the task may be invoicing for an order. Parameters for performing the task are also included. The message is sent to an external interface.

Step 2306 transforms and sends the message to the external system layer, according to the embodiment. The messages generated by the task layer may be in a generic format. Different external systems, however, may communicate using other formats. The external interface layer determines the format used by an external system and transforms the message. For example, metadata defined by a user may be used to determine the format to be used. In one example, mappings to what external systems call a product that was ordered are used to translate the message.

Step 2308 receives the message returned by the external system and processes the message generating a result, according to the embodiment. The external systems may be systems that perform the task related to processing an order, such as a scheduling system, shipping system, etc. When the task is performed, the result of the task is determined. The result may be a date when a shipment is scheduled, a date when a good is shipped, etc. The result is then sent back to the external interface layer.

In the embodiment, step 2310 transforms and sends the message to the task layer. Step 2312 updates a process state in the database based on the results. The process then continues to the next event that can be generated. The process can be repeated until the process is completed.

Figure 24:
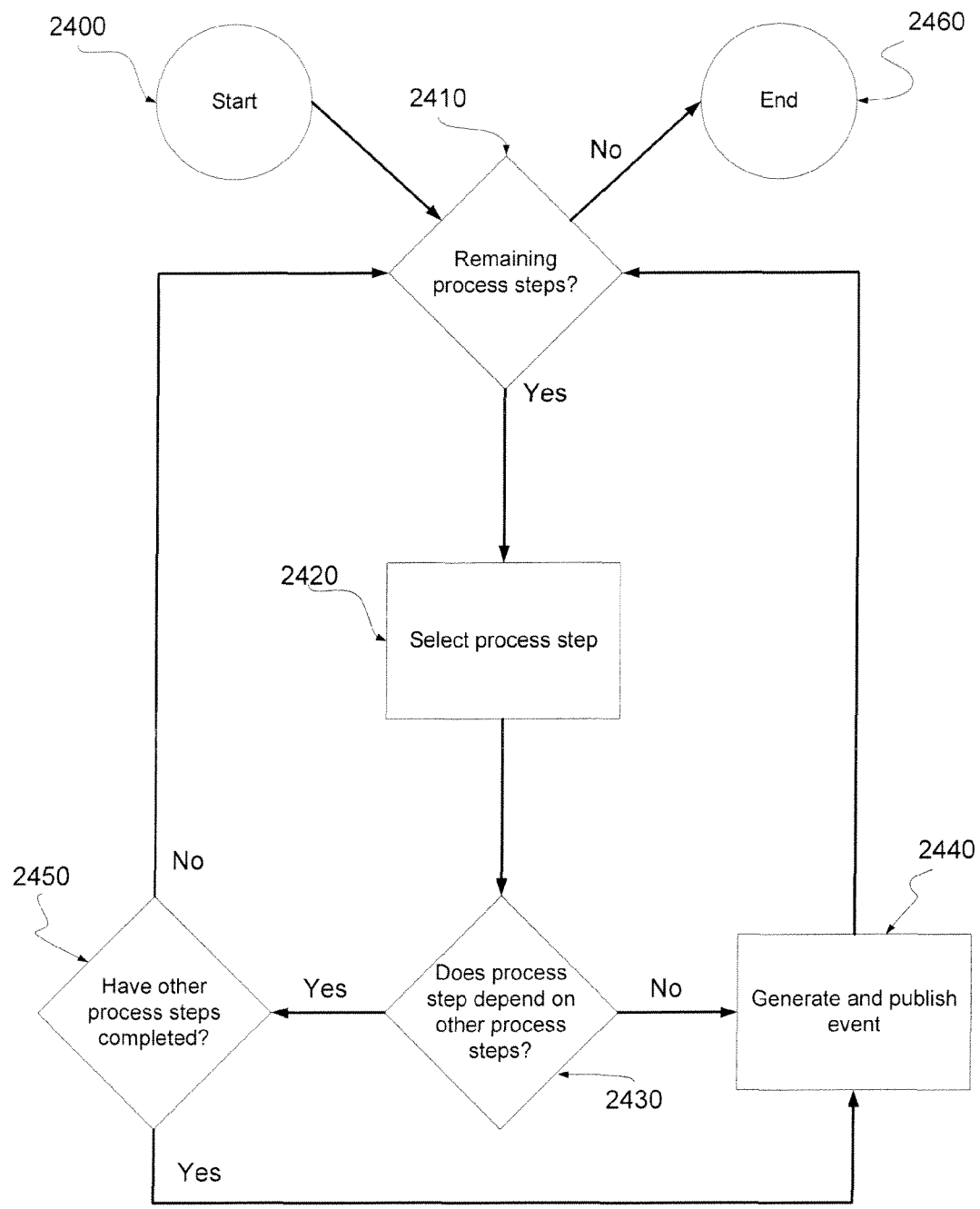
FIG. 24 illustrates a flow chart of a method of determining a set of events to publish according to one embodiment.

FIG. 24 illustrates a flow chart of a method of determining a set of events to publish according to one embodiment. According to an embodiment, this method can be implemented by an event manager when an event manager is invoked, and this method can determine which set of events the event manager publishes for a specific process.

At 2400, the method starts. At 2410, it is determined whether any process steps are "remaining." In other words, it is determined whether there are any process steps that have not been executed. According to an embodiment, this determination can be made based on a process state and metadata stored in a database. According to an embodiment, the process state indicates which process steps have already been executed, and the metadata indicates all the process steps of the process. In accordance with the embodiment, if a process step has not been executed, but has previously been selected by the current implementation of the method, then process step is not considered as "remaining," and is not eligible for selection. If no process steps remain, the method ends at 2460. If one or more process steps remain, then, the method proceeds to 2420.

At 2420, a process step is selected. According to an embodiment, a process step is selected based on the process state and metadata stored in a database. For example, it can be determined from the process state and metadata which process steps have already been executed. Thus, a process step that has not yet been executed can be selected according to the method. According to an embodiment, the process state indicates which steps have already been executed, and the metadata indicates all the process steps of the process. In accordance with the embodiment, a process step that has previously been selected by the current implementation of the method is not eligible for selection.

At 2430, it is determined whether the selected process step depends on other process steps. According to an embodiment, it is determined whether the selected process step depends on other process steps based on the metadata stored in the database. For example, if process step 4 is selected, it can be determined that process step 4 can only be executed after process steps 1, 2, and 3 have completed. Alternatively, it can be determined that process step 4 can be executed at any time, regardless of whether process steps 1, 2, and 3 have already completed. If it is determined that the selected process step does not depend on other process steps, then the method proceeds to 2440. If it is determined that the process step depends on other process steps, then the method proceeds to 2450.

At 2440 an event is generated based on the selected process step, and the event is published. According to the embodiment, by publishing the event, the event is transmitted to one or more subscribers. The one or more subscribers can consume the event and execute a task based on the consumed event that corresponds to the process step.

At 2450, it is determined whether the other process steps that the selected process step depends on have completed. According to an embodiment, it is determined whether the other process steps have completed based on the metadata stored in the database. For example, if process step 4 is selected, and process step 4 depends on process steps 1, 2, and 3, it is determined whether process steps 1, 2, and 3 have completed. If it is determined that the other process steps have completed, then the method proceeds to 2440, and an event is generated and published as described above. However, if it is determined that the other process steps have not completed, then the method proceeds back to 2410, as the selected process step cannot be executed until the other process steps have completed.

At 2460, the method ends. However, the method can be implemented each time the event manager is invoked. An event manager can be invoked until all the process steps have been executed, and thus, the method can be implemented each until all the process steps have been executed. According to the embodiment, once an event has been generated and published for a process step, that process step is not eligible for selection in subsequent implementations of the method. However, if a process step is selected, but an event is not generated and published for the process step (because the process step depends on other process steps that have not completed for example), the process step is eligible for selection in subsequent implementations of the method.

According to an embodiment, the database includes a concurrency control, so that if two or more steps complete at the same time, it is correctly determined that the two or more steps have completed. Therefore, according to the embodiment, it can be determined based on the process state and the metadata of the database whether the other process steps that the selected process step depends on have completed.

As previously described, a user of a distributed order orchestration system can define a sequence in which services are to be invoked that utilizes parallel branching to affect the business processing rules. When the user selects a service for a process step, the user also provides additional metadata that is used to determine how the processing data is to be executed during the processing of an order at runtime. In some embodiment, parallel branching can be defined. According to an embodiment, an event manager can be used to publish events for parallel process steps. According to the embodiment, if an event manager determines based on a process state and metadata stored in a database that two or more process steps are to be executed in parallel, the event manager publishes two or more events at the same time. An example of an event manager publishing events for parallel process steps will now be discussed in more detail.

Figure 25:
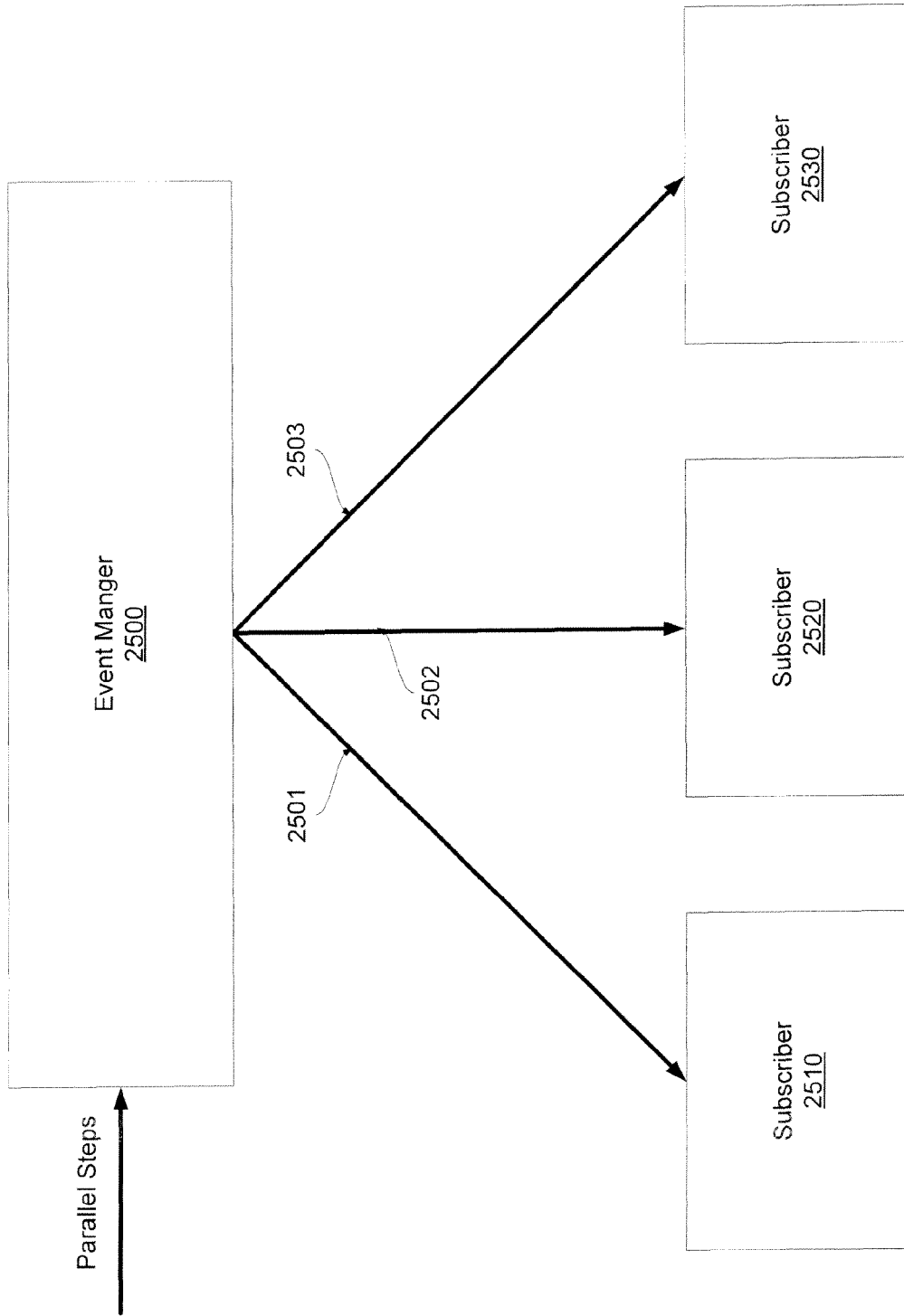
FIG. 25 illustrates an example of an event manager publishing events for parallel process steps according to one embodiment.

FIG. 25 illustrates an example of an event manager 2500 publishing events for parallel process steps according to one embodiment. According to the embodiment, event manager 2500 determines, based on a process state and metadata stored in a database (not shown), that three process steps are to be run in parallel. Event manager 2500 generates three events, events 2501, 2502, and 2503, and publishes the three events simultaneously. Subscriber 2510 consumes event 2501 and executes a task based on the consumed event, subscriber 2520 consumes event 2502 and executes a task based on the consumed event, and subscriber 2530 consumes event 2503 and executes a task based on the consumed event. Thus, the tasks that correspond to events 2501, 2502, and 2503 are executed in parallel by subscriber 2510, subscriber 2520, and subscriber 2530, respectively.

While in this example, three process steps are run in parallel, one of ordinary skill in the art would readily appreciate that this is just an example, and that any number of steps can be run in parallel. Accordingly, event manager 2500 can publish events for any number of parallel process steps in alternative embodiments.

In an alternate embodiment, the three process steps illustrated in FIG. 25 are conditional steps rather than parallel steps. As previously described, conditional steps are steps that depend on a result occurring (e.g., another step finishing). According to the embodiment, event manager 2500 determines, based on a process state and metadata stored in a database (not shown), which of the three conditional steps to run. Event manager 2500 generates event 2501, event 2502, or event 2503, and publishes the event. When event manager 2500 publishes event 2501, subscriber 2510 consumes event 2501 and executes a task based on the consumed event. Likewise, when event manager 2500 publishes event 2502, subscriber 2520 consumes event 2502 and executes a task based on the consumed event. Similarly, when event manager 2500 publishes event 2503, subscriber 2530 consumes event 2503 and executes a task based on the consumed event.

As also previously described, a user of a distributed order orchestration system can indicate that a process is to be split into two or more processes. According to an embodiment, an event manager can be used to publish events for split process steps. According to the embodiment, if an event manager determines based on a process state and metadata stored in a database that a process is to be split into two or more processes, the event manager generates a set of events for one or more split units and publishes the set of events. An example of an event manager splitting a process and publishing a corresponding set of events will now be discussed in more detail.

Figure 26:
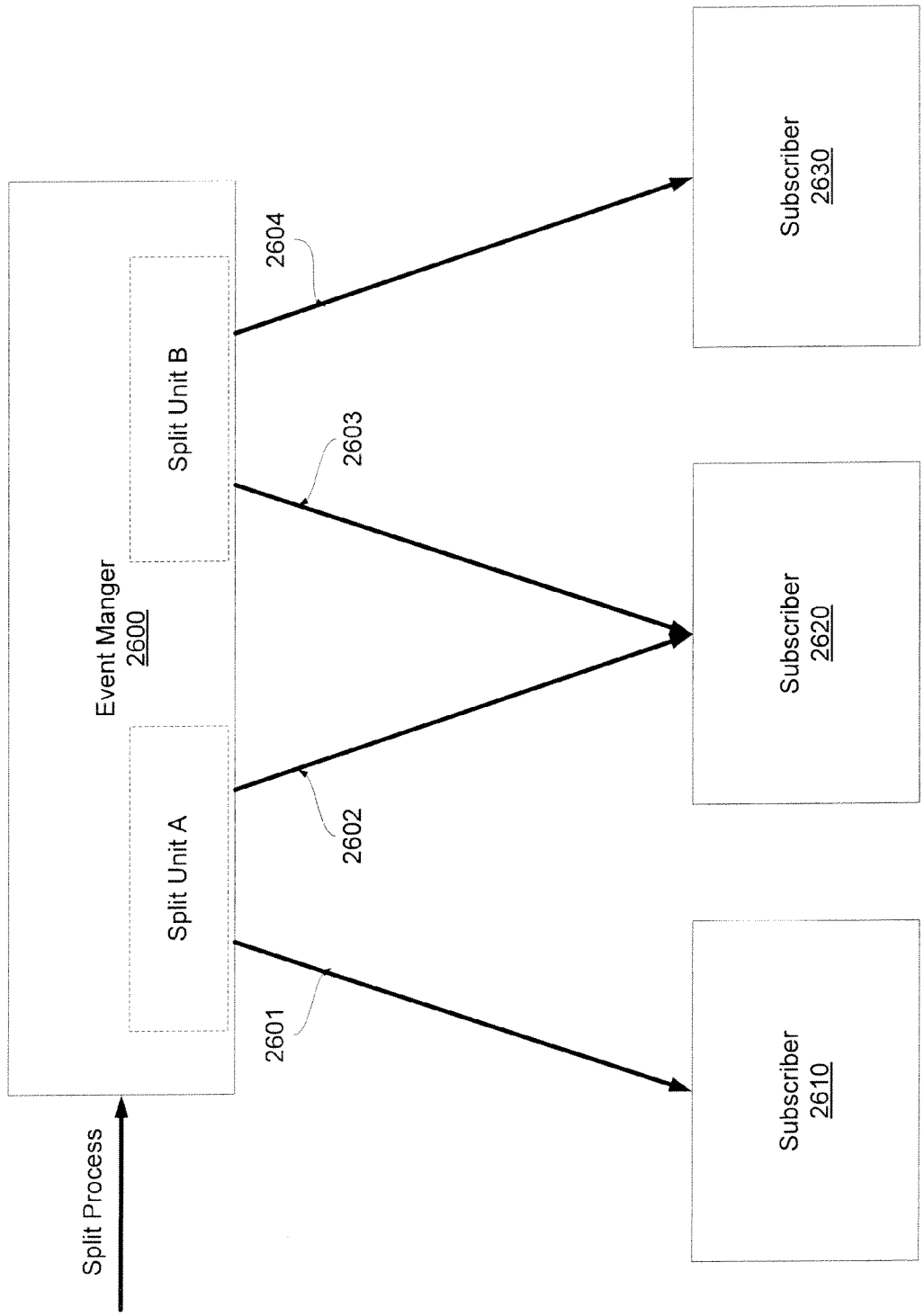
FIG. 26 illustrates an example of an event manager splitting a process according to one embodiment.

FIG. 26 illustrates an example of an event manager 2600 splitting a process according to one embodiment. According to the embodiment, event manager 2600 determines, based on a process state and metadata stored in a database (not shown), that a current process is to be split into two processes. Event manager 2600 determines the remaining steps of the process and creates two split units, Split Unit A and Split Unit B. As previously defined, a split unit defines a sequential set of steps in a process that can be split together. Event manager 2600 then generates a set of events, events 2601, 2602, 2603, and 2604, where events 2601 and 2602 are a part of Split Unit A, and events 2603 and 2604 are a part of Split Unit B, and each event corresponds to a remaining step of the process. Event manager 2600 then publishes events 2601, 2602, 2603, and 2604. According to one embodiment, event manager 2600 publishes events 2601, 2602, 2603 and 2604 sequentially. In another embodiment, event manager 2600 publishes one event that is part of Split Unit A and one event this part of Split Unit B in parallel, and then publishes the other event that is part of Split Unit A and the other event that is part of Split Unit B in parallel. In a third embodiment, event manager 2600 publishes events 2601, 2602, 2603 and 2604 in parallel.

According to an embodiment, subscriber 2610 consumes event 2601 and executes a task based on the consumed event. In addition, subscriber 2620 consumes event 2602 and event 2603, and executes a task based on each consumed event. Furthermore, subscriber 2630 consumes event 2604 and executes a task based on the consumed event.

According to an embodiment, when a process is split, an event generated by event manager 2600 can have a different payload than an event generated when a process is not split. According to the embodiment, the different payload can identify that the event corresponds to a step of a split process.

While in this example, four events are generated, where the four events corresponds to four steps of the process, one of ordinary skill in the art would readily appreciate that this is just an example, and that any number of events can be generated corresponding to any number of steps of the process. In addition, while in this example, four events are published to three subscribers, one of ordinary skill in the art would also appreciate that this is also just an example, and that the generated events can be published to any number of subscribers, with each subscriber consuming any number of events. Furthermore, while in this example, a process is split into two split units, this is also just an example, and a process can be split into any number of split units. Accordingly, event manager 2600 can split a process into any number of split units, where a split unit includes any number of remaining steps. Furthermore, event manager 2600 can generate any number of events, and can publish the events to any number of subscribers.

As also previously described, a user of a distributed order orchestration system can initiate a change request. As previously described, a change request comprises a new order that references an original order. The new order also comprises modifications to the original order, and thus, comprises modifications to business steps that comprise an original process. The original process can be currently executing, or can have previously executed. According to an embodiment, an event manager can be used to process a change request. According to the embodiment, if an event manager determines based on a process state and metadata stored in a database that a user has initiated a change request, the event manager can generate a set of events, where each event compensates a step of the original process. An example of an event manager processing a change request using events will now be discussed in more detail.

Figure 27:
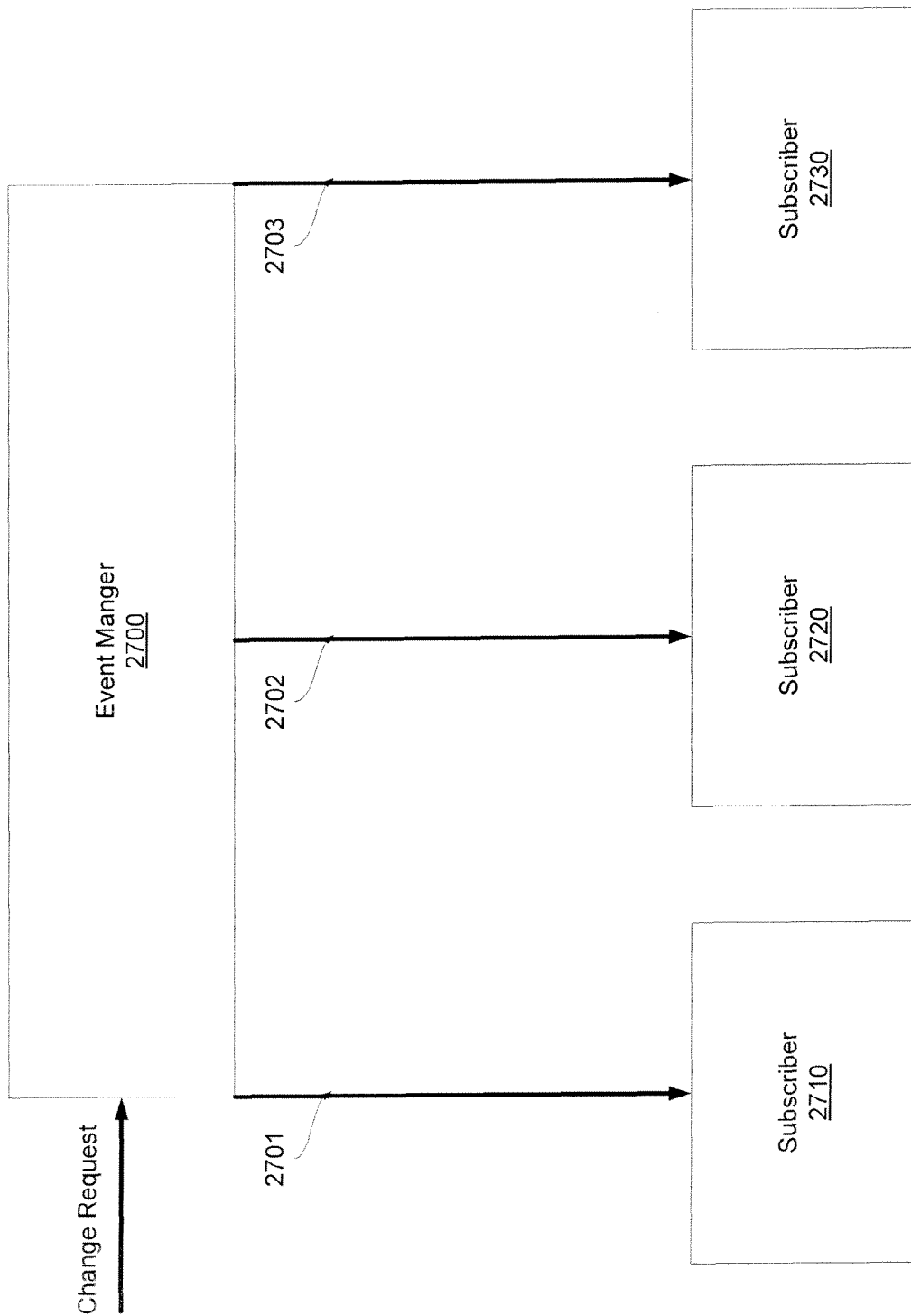
FIG. 27 illustrates an example of an event manager processing a change request using events according to one embodiment.

FIG. 27 illustrates an example of an event manager 2700 processing a change request using events according to one embodiment. According to the embodiment, event manager 2700 determines, based on a process state and metadata stored in a database (not shown), that a change request has been initiated. Based on the process state and the metadata, event manager 2700 generates a set of events to compensate an original process. In the illustrated embodiment of FIG. 27, event manager 2700 generates events 2701, 2702, and 2703, with each event corresponding to a step of the original process. According to the embodiment, event manager 2700 publishes each event of the set of events one at a time. This is because the steps of an original process are compensated sequentially, rather than in parallel. In the illustrated embodiment, event manager 2700 first publishes event 2701 to subscriber 2710. Subscriber 2710 consumes the event and executes a task that compensates the first step of the original process based on the consumed event. Next, event manager 2700 publishes event 2702 to subscriber 2720. Subscriber 2720 consumes the event and executes a task that compensates the second step of the original process based on the consumed event. Subsequently, event manager 2700 publishes event 2703 to subscriber 2730. Subscriber 2730 consumes the event and executes a task that compensates the third step of the original process based on the consumed event.

While in this example, three events are generated, where the three events correspond to three steps of an original process, one of ordinary skill in the art would readily appreciate that this is just an example, and that any number of events can be generated corresponding to any number of steps of an original process. Furthermore, while in this example, the three events are published to three subscribers, this is just an example, and the set of events can be published to any number of subscribers.

Figure 28:
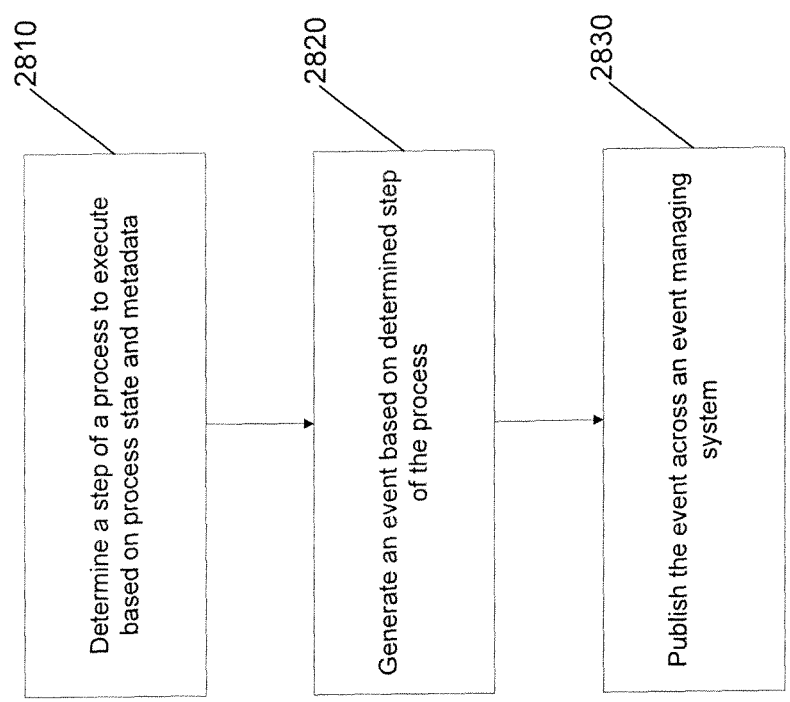
FIG. 28 illustrates a flow diagram of the functionality of a distributed order orchestration module according to one embodiment.

FIG. 28 illustrates a flow diagram of the functionality of a distributed order orchestration module according to one embodiment. According to the embodiment, the distributed order orchestration module initiates an event manager to process an order using a process. In accordance with the embodiment, the event manager performs the functionality illustrated in FIG. 28.

At 2810, a step of a process to execute is determined based on a process state and metadata stored in a database. At 2820, an event is generated based on the determined step of the process. According to the embodiment, the event includes instructions to execute a task that corresponds to the step of the process. At 2830, the event is published across an event messaging system.

Thus, according to an embodiment of the invention, an event manager of a distributed order orchestration system can generate and publish a set of events based on a process state and metadata stored in a database. A set of subscribers can consume the set of events, and each subscriber can execute a task based on the consumed event.

According to the embodiment, components of the distributed order orchestration system can be decoupled from each other, as an event manager can handle communication between the components. Computation in the distributed order orchestration system can be separated from communication. Thus, each component or layer of the distributed order orchestration system can include less source code, as the source code for each component can solely include functionality for completing the objectives of the component, and does not need to include source code to handle communication with other components. Furthermore, changes can be made to the source code of each component, such as changing a payload of an event, without requiring changes to the source code to modify how the component communicates with other components. In addition, because the event manager is stateless, a smaller amount of data is generated and retained. Thus, according to the embodiment, a distributed order orchestration system can be more scalable and flexible.

Although the description has been described with respect to particular embodiments thereof, these particular embodiments are merely illustrative, and not restrictive. Although BPEL is described, it will be understood that other business project languages may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory computer-readable medium having instructions stored thereon, when executed by a processor, cause the processor to orchestrate an order using an event-based orchestration framework including a capture layer, a decomposition layer, an orchestration layer, a task layer and an external interface layer, the orchestration comprising:

at the capture layer:
receiving, at an order capture module, a web order from a customer computer over a network;
creating a source order object from the web order;

at the decomposition layer:
receiving the source order object from the order capture module;
creating a distributed order orchestration (DOO) order object from the source order object, the DOO order object including a plurality of attribute values;
defining a process state and metadata for an orchestration process and storing the process state and metadata in a data table of a database, the process state comprising the DOO order attribute values and a state of the orchestration process that indicates which steps of the orchestration process have been executed, and the metadata comprising one or more steps of the orchestration process and an order of the one or more steps of the orchestration process;

at the orchestration layer:
determining, by an event manager, a step of the orchestration process to execute based on the steps of the orchestration process that have been executed as indicated by the process state and the order of the one or more steps of the orchestration process indicated by the metadata stored in the database;
generating an event based on the determined step of the orchestration process to execute and the metadata, the event comprising instructions to execute a task that corresponds to the determined step of the orchestration process to execute, and an event type, the task including a plurality of subtasks;
publishing the event across an event messaging system;

at the task layer:

retrieving, by a task layer service decoupled from the event manager, the published event from the messaging system;
determining whether the task layer service subscribes to the event type of the published event;
when the task layer service subscribes to the event type:
executing each of the subtasks,
generating at least one task message to an external system,
processing at least one task result message from the external system, and
updating the process state stored in the database, after executing each subtask and after processing the task result message, including updating at least one DOO order attribute value;
at the external interface layer:
sending the task message to the external system over the network; and
receiving the task result message from the external system over the network.

2. The non-transitory computer-readable medium of claim 1, wherein the event manager and the task layer service are each distinct components of a distributed order orchestration system.

3. The non-transitory computer-readable medium of claim 2, wherein the event manager comprises a stateless process invoked by an orchestration system.

4. The non-transitory computer-readable medium of claim 1, wherein the DOO order object includes a header object, one or more line objects, and one or more fulfillment line objects, the header object containing a hierarchy of the order, the line object containing information of the corresponding line of the order, and the fulfillment line object corresponding to a supply action of a corresponding fulfillment system which processes the order line.

5. The non-transitory computer-readable medium of claim 1, wherein the metadata is used to define tasks within the order and to invoke services related to the tasks.

6. The non-transitory computer-readable medium of claim 5, wherein the services comprise task layer services.

7. The non-transitory computer-readable medium of claim 1, wherein said determining a step of the orchestration process to execute, generating an event and publishing the event are repeated until the process state reaches an exit status.

8. The non-transitory computer-readable medium of claim 1,
wherein a mediator retrieves the event,
wherein the mediator invokes the task layer service based on parameters contained within the event,
wherein the task layer service executes the task based on the published event, and
wherein the task layer service updates the process state stored in the database after executing the task.

9. The non-transitory computer-readable medium of claim 1, wherein the event messaging system comprises one or more message channels, where each message channel is configured to transmit an event from the event manager to the task layer service.

10. The non-transitory computer-readable medium of claim 9, wherein each message channel comprises a publish-subscribe message channel comprising one input channel and one or more output channels, wherein each output channel corresponds to a unique task layer service.

11. The non-transitory computer-readable medium of claim 1, wherein the determining the event to generate further comprises,
determining whether any steps of the orchestration process remain,
selecting a process step,
determining whether the selected process step depends on other process steps, and
determining whether the other process steps have completed, when it is determined that the selected process step depends on other process steps.

12. The non-transitory computer-readable medium of claim 1, wherein the orchestrating further comprises at least one of, publishing events for parallel steps of the orchestration process, splitting the orchestration process, and processing a change request to the order.

13. The non-transitory computer-readable medium of claim 1, wherein the orchestrating further comprises publishing events for conditional steps of the orchestration process.

14. The non-transitory computer-readable medium of claim 1, wherein the processor is further configured to:
determine that a change request has been initiated based on the process state and the metadata stored in the database;
generate a set of one or more events that correspond to one or more steps of the orchestration process, wherein each event comprises instructions to execute a task that compensates a step of the orchestration process; and
publish the set of events across the event messaging system, wherein each event is published one at a time;
wherein one or more task layer services retrieve the published set of events, and execute one or more tasks that compensate the one or more steps of the orchestration process.

15. A computer-implemented method for orchestrating an order using an event-based orchestration framework including a capture layer, a decomposition layer, an orchestration layer, a task layer and an external interface layer, the computer-implemented method comprising:
at the capture layer:
receiving, at an order capture module, a web order from a customer computer over a network;
creating a source order object from the web order;
at the decomposition layer:
receiving the source order object from the order capture module;
creating a distributed order orchestration (DOO) order object from the source order object, the DOO order object including a plurality of attribute values;
defining a process state and metadata for an orchestration process and storing the process state and metadata in a data table of a database, the process state comprising the DOO order object attribute values and a state of the orchestration process that indicates which steps of the orchestration process have been executed, and the metadata comprising one or more steps of the orchestration process and an order of the one or more steps of the orchestration process;
at the orchestration layer:
determining, by an event manager, a step of the orchestration process to execute based on the steps of the orchestration process that have been executed as indicated by the process state and the order of the one or more steps of the orchestration process indicated by the metadata stored in the database;
generating an event based on the determined step of the orchestration process to execute and the metadata, the event comprising instructions to execute a task that corresponds to the determined step of the orchestration process to execute, and an event type, the task including a plurality of subtasks;
publishing the event across an event messaging system;
at the task layer:
retrieving, by a task layer service decoupled from the event manager, the published event from the messaging system;
determining whether the task layer service subscribes to the event type of the published event;
when the task layer service subscribes to the event type:
executing each of the subtasks,
generating at least one task message to an external system,
processing at least one task result message from the external system, and
updating the process state stored in the database after executing each subtask and after processing the task result message, including updating at least one DOO order attribute value;
at the external interface layer:
sending the task message to the external system over the network; and
receiving the task result message from the external system over the network.

16. The computer-implemented method of claim 15, wherein the event manager and the task layer service are each distinct components of a distributed order orchestration system.

17. The computer-implemented method of claim 16, wherein the event manager comprises a stateless process invoked by an orchestration system.

18. An orchestration system, comprising:
a processor;
an orchestration module configured to initiate an event manager to orchestrate an order using an event-based orchestration framework including a capture layer, a decomposition layer, an orchestration layer, a task layer and an external interface layer; and
a database configured to store a process state and metadata;
wherein the processor is configured to:
at the capture layer:
receive, at an order capture module, a web order from a customer computer over a network;
create a source order object from the web order;
at the decomposition layer:
receive the source order object from the order capture module;
create a distributed order orchestration (DOO) order object from the source order object, the DOO order object including a plurality of attribute values;
define a process state and metadata for the orchestration process and store the process state and metadata in a data table of a database, the process state comprising a state of the orchestration process that indicates which steps of the orchestration process have been executed, and the metadata comprising one or more steps of the orchestration process and an order of the one or more steps of the orchestration process;
at the orchestration layer:
determine, by an event manager, a step of the orchestration process to execute based on the steps of the orchestration process that have been executed as indicated by the process state and the order of the one or more steps of the orchestration process indicated by the metadata stored in the database;
generate an event based on the determined step of the orchestration process to execute and the metadata, the event comprising instructions to execute a task that corresponds to the determined step of the orchestration process to execute, and an event type, the task including a plurality of subtasks; and
publish the event across an event messaging system;
at the task layer:
retrieve, by a task layer service decoupled from the event manager, the published event from the messaging system,
determine whether the task layer service subscribes to the event type of the published event,
when the task layer service subscribes to the event type:
execute each of the plurality of subtasks,
generate at least one task message to an external system,
process at least one task result message from the external system, and
update the process state stored in the database after executing each subtask and after processing the task result message, including updating at least one DOO order attribute value;
at the external interface layer:
send the task message to the external system over the network; and
receive the task result message from the external system over the network.

19. The orchestration system of claim 18, wherein the event manager and the task layer service are each distinct components of a distributed order orchestration system.

20. The orchestration system of claim 19, wherein the event manager comprises a stateless process invoked by the orchestration system.

* * * * *

UNITED STATES PATENT AND TRADEMARK OFFICE
CERTIFICATE OF CORRECTION

PATENT NO.        : 9,658,901 B2
APPLICATION NO.   : 12/945084
DATED             : May 23, 2017
INVENTOR(S)       : Addala et al.

It is certified that error appears in the above-identified patent and that said Letters Patent is hereby corrected as shown below:

On the Title Page

On page 2, Column 2, under Other Publications, Line 14, delete "Mangement"," and insert -- Management", --, therefor.

In the Drawings

On sheet 1 of 28, in Fig. 1, under Reference Numeral 150, Lines 2-3, delete "Layer layer" and insert -- Layer --, therefor.

On sheet 25 of 28, in Fig. 25, under Reference Numeral 2500, Line 1, delete "Manger" and insert -- Manager --, therefor.

On sheet 26 of 28, in Fig. 26, under Reference Numeral 2600, Line 1, delete "Manger" and insert -- Manager --, therefor.

On sheet 27 of 28, in Fig. 27, under Reference Numeral 2700, Line 1, delete "Manger" and insert -- Manager --, therefor.

Signed and Sealed this
Twenty-third Day of January, 2018

Joseph Matal
*Performing the Functions and Duties of the
Under Secretary of Commerce for Intellectual Property and
Director of the United States Patent and Trademark Office*